United States Patent [19]
Komatsu

[11] Patent Number: 5,539,683
[45] Date of Patent: Jul. 23, 1996

[54] METHOD AND DEVICE FOR PROCESSING, AND DETECTING A STATE OF, BINARY DATA

[75] Inventor: Shinpei Komatsu, Yokohama, Japan

[73] Assignee: Fujitsu Limited, Kawasaki, Japan

[21] Appl. No.: 265,032

[22] Filed: Jun. 24, 1994

[30] Foreign Application Priority Data

Aug. 10, 1993 [JP] Japan .................................. 5-198202

[51] Int. Cl.⁶ .................................................. G06F 7/50
[52] U.S. Cl. ...................................................... 364/715.09
[58] Field of Search .............................. 364/715.09, 715.1

[56] References Cited

U.S. PATENT DOCUMENTS 3,711,692  1/1973  Batcher ............................. 364/715.09
4,189,716  2/1980  Krambeck ......................... 364/715.09
4,486,848  12/1984 Kaminski ........................... 364/715.09
4,607,176  8/1986  Burrows et al. ................... 364/715.09

Primary Examiner—David H. Malzahn
Attorney, Agent, or Firm—Staas & Halsey

[57] ABSTRACT

In a method of processing binary data by a computer to detect a state of the binary data, the first step is to perform an AND logic operation on the binary data and data obtained by subtracting binary one from the binary data. The second step is to repeatedly perform the AND logic operation on new binary data obtained by the AND logic operation executed in the first step and data obtained by subtracting binary one from the new binary data until a result of the AND logic operation executed in the second step becomes zero. The third step is to count the number of times that the second step has been repeatedly performed until the result of the AND logic operation becomes zero. The fourth step is to detect the state of the binary data on the basis of the number of times counted by the step c). The number of times counted by the third step indicates the number of bits indicating binary ones contained in the binary data.

16 Claims, 45 Drawing Sheets

FIG. 6 PRIOR ART

| 1ST TIME | | 2ND TIME | | 3RD TIME | | 4TH TIME | | 5TH TIME | | |
|---|---|---|---|---|---|---|---|---|---|---|
| DATA | NUMBER OF BITS "1" | DATA | NUMBER OF BITS "1" | DATA | NUMBER OF BITS "1" | DATA | NUMBER OF BITS "1" | DATA | NUMBER OF BITS "1" | |
| 1001 | 0 | ① | | ② | | ③ | | ④ | | S1 |
| 1001 | 0 | 0100 | 1 | 0010 | 1 | 0001 | 1 | 0000 | 2 | S2 |
| 1001 | 0 | 0100 | 1 | 0010 | 1 | 0001 | 1 | | | S3 |
| 1001 | 1 | | | | | 0001 | 2 | | | S4 |
| 0100 | 1 | 0010 | 1 | 0001 | 1 | 0000 | 2 | | | S5 |
| ① | | ② | | ③ | | ④ | | 0000 | 2 | |

FIG. 8 PRIOR ART

| 1ST TIME | | 2ND TIME | | 3RD TIME | | 4TH TIME | | 5TH TIME | | |
|---|---|---|---|---|---|---|---|---|---|---|
| DATA | NUMBER OF BITS "1" | DATA | NUMBER OF BITS "1" | DATA | NUMBER OF BITS "1" | DATA | NUMBER OF BITS "1" | DATA | NUMBER OF BITS "1" | |
| 1001 | 0 | ① | | ② | | ③ | | ④ | | S1 |
| 1001 | 0 | 0100 | 1 | 0010 | 1 | 0001 | 1 | 0000 | 2 | S2 |
| 1001 | 0 | 0100 | 1 | 0010 | 1 | 0001 | 1 | | | S3 |
| 1001 | 1 | | | | | 0001 | 2 | | | S4 |
| 0100 | 1 | 0010 | 1 | 0001 | 1 | 0000 | 2 | | | S5 |
| ① | | ② | | ③ | | ④ | | 0000 | 2 | S6 |

FIG.10 PRIOR ART

| 1ST TIME | | 2ND TIME | | 3RD TIME | | 4TH TIME | | 5TH TIME | | |
|---|---|---|---|---|---|---|---|---|---|---|
| DATA | NUMBER OF BITS "1" | DATA | NUMBER OF BITS "1" | DATA | NUMBER OF BITS "1" | DATA | NUMBER OF BITS "1" | DATA | NUMBER OF BITS "1" | |
| 1001 | 0 | ① | | ② | | ③ | | ④ | | S1 |
| 1001 | 0 | 0100 | 1 | 0010 | 1 | 0001 | 1 | 0000 | 2 | S2 |
| 1001 | 0 | 0100 | 1 | 0010 | 1 | 0001 | 1 | | | S3 |
| 1001 | 1 | | | | | 0001 | 2 | | | S4 |
| 0100 | 1 | 0010 | 1 | 0001 | 1 | 0000 | 2 | | | S5 |
| ① | | ② | | ③ | | ④ | | 0000 | 2 | |

FIG. 12 PRIOR ART

| 1ST TIME | | 2ND TIME | | 3RD TIME | | |
|---|---|---|---|---|---|---|
| DATA | WORK | DATA | WORK | DATA | WORK | |
| 1100 | 0001 | | | | | S1 |
| 0011 | 0001 | | | | | S2 |
| 0011 | 0001 | 0011 | 0010 | 0011 | 0100 | S3 |
| 0011 | 0010 | 0011 | 0100 | | | S4 |
| | | | | 0111 | 0100 | S5 |
| | | | | 0111 | 0100 | |

FIG. 14 PRIOR ART

| 1ST TIME | | 2ND TIME | | 3RD TIME | | 4TH TIME | | |
|---|---|---|---|---|---|---|---|---|
| DATA | NUMBER OF BITS "0" | DATA | NUMBER OF BITS "0" | DATA | NUMBER OF BITS "0" | DATA | NUMBER OF BITS "0" | |
| 1001 | 0 | ① | | ② | | ③ | | S1 |
| 1001 | 0 | 1100 | 0 | 1110 | 1 | 1111 | 2 | S2 |
| 1001 | 0 | 1100 | 0 | 1110 | 1 | | | S3 |
| | | 1100 | 1 | 1110 | 2 | | | S4 |
| 1100 | 0 | 1110 | 1 | 1111 | 2 | | | S5 |
| ① | | ② | | ③ | | 1111 | 2 | |

FIG.16 PRIOR ART

| 1ST TIME | | 2ND TIME | | 3RD TIME | | 4TH TIME | | |
|---|---|---|---|---|---|---|---|---|
| DATA | NUMBER OF BITS "0" | DATA | NUMBER OF BITS "0" | DATA | NUMBER OF BITS "0" | DATA | NUMBER OF BITS "0" | |
| 1001 | 0 | ① | | ② | | ③ | | S1 |
| 1001 | 0 | 1100 | 0 | 1110 | 1 | 1111 | 2 | S2 |
| 1001 | 0 | 1100 | 0 | 1110 | 1 | | | S3 |
| | | 1100 | 1 | 1110 | 2 | | | S4 |
| 1100 | 0 | 1110 | 1 | 1111 | 2 | | | S5 |
| ① | | ② | | ③ | | 1111 | 2 | S6 |

FIG.18 PRIOR ART

| 1ST TIME | | 2ND TIME | | 3RD TIME | | 4TH TIME | | |
|---|---|---|---|---|---|---|---|---|
| DATA | NUMBER OF BITS "0" | DATA | NUMBER OF BITS "0" | DATA | NUMBER OF BITS "0" | DATA | NUMBER OF BITS "0" | |
| 1001 | 0 | ① | | ② | | ③ | | S1 |
| 1001 | 0 | 1100 | 0 | 1110 | 1 | 1111 | 2 | S2 |
| 1001 | 0 | 1100 | 0 | 1110 | 1 | | | S3 |
| | | 1100 | 1 | 1110 | 2 | | | S4 |
| 1100 | 0 | 1110 | 1 | 1111 | 2 | | | S5 |
| ① | | ② | | ③ | | 1111 | 2 | S6 |

FIG.22B

| 1ST TIME | | 2ND TIME | | 3RD TIME | | |
|---|---|---|---|---|---|---|
| DATA | NUMBER OF BITS "1" | DATA | NUMBER OF BITS "1" | DATA | NUMBER OF BITS "1" | |
| 1001 | 0 | ① | | ② | | S1 |
| 1001 | 0 | 1000 | 1 | 0000 | 2 | S2 |
| 1001 | 1 | 1000 | 2 | | | S3 |
| 1000 | 1 | 0000 | 2 | | | S4 |
| ① | | ② | | 0000 | 2 | |

FIG.23B

| | 1 ST TIME | | 2 ND TIME | | 3 RD TIME | | |
|---|---|---|---|---|---|---|---|
| | DATA | NUMBER OF LOOPS | DATA | NUMBER OF LOOPS | DATA | NUMBER OF LOOPS | |
| | 1001 | 3 | ① | | ② | | S1 |
| | 1001 | 2 | 1000 | 1 | 0000 | 0 | S2 |
| | 1001 | 2 | 1000 | 1 | 0000 | 0 | S3 |
| | 1000 | 2 | 0000 | 1 | | | S4 |
| | ① | | ② | | 0000 | 0 | S5 |

FIG. 24B

| 1ST TIME | | 2ND TIME | | 3RD TIME | | 4TH TIME | | |
|---|---|---|---|---|---|---|---|---|
| DATA | NUMBER OF LOOPS | DATA | NUMBER OF LOOPS | DATA | NUMBER OF LOOPS | DATA | NUMBER OF LOOPS | |
| 1001 | 3 | ① ↓ | | ② ↓ | | ③ ↓ | | S1 |
| 1001 | 3 | 1000 | 2 | 0000 | 1 | 0000 | 0 | S2 |
| 1000 | 3 | 0000 | 2 | 0000 | 1 | | | S3 |
| 1000 | 2 | 0000 | 1 | 0000 | 0 | | | S4 |
| ① | | ② | | ③ | | 0000 | 0 | S5 |

FIG.26B

| 1ST TIME | | 2ND TIME | | 3RD TIME | | |
|---|---|---|---|---|---|---|
| DATA | NUMBER BITS"0" | DATA | NUMBER BITS"0" | DATA | NUMBER BITS"0" | |
| 1001 | 0 | ① | | ② | | S1 |
| 1001 | 0 | 1011 | 1 | 1111 | 2 | S2 |
| 1001 | 1 | 1011 | 2 | | | S3 |
| 1011 | 1 | 1111 | 2 | | | S4 |
| ① | | ② | | 1111 | 2 | |

FIG.27B

| 1 ST TIME | | 2 ND TIME | | 3 RD TIME | | |
|---|---|---|---|---|---|---|
| DATA | NUMBER OF LOOPS | DATA | NUMBER OF LOOPS | DATA | NUMBER OF LOOPS | |
| 1001 | 3 | ① | | ② | | S1 |
| 1001 | 2 | 1011 | 1 | 1111 | 0 | S2 |
| 1001 | 2 | 1011 | 1 | 1111 | 0 | S3 |
| 1011 | 2 | 1111 | 1 | | | S4 |
| ① | | ② | | 1111 | 0 | S5 |

FIG.28B

| 1ST TIME | | 2ND TIME | | 3RD TIME | | 4TH TIME | | |
|---|---|---|---|---|---|---|---|---|
| DATA | NUMBER OF LOOPS | DATA | NUMBER OF LOOPS | DATA | NUMBER OF LOOPS | DATA | NUMBER OF LOOPS | |
| 1001 | 3 | ① | | ② | | ③ | | S1 |
| 1001 | 3 | 1011 | 2 | 1111 | 1 | 1111 | 0 | S2 |
| 1011 | 3 | 1111 | 2 | 1111 | 1 | | | S3 |
| 1011 | 2 | 1111 | 1 | 1111 | 0 | | | S4 |
| ① | | ② | | ③ | | 1111 | 0 | S5 |

FIG.32

| 1ST TIME | | 2ND TIME | | 3RD TIME | | |
|---|---|---|---|---|---|---|
| ERASABLE-STATE FLAG | NUMBER OF BITS "1" | ERASABLE-STATE FLAG | NUMBER OF BITS "1" | ERASABLE-STATE FLAG | NUMBER OF BITS "1" | |
| 1001 | * | | | | | S1 |
| 1001 | 0 | | | | | S2 |
| 1001 | 0 | 1000 | 1 | 0000 | 2 | S3 |
| 1001 | 1 | 1000 | 2 | | | S4 |
| 1000 | 1 | 0000 | 2 | | | S5 |
| | | | | 0000 | 2 | S6 |
| | | | | | | S7 |
| | | | | 0000 | 2 | |

FIG. 34

| 1ST TIME | | 2ND TIME | | 3RD TIME | | |
|---|---|---|---|---|---|---|
| ERASABLE-STATE FLAG | NUMBER OF LOOPS | ERASABLE-STATE FLAG | NUMBER OF LOOPS | ERASABLE-STATE FLAG | NUMBER OF LOOPS | |
| 1101 | * | | | | | S1 |
| 1101 | 3 | ① | | ② | | S2 |
| 1101 | 2 | 1100 | 1 | 1000 | 0 | S3 |
| 1101 | 2 | 1100 | 1 | 1000 | 0 | S4 |
| 1100 | 2 | 1000 | 1 | | | S5 |
| ① | | ② | | | | |
| | | | | 1000 | 0 | S6 |
| | | | | 1000 | 0 | S7 |
| | | | | 1000 | 0 | |

FIG.36

| 1ST TIME | | 2ND TIME | | 3RD TIME | | |
|---|---|---|---|---|---|---|
| ERASABLE-STATE FLAG | NUMBER OF BITS"0" | ERASABLE-STATE FLAG | NUMBER OF BITS"0" | ERASABLE-STATE FLAG | NUMBER OF BITS"0" | |
| 1001 | * | | | | | S1 |
| 1001 | 0 | | ① | | ② | S2 |
| 1001 | 0 | 1011 | 1 | | 2 | S3 |
| 1001 | 1 | 1011 | 2 | | | S4 |
| 1000 | 1 | 1111 | 2 | | | S5 |
| ① | | ② | | | | |
| | | | | 1111 | 2 | S6 |
| | | | | 1111 | 2 | S7 |
| | | | | 0000 | 2 | |

FIG.38

| 1ST TIME | | 2ND TIME | | 3RD TIME | | |
|---|---|---|---|---|---|---|
| ERASABLE-STATE FLAG | NUMBER OF LOOPS | ERASABLE-STATE FLAG | NUMBER OF LOOPS | ERASABLE-STATE FLAG | NUMBER OF LOOPS | |
| 1000 | * | | | | | S1 |
| 1000 | 3 | ① | | ② | | S2 |
| 1000 | 2 | 1001 | 1 | 1011 | 0 | S3 |
| 1000 | 2 | 1001 | 1 | 1011 | 0 | S4 |
| 1001 | 2 | 1011 | 1 | | | S5 |
| ① | | ② | | 1011 | 0 | S6 |
| | | | | | | S7 |
| | | | | 1011 | 0 | |

METHOD AND DEVICE FOR PROCESSING, AND DETECTING A STATE OF, BINARY DATA

BACKGROUND OF THE INVENTION

1. Field of the Invention

The present invention generally relates to data processing, and more particularly to a data processing method having the function of checking how many bits indicating a predetermined value are contained in data consisting of a plurality of bits and performing a predetermined bit operation on such data. Further, the present invention is concerned with a device using the above data processing method. The present invention is suitable particularly for data liable to be affected by the performance of a storage medium or noise. For example, the present invention can be suitably applied to an electronic device having an erasable and programmable memory such as a flash memory.

2. Description of the Prior Art

Recently, erasable and programmable memories such as flash memories have been widely used in various electronic devices. The flash memories do not need a backup source and data stored therein is electrically erasable and programmable. However, the flash memories have a disadvantage in that data can be erased only a limited number of times. If data stored in a flash memory is erased an excessive number of times, a bit is fixed at a low or a high level and cannot be changed.

As another aspect of the flash memory, the data erasing operation on the flash memory is performed so that the data erasing unit, in which data is erased at one time, is equal to a few kbytes to a few hundreds of kbytes. This means that the data erasing operation cannot be performed for every byte. In a flash memory divided into blocks, each of which is divided into sectors, if data stored in a block or a sector of the flash memory becomes unnecessary, an erasable-state flag for the above block or sector is turned ON and all data stored therein is erased, thereby to get ready for writing. Normally, erasable-state flags and fault flags are provided for blocks and sectors of the flash memory. The erase flags indicate whether or not data stored in the respective blocks or sectors are erasable. The fault flags indicate whether or not the respective blocks or sectors are faulty. However, there is a possibility that the flash memory will become faulty if data is erased therefrom an excessive number of times. This means that areas storing the flags may become faulty when flag data is erased an excessive number of times. For this reason, redundant flag data is provided for the regular flag data.

FIG. 1 is a block diagram of a flash memory system, which is made up of a plurality of flash memories 11-1 through 11-n, a controller LSI (Large Scale Integrated circuit) device 12, a CPU (Central Processing Unit) 13 and an SRAM (Static Random Access Memory) 14. The controller LSI device 12 controls a data erasing and writing operation on the flash memories 11-1 through 11-n. The SRAM device 14 stores data to be written into the flash memories 11-1 through 11-n and data to be saved. The CPU 13 controls the operation of the overall flash memory system. Further, each of the flash memories 11-1 through 11-n has a flag storage area 11a in which an erasable-state flag, a fault flag and other predetermined flags are stored in the redundant formation.

When a decision on the flags including the redundant bit(s) is made, as shown in FIG. 2, a flag decision unit 15 formed by the CPU 13 makes a majority decision on the flags stored in the flag area 11a by counting the number of flag bits indicating "1" and/or the number of flag bits indicating "0".

Normally, data consisting of a plurality of bits, such as flag data as described above, is processed in the following ways.

FIGS. 3 and 4 show a first conventional data processing method for changing the lowest bit of N-bit data among bits indicating "1" to "0". The N-bit data processed in FIGS. 3 and 4 is four-bit data $(1100)_2$ (N=4) where the suffix 2 indicates the binary notation. FIG. 3 is a flowchart of the first conventional data processing method, and FIG. 4 shows how data is processed in each step. Steps S1 through S5 shown in FIG. 3 correspond to steps S1 through S5 shown in FIG. 4, respectively.

In step S1, binary data $(0001)_2$ is stored in a work area. In step S2, it is determined whether or not the data being processed is zero. When the result of this step is YES, the process is ended. When it is determined that the data is not zero, it is determined in step S3 whether or not the result (resultant data) of an AND logic operation on the bits of the data $(1100)_2$ and the work data $(0001)_2$ is zero. When the result of this determination is YES, the work data stored in the work area is shifted leftward by one bit in step S4, and the process returns to step S3. The above process is repeatedly performed until it is determined in step S3 that the result of the AND logic operation on the data $(1100)_2$ and the work is not zero. At this time, the process proceeds with step S5 in which an exclusive-OR operation on the data $(1100)_2$ and the work data is calculated and the result thereof is output as the processing result.

By the above-mentioned method, the work data becomes $(0100)_2$ after step S3 is performed three times, and the result of the step S3 decision does not become zero. The result of the exclusive-OR operation on the work data $(0100)_2$ and data $(1100)_2$ becomes $(000)_2$, in which the lowest bit of the four-bit data among the bits indicating "1" is changed to "0". The method shown in FIG. 3 needs the repetitive process performed i times ($n \leq i \leq N$) in order to change the lowest bit (n) indicating "1" of the N-bit data to "0".

FIGS. 5 and 6 show a second conventional data processing method for counting the number of "1" bits contained in N-bit data, which is four-bit data $(1001)_2$ in the case shown in FIGS. 5 and 6. FIG. 5 is a flowchart of the second conventional data processing method, and FIG. 6 shows how data is processed in each step. Steps S1–S5 shown in FIG. 5 correspond to steps S1–S5 shown in FIG. 6, respectively.

In step S1 shown in FIGS. 5 and 6, a variable indicating the number of "0" bits is reset to zero in step S1, and it is determined in step S2 whether or not the data being processed is zero. When the data is zero, the process is ended. When it is determined in step S2 that the data is not zero, the process proceeds with step S3 in which it is determined whether or not the result of an AND logic operation is performed on the data being processed and "01h" is 1. When it is determined in step S3 that the result of the AND logic operation is not 1, the process proceeds with step S5. When it is determined in step S3 that the result of the AND logic operation on the data and data "01h" is 1, the process proceeds with step S4 in which the variable is updated by adding 1 to the current value thereof. Then, step S5 is executed in which the data is shifted rightward by one bit. When the data being processed becomes zero, the process is ended.

The above process is repeatedly performed. When step S2 is executed five times as shown in FIG. 6, the data becomes zero, and the number of "1" bits contained in the data can be obtained. In the example being considered, two bits "1" are contained in the data. The method shown in FIG. 5 needs the repetitive process that is performed i times (n≦i≦N) in order to count the number (n) of "1" bits contained in the N-bit data.

FIGS. 7 and 8 show a third conventional data processing method for determining whether or not the number of bits indicating "1" contained in N-bit data is equal to or greater than m. The N-bit data processed in FIGS. 7 and 8 is four-bit data $(1001)_2$ (N =4) and m=3. FIG. 7 is a flowchart of the third conventional data processing method, and FIG. 8 shows how data is processed in each step. Steps S1 through S5 shown in FIG. 7 are the same as corresponding steps shown in FIG. 5, and step S6 shown in FIG. 7 determines whether or not the number of "1" bits obtained in step S4 is equal to or greater than m. The third conventional data processing method needs the repetitive process that is performed i times (n≦i≦N) in order to determine whether or not the number (n) of "1" contained in the N-bit data is equal to or greater than m.

FIGS. 9 and 10 show a fourth conventional data processing method for determining whether or not the number of bits indicating "1" contained in N-bit data is equal to or less than m. The N-bit data processed in FIGS. 9 and 10 is four-bit data $(1001)_2$ (N=4) and m=3. FIG. 9 is a flowchart of the fourth conventional data processing method and FIG. 10 shows how data is processed in each step. Steps S1 through S6 shown in FIG. 9 are the same as steps S1 through S6 shown in FIG. 10. Further, the steps S1 through S5 shown in FIG. 9 are the same as those corresponding steps shown in FIG. 7, and step S6 shown in FIG. 9 is different from that shown in FIG. 7. The fourth conventional data processing method needs the repetitive process that is performed i times (n≦i≦N) in order to determine whether or not the number (n) of "1" bits contained in the N-bit data is equal to or less than m.

FIGS. 11 and 12 show a fifth conventional data processing method for changing the lowest bit of N-bit data, among bits indicating "0", to "1". The N-bit data shown in FIGS. 11 and 12 is four-bit data $(0011)_2$ (N=4). FIG. 11 is a flowchart of the fifth conventional data processing method and FIG. 12 shows how data is processed in each step. Steps S1 through S5 shown in FIG. 11 correspond to steps S1 through S5 shown in FIG. 12.

The fifth conventional data processing method is obtained by modifying the aforementioned first data processing method shown in FIGS. 3 and 4 as follows. That is, step S2 shown in FIGS. 3 and 4 is modified so that the value to be compared is changed from "0" to "1", and the process in step S3 shown in FIGS. 3 and 4 is changed so that an OR logic operation on the data being processed and the work data is executed. Further, the process is modified that it proceeds with step S5 when it is determined in step S3 that the data is equal to the work data and it proceeds with step S4 when it is determined that the data is not equal to the work data. The other steps shown in FIGS. 11 and 12 are the same as those corresponding steps shown in FIGS. 3 and 4. The fifth conventional data processing method needs the repetitive process that is performed i times (n≦i≦N) in order to change the lowest bit of the N-bit data among bits indicating "0" to "1".

FIGS. 13 and 14 show a sixth conventional data processing method for counting the number of "0" contained in N-bit data, which is four-bit data $(1001)_2$ in the case shown in FIGS. 13 and 14. FIG. 13 is a flowchart of the sixth conventional data processing method, and FIG. 14 shows how data is processed in each step. Steps S1–S5 shown in FIG. 13 correspond to steps S1–S5 shown in FIG. 14, respectively.

The sixth conventional data processing method is obtained by modifying the aforementioned second data processing method shown in FIGS. 5 and 6 as follows. That is, step S2 shown in FIGS. 5 and 6 is modified so that the value to be compared is changed from "0" to "1", and the value to be compared in step S3 is changed to "0". Further, in step S5 shown in FIG. 13, the data is shifted rightward, and "1" is set to the highest (most significant) bit. The other steps shown in FIGS. 13 and 14 are the same as those corresponding steps shown in FIGS. 5 and 6. The sixth conventional data processing method needs the repetitive process that is performed i times (n≦i≦N) in order to count the number of bits indicating "0".

FIGS. 15 and 16 show a seventh conventional data processing method for determining whether or not the number of bits indicating "0" contained in N-bit data is equal to or greater than m. The N-bit data is four-bit data $(1001)_2$ in the case shown in FIGS. 15 and 16. FIG. 15 is a flowchart of the seventh conventional data processing method, and FIG. 16 shows how data is processed in each step. Steps S1–S6 shown in FIG. 15 correspond to steps S1–S6 shown in FIG. 16, respectively.

The steps S1 through S5 of the seventh conventional data processing method are the same as those corresponding steps of the above-mentioned sixth embodiment. In step S6 shown in FIG. 15, it is determined that the number of bits indicating "0" obtained in step S4 is equal to or greater than m. The seventh conventional data processing method needs the repetitive process that is performed i times (n≦i≦N) in order to determine whether or not the number of bits indicating "0" is equal to or greater than m.

FIGS. 17 and 18 show an eighth conventional data processing method for determining whether or not the number of bits indicating "0", contained in N-bit data, is equal to or less than m. The N-bit data is four-bit data $(1001)_2$ in the case shown in FIGS. 17 and 18. FIG. 17 is a flowchart of the seventh conventional data processing method, and FIG. 18 shows how data is processed in each step. Steps S1–S6 shown in FIG. 17 correspond to steps S1–S6 shown in FIG. 18, respectively.

The steps S1 through S5 of the eighth conventional data processing method are the same as corresponding those of the above-mentioned sixth embodiment. In step S6 shown in FIG. 17, it is determined that the number of bits indicating "0" obtained in step S4 is equal to or less than m. The eighth conventional data processing method needs the repetitive process that is performed i times (n≦i≦N) in order to determine whether or not the number of bits indicating "0" is equal to or less than m.

As described above, the conventional data processing methods have a disadvantage in that the loop processes must be repeatedly executed in order to invert the value of a desired bit of N-bit data and count the number of bits contained therein. Further, the number of times that the loop processes are executed increases as the number of bits forming data to be processed increases. Hence, the conventional data processing methods need a long time to obtain the operation results and do not have high efficiency in data processing devices such as flash memory systems.

SUMMARY OF THE INVENTION

It is a general object of the present invention to provide a data processing method in which the above disadvantages are eliminated.

A more specific object of the present invention is to provide a data processing method capable of efficiently performing data processing at high speeds.

The above objects of the present invention are achieved by a method of processing binary data by a computer to detect a state of the binary data, the method comprising the steps of: a) performing an AND logic operation on the binary data and data obtained by subtracting binary one from the binary data; b) repeatedly performing the AND logic operation on new binary data obtained by the AND logic operation executed in step a) and data obtained by subtracting binary one from the new binary data until a result of the AND logic operation executed in step b) becomes zero; c) counting the number of times that the step b) has been repeatedly performed until the result of the AND logic operation becomes zero; and d) detecting the state of the binary data on the basis of the number of times counted by the step c), the number of times counted by the step c) indicating the number of bits indicating binary ones contained in the binary data.

The above objects of the present invention are also achieved by a method of processing binary data by a computer to detect a state of the binary data, the method comprising the steps of: (a) performing (m−1) successive AND operations respectively producing (m−1) successively updated binary data outputs, and comprising: (a−1) performing a first AND operation on the input binary data and data obtained by subtracting binary one from the input binary data, and (a−2) performing each successive AND operation on the binary data output of the respectively next preceding AND operation and binary data obtained by subtracting binary one from the binary data output of the respectively next preceding AND operation, wherein (m) is an integer and is used to determine whether or not the binary data contains a number of binary ones equal to or grater than (m); (b) checking a value indicated by the binary data which has been updated (m−1) times; and (c) detecting the state of the input binary data on the basis of the value checked in step (b), and concluding that the number of bits indicating binary ones contained in the input binary data is equal to or greater than (m) when the value checked at step (b) is not zero.

The above objects of the present invention are also achieved by a method of processing binary data by a computer to detect a state of the binary data, the method comprising the steps of: (a) performing (m) successive AND operations respectively producing (m) successively updated binary data outputs, and comprising: (a−1) performing a first AND operation on the input binary data and data obtained by subtracting binary one from the input binary data, and (a−2) performing each successive AND operation on the binary data output of the respectively next preceding AND operation and binary data obtained by subtracting binary one from the binary data output of the respectively next preceding AND operation, wherein (m) is an integer and is used to determine whether or not the binary data contains a number of binary ones equal to or less than (m); (b) checking a value indicated by the binary data which has been updated (m) times; and (c) detecting the state of the input binary data on the basis of the value checked in step (b), and concluding that the number of bits indicating binary ones contained in the input binary data is equal to or less than (m) when the value checked at step (b) is zero.

The above objects of the present invention are also achieved by a method of processing binary data by a computer to detect a state of the binary data, the method comprising the steps of: a) performing an OR logic operation on the binary data and data obtained by adding binary one to the binary data; b) repeatedly performing the OR logic operation on new binary data obtained by the OR logic operation executed in step a) and data obtained by adding binary one to the new binary data until a result of the OR logic operation executed in step b) becomes −1; c) counting the number of times that the step b) has been repeatedly performed until the result of the OR logic operation becomes −1; and d) detecting the state of the binary data on the basis of the number of times counted by the step c), the number of times counted by the step c) indicating the number of bits indicating binary zeros contained in the binary data.

The above objects of the present invention are achieved by a method of processing binary data by a computer to detect a state of the binary data, the method comprising the steps of: (a) performing (m−1) successive OR operations respectively producing (m−1) successively updated binary data outputs, and comprising: (a−1) performing a first OR operation on the input binary data and data obtained by subtracting binary one from the input binary data, and (a−2) performing each successive OR operation on the binary data output of the respectively next preceding OR operation and binary data obtained by subtracting binary one from the binary data output of the respectively next preceding OR operation, wherein (m) is an integer and is used to determine whether or not the binary data contains a number of binary ones equal to greater than (m); (b) checking a value indicated by the binary data which has been updated (m−1) times; and (c) detecting the state of the input binary data on the basis of the value checked in step (b), and concluding that the number of bits indicating binary ones contained in the input binary data is equal to or greater than (m) when the value checked at step (b) is not −1.

The above objects of the present invention are also achieved by a method of processing binary data by a computer to detect a state of the binary data, the method comprising the steps of: (a) performing (m) successive OR operations respectively producing (m) successively updated binary data outputs, and comprising: (a−1) performing a first OR operation on the input binary data and data obtained by subtracting binary one from the input binary data, and (a−2) performing each successive OR operation on the binary data output of the respectively next preceding OR operation and binary data obtained by subtracting binary one from the binary data output of the respectively next preceding OR operation, wherein m is an integer and is used to determine whether or not the binary data contains a number of binary ones equal to or less than (m); (b) checking a value indicated by the binary data which has been updated (m) times; and (c) detecting the state of the input binary data on the basis of the value checked in step (b), and concluding that the number of bits indicating binary ones contained in the input binary data is equal to or less than m when the value checked at step (b) is −1.

Another object of the present invention is to provide a device using the above data processing method.

This object of the present invention is achieved by a device having a memory in which data write and read operations are controlled by binary data, the device comprising: first means for performing an AND logic operation on the binary data and data obtained by subtracting binary one from the binary data; second means for repeatedly performing the AND logic operation on new binary data obtained by the AND logic operation executed by the first means and data obtained by subtracting binary one from the new binary data until a result of the AND logic operation executed by the second means becomes zero; third means for counting the number of times that the second means has repeatedly performed the AND logic operation until the result of the AND logic operation becomes zero; and fourth means for detecting the state of the binary data on the basis of the number of times counted by the third means, the number of times counted by the third means indicating the number of bits indicating binary ones contained in the binary data, the read and write operations being controlled by the state of the binary data detected by the fourth means.

The above object of the present invention is also achieved by a device having a memory in which data write and read operations are controlled by binary data, the device comprising: to performing means for performing (m–1) successive AND operations respectively producing (m–1) successively updated binary data outputs, further comprising: (a–1) performing a first AND operation on the input binary data and data obtained by subtracting binary one from the input binary data, and (a–2) performing each successive AND operation on the binary data output of the respectively next preceding AND operation and binary data obtained by subtracting binary one from the binary data output of the respectively next preceding AND operation, wherein (m) is an integer and is used to determine whether or not the binary data contains a number of binary ones equal to or greater than (m); checking means for checking a value indicated by the binary data which has been updated (m–1) times; detecting means for detecting the state of the input binary data on the basis of the value checked by the checking means and concluding that the number of bits indicating binary ones contained in the input binary data is equal to or greater than m when the value checked by the checking means is not zero; and the read and write operations being controlled by the state of the binary data detected by the detecting means.

The above object of the present invention is also achieved by a device having a memory in which data write and read operations are controlled by binary data, the device comprising performing means for performing (m) successive AND operations respectively producing (m) successively updated binary data outputs, further comprising: (a–1) performing a first AND operation on the input binary data and data obtained by subtracting binary one from the input binary data, and (a–2) performing each successive AND operation on the binary data output of the respectively next preceding AND operation and binary data obtained by subtracting binary one from the binary data output of the respectively next preceding AND operation, wherein (m) is an integer and is used to determine whether or not the binary data contains a number of binary ones equal to or less than (m); checking means for checking a value indicated by the binary data which has been updated (m) times; and detecting means for detecting the state of the input binary data on the basis of the value checked by the checking means and concluding that the number of bits indicating binary ones contained in the input binary data is equal to or less than (m) when the value checked by the checking means is zero; and the read and write operations being controlled by the state of the binary data detected by the detecting means.

The above object of the present invention is also achieved by a device having a memory in which data write and read operations are controlled by binary data, the device comprising: first means for performing an OR logic operation on the binary data and data obtained by adding binary one to the binary data; second means for repeatedly performing the OR logic operation on new binary data obtained by the OR logic operation executed by the performing means for performing (m–1) successive OR operations respectively producing (m–1) successively updated binary data outputs, further comprising: (a–1) performing a first OR operation on the input binary data and data obtained by subtracting binary one from the input binary data, and (a–2) performing each successive OR operation on the binary data output of the respectively next preceding OR operation and binary data obtained by subtracting binary one from the binary data output of the respectively next preceding OR operation, wherein (m) is an integer and is used to determine whether or not the binary data contains a number of binary ones equal to greater than (m); checking means for checking a value indicated by the binary data which has been updated (m–1) times; detecting means for detecting the state of the input binary data on the basis of the value checked by the checking means and concluding that the number of bits indicating binary ones contained in the input binary data is equal to or greater than (m) when the value checked by the checking means is not –1; and the read and write operations being controlled by the state of the binary data detected by the detecting means.

The above object of the present invention is also achieved by a device having a memory in which data write and read operations are controlled by binary data, the device comprising: first means for performing an OR logic operation on the binary data and data obtained by adding binary one to the binary data; second means for repeatedly performing, (m–1) times, the OR logic operation on new binary data obtained by the OR logic operation executed by the first means and data obtained by adding binary one to the new binary data, m being an integer and being used to determine whether or not the number of bits indicating binary zeros contained in the binary data is equal to or greater than m; third means for checking the value of the new binary data obtained when the second means has repeatedly performed the OR logic operation (m–1) times; and fourth means for detecting the state of the binary data on the basis of the value of the new binary data obtained by the third means so that it is concluded that the number of bits indicating binary zeros contained in the binary data is equal to or greater than m when the value of the new binary data obtained by the third means is not –1, the read and write operations being controlled by the state of the binary data detected by the fourth means.

The above object of the present invention is also achieved by a device having a memory in which data write and read operations are controlled by binary data, the device comprising: performing means for performing (m) successive OR operations respectively producing (m) successively updated binary data outputs, further comprising: (a–1) performing a first OR operation on the input binary data and data obtained by subtracting binary one from the input binary data, and (a–2) performing each successive OR operation on the binary data output of the respectively next preceding OR operation and binary data obtained by subtracting binary one from the binary data output of the respectively next preceding OR operation, wherein m is an integer and is used to determine whether or not the binary data contains a number of binary ones equal to or less than (m); checking means for checking a value indicated by the binary data which has been updated (m) times; detecting means for detecting the state of the input binary data on the basis of the value checked by the checking means and concluding that the number of bits indicating binary ones contained in the input binary data is equal to or less than m when the value checked by the checking means is –1; and the read and write operations being controlled by the state of the binary data detected by the detecting means.

BRIEF DESCRIPTION OF THE DRAWINGS

Other objects, features and advantages of the present invention will become more apparent from the following detailed description when read in conjunction with the accompanying drawings in which:

FIG. 6 is a diagram showing how data is processed by the method shown in FIG. 5;

FIG. 8 is a diagram showing how data is processed by the method shown in FIG. 7;

FIG. 10 is a diagram showing how data is processed by the method shown in FIG. 9;

FIG. 12 is a diagram showing how data is processed by the method shown in FIG. 11;

FIG. 14 is a diagram showing how data is processed by the method shown in FIG. 13;

FIG. 16 is a diagram showing how data is processed by the method shown in FIG. 15;

FIG. 18 is a diagram showing how data is processed by the method shown in FIG. 17;

FIG. 22B is a diagram showing how data is processed by the second embodiment shown in FIG. 22A;

FIG. 23B is a diagram showing how data is processed by the third embodiment shown in FIG. 23A;

FIG. 24B is a diagram showing how data is processed by the fourth embodiment shown in FIG. 24A;

FIG. 26B is a diagram showing how data is processed by the sixth embodiment shown in FIG. 26A;

FIG. 27B is a diagram showing how data is processed by the seventh embodiment shown in FIG. 27A;

FIG. 28B is a diagram showing how data is processed by the eighth embodiment shown in FIG. 28A;

FIG. 32 is a diagram showing how data is processed in the first application shown in FIG. 31;

FIG. 34 is a diagram showing how data is processed in the second application shown in FIG. 33;

FIG. 36 is a diagram showing how data is processed in the third application shown in FIG. 35;

FIG. 38 is a diagram showing how data is processed in the fourth application shown in FIG. 37.

DESCRIPTION OF THE PREFERRED EMBODIMENTS

FIGS. 19A, 19B, 19C and 19D show overviews of first, second, third and fourth embodiments of the present invention, respectively.

Figure 1:
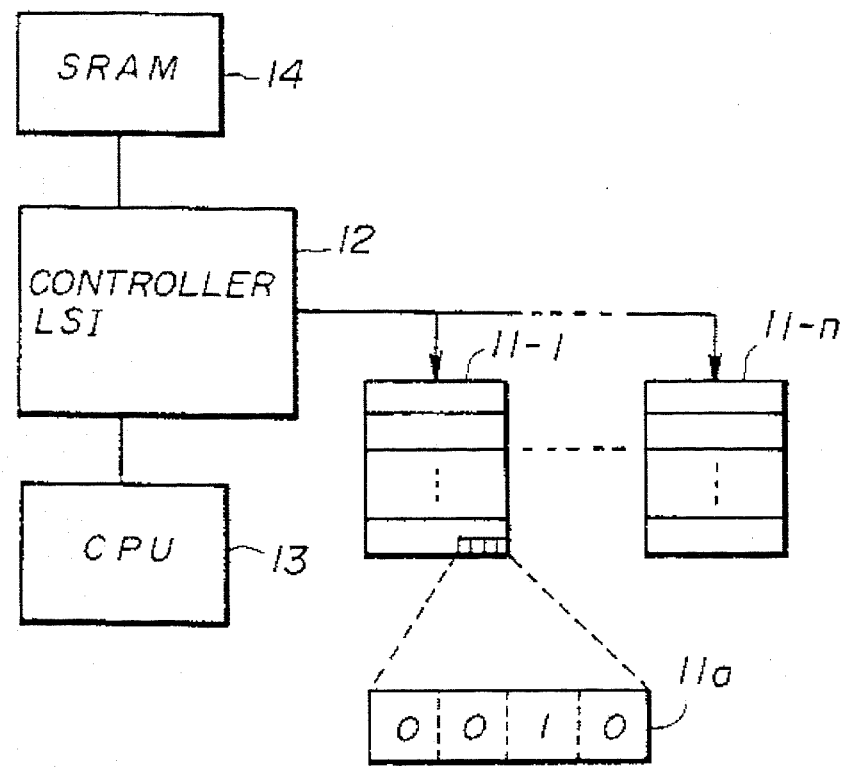
FIG. 1 is a block diagram of a conventional device having a memory.
Figure 2:
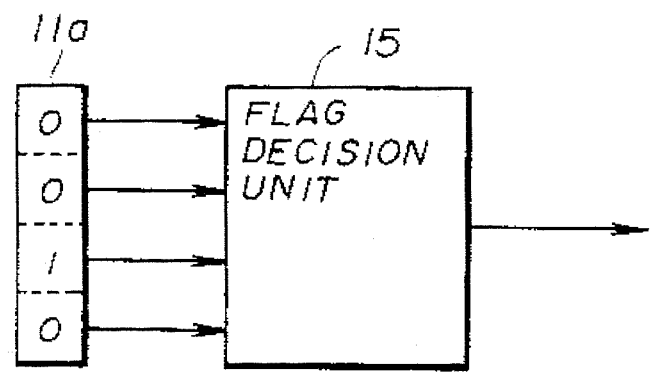
FIG. 2 is a block diagram of a function realized by a CPU shown in FIG. 1.
Figure 3:
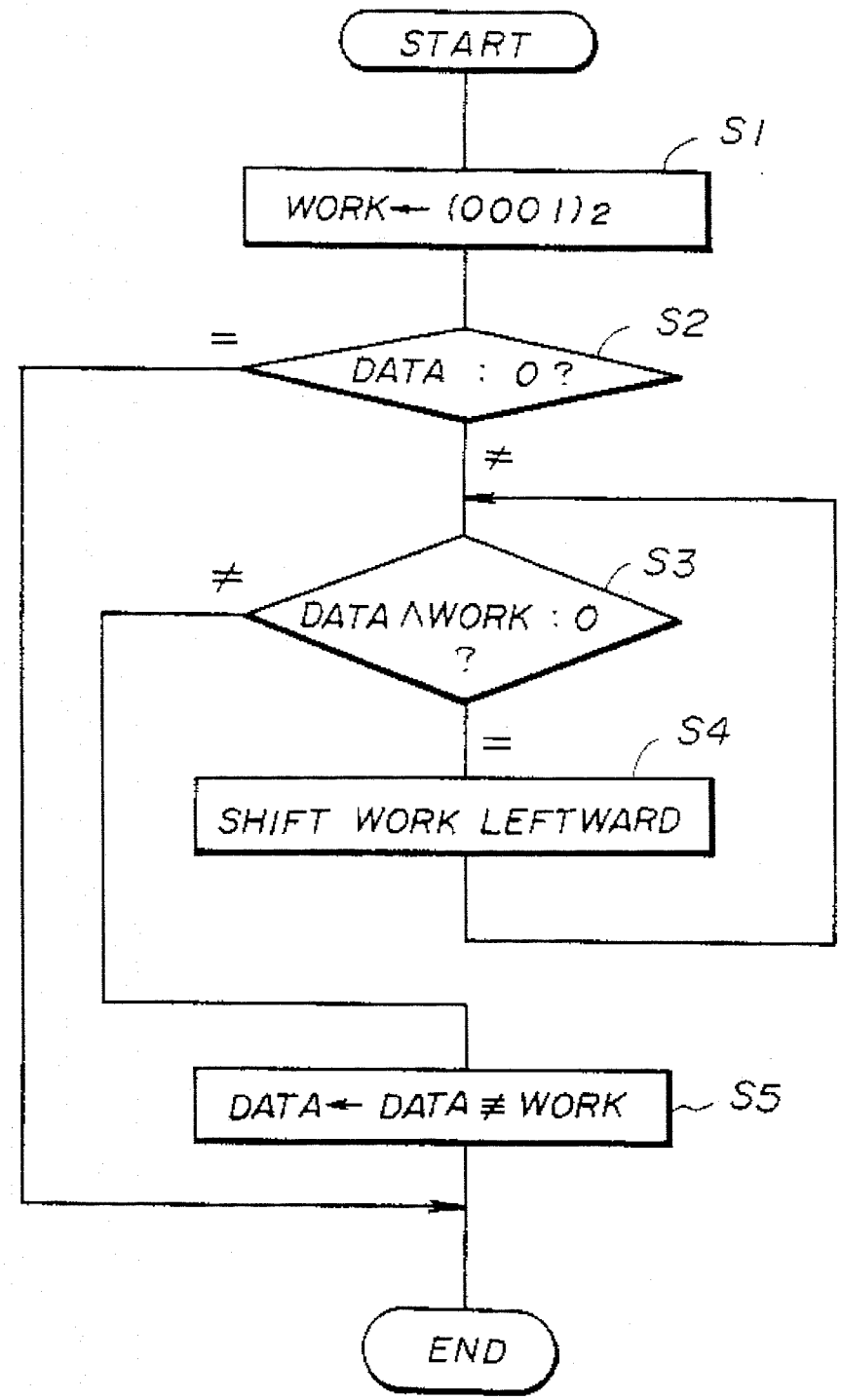
FIG. 3 is a flowchart of a first conventional data processing method used in the device shown in FIG. 1.
Figure 4:
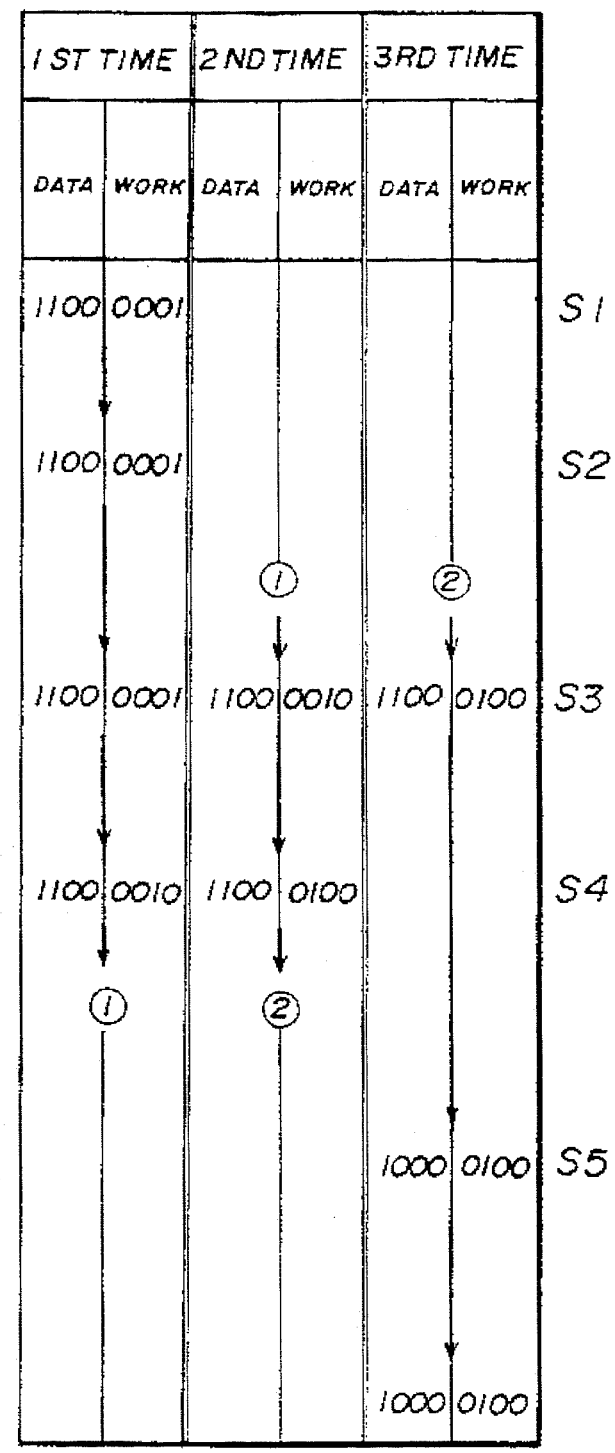
FIG. 4 is a diagram showing how data is processed by the method shown in FIG. 3.
Figure 5:
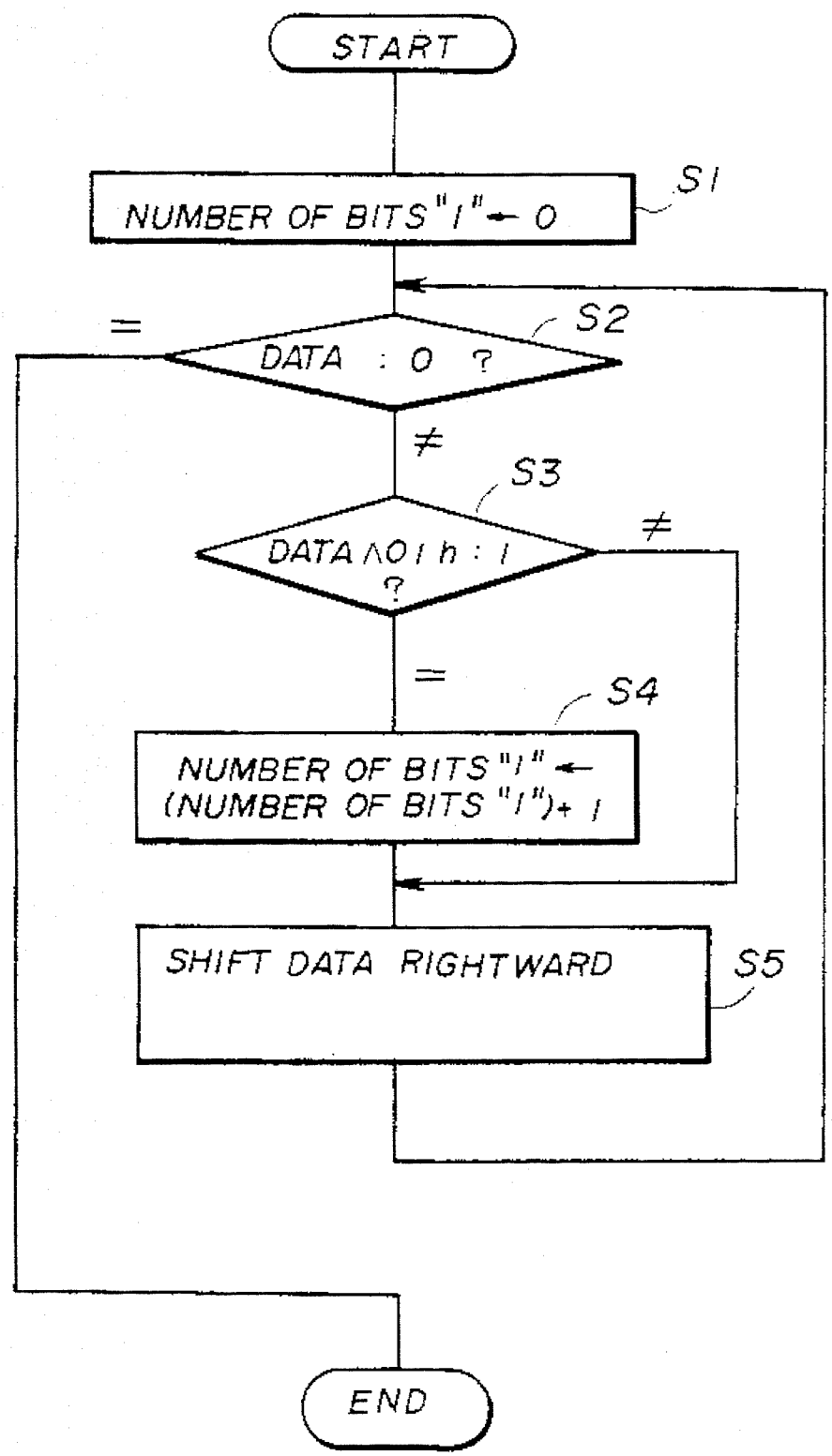
FIG. 5 is a flowchart of a second conventional data processing method used in the device shown in FIG. 1.
Figure 7:
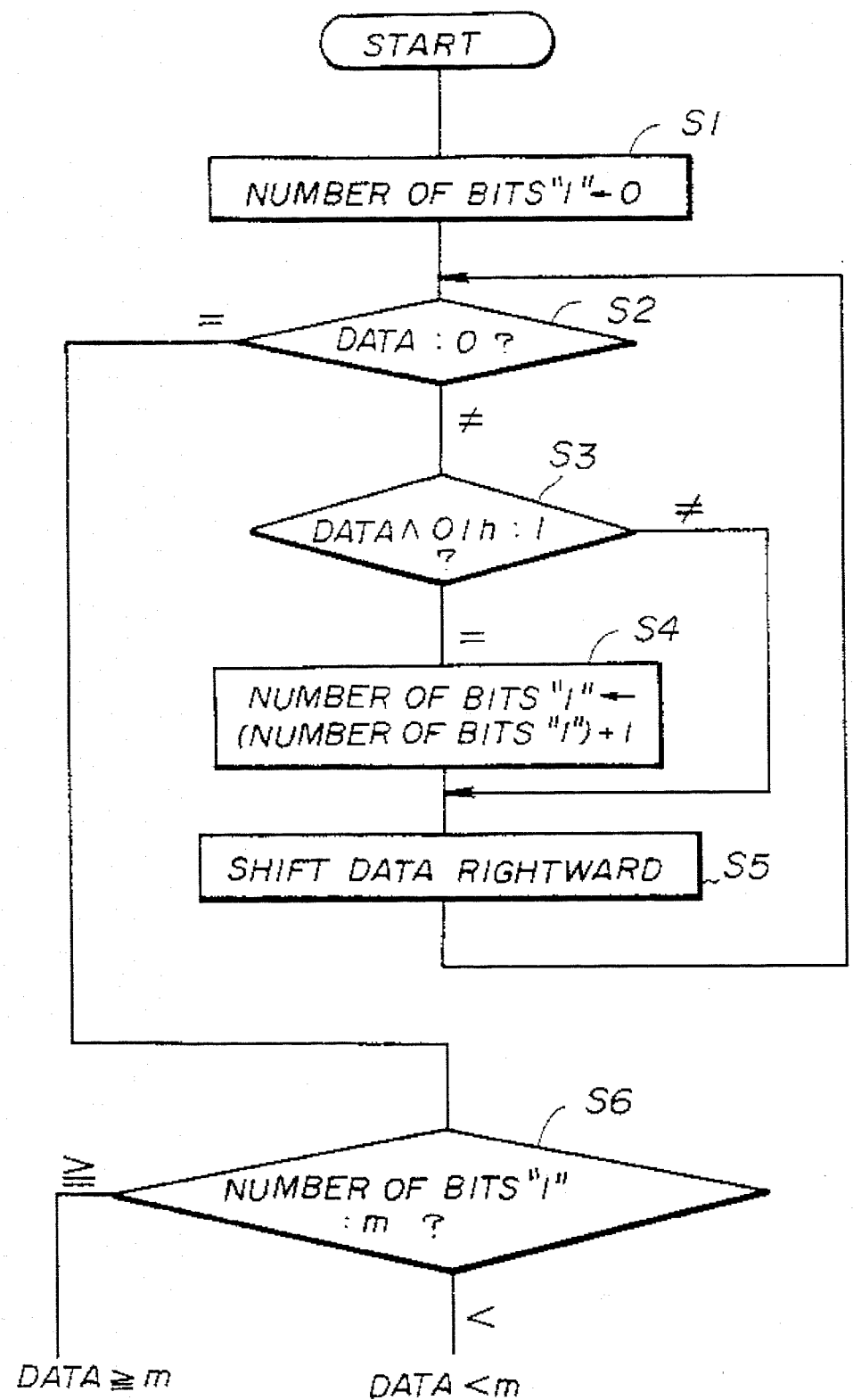
FIG. 7 is a flowchart of a third conventional data processing method used in the device shown in FIG. 1.
Figure 9:
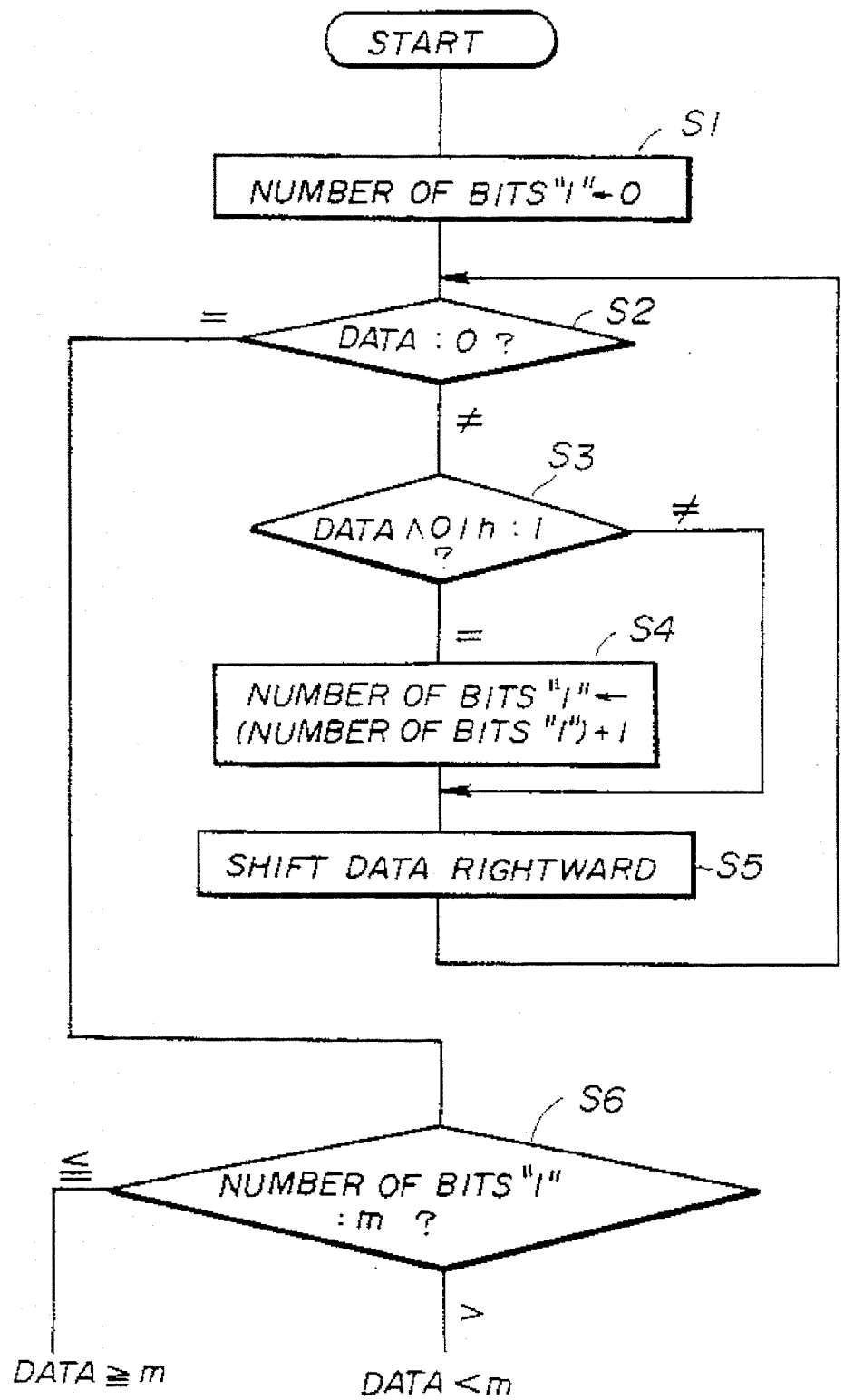
FIG. 9 is a flowchart of a fourth conventional data processing method used in the device shown in FIG. 1.
Figure 11:
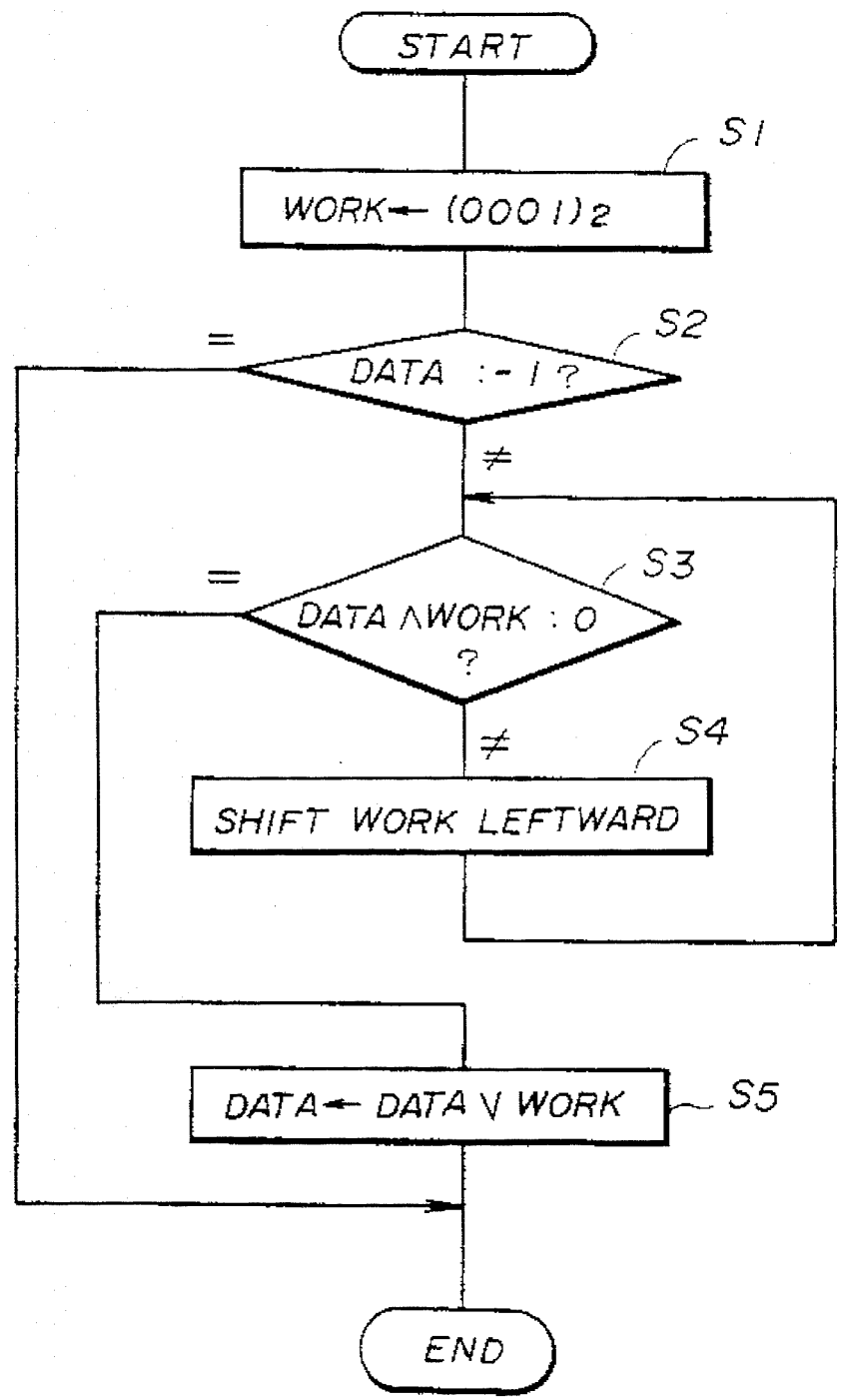
FIG. 11 is a flowchart of a fifth conventional data processing method used in the device shown in FIG. 1.
Figure 13:
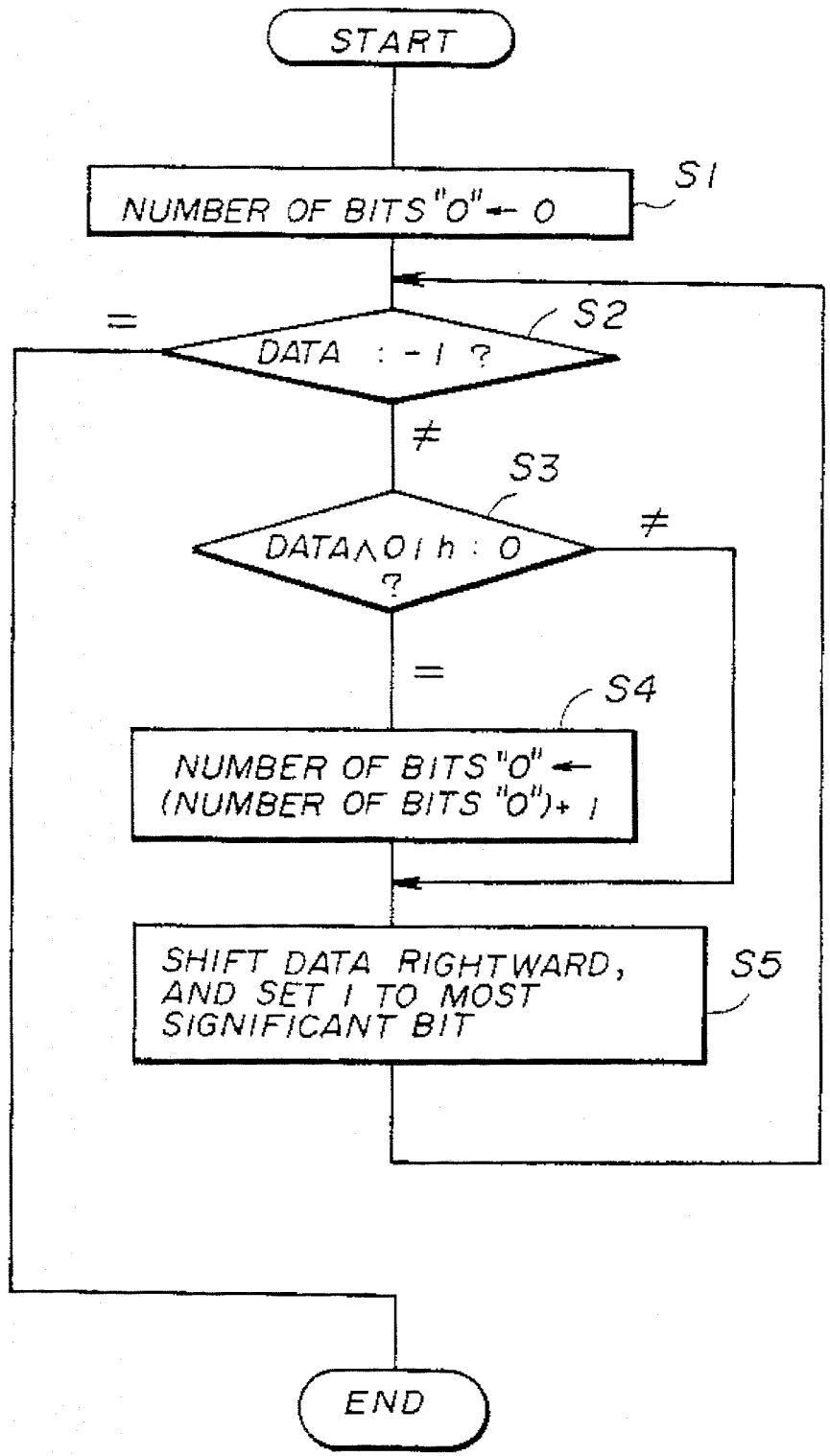
FIG. 13 is a flowchart of a sixth conventional data processing method used in the device shown in FIG. 1.
Figure 15:
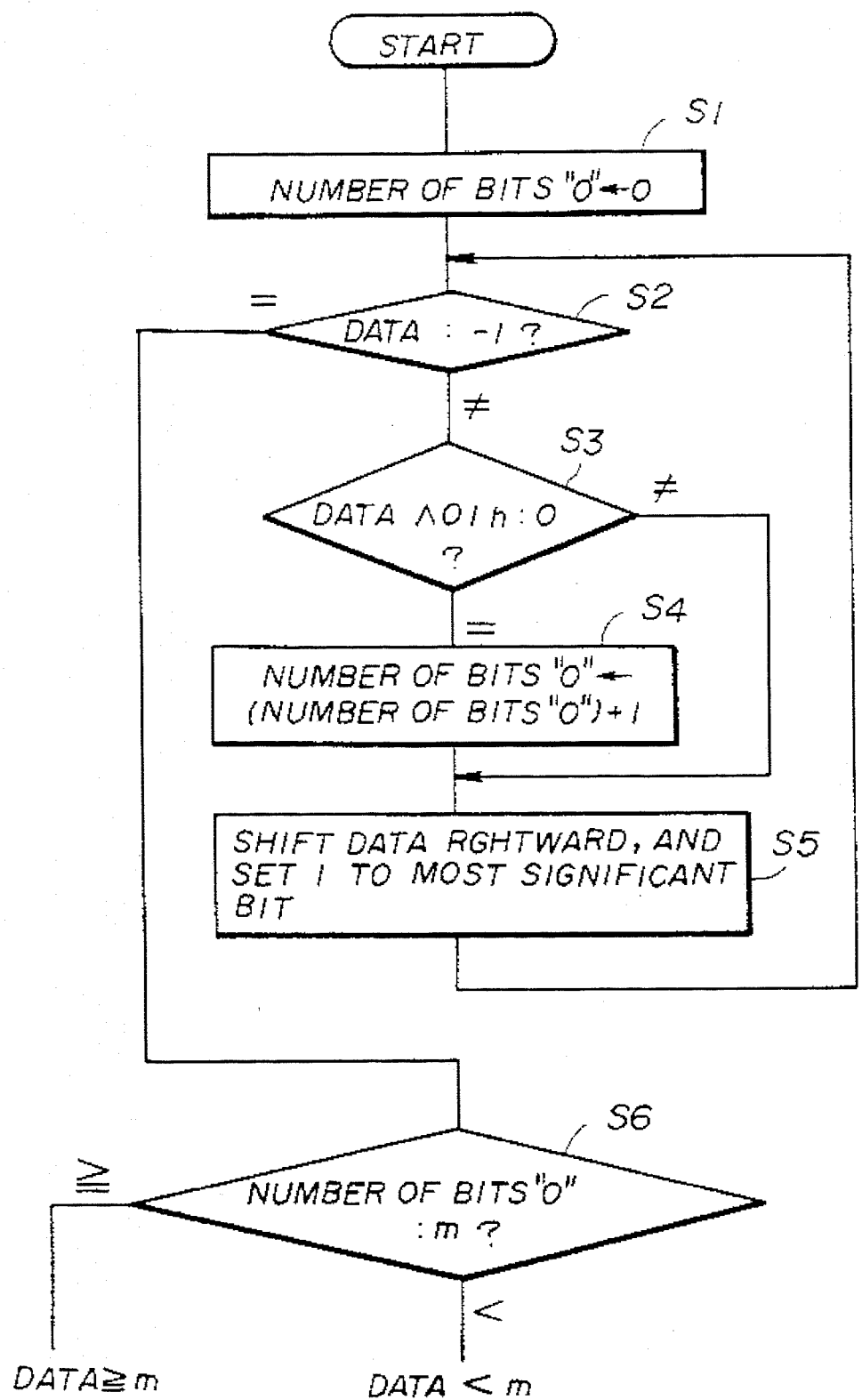
FIG. 15 is a flowchart of a seventh conventional data processing method used in the device shown in FIG. 1.
Figure 17:
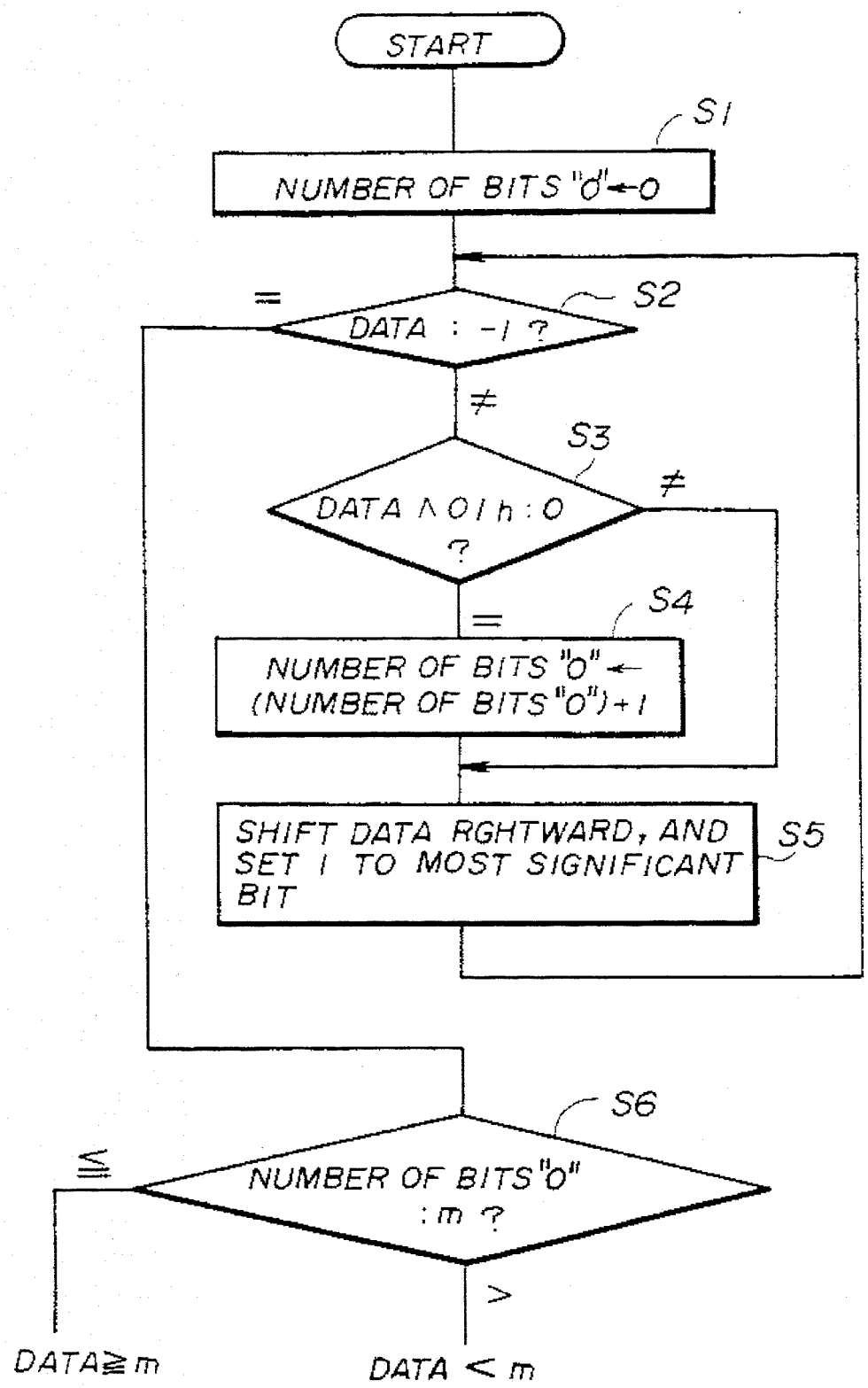
FIG. 17 is a flowchart of an eighth conventional data processing method used in the device shown in FIG. 1.
Figure 19B:
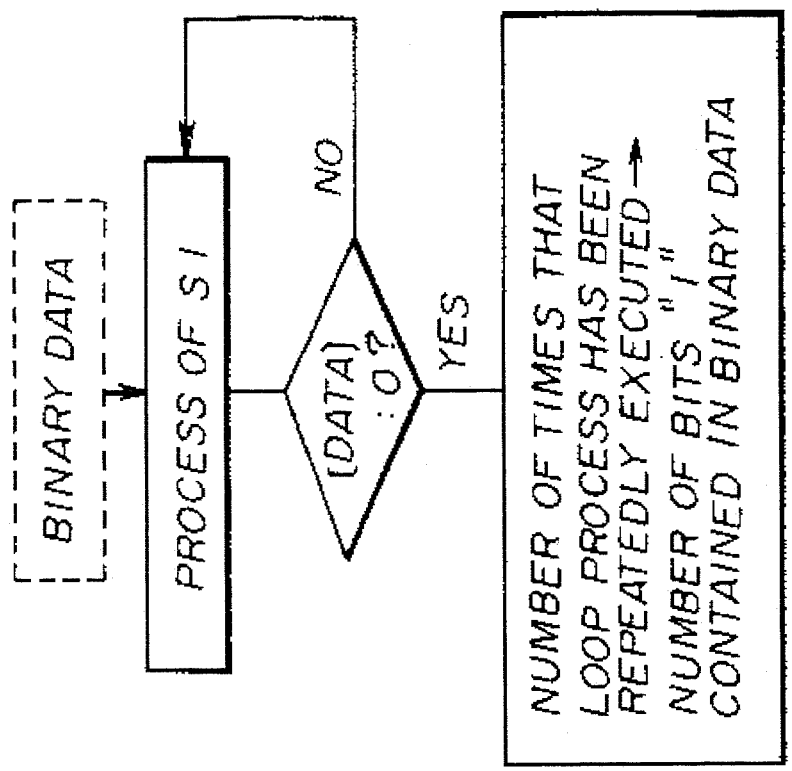
FIG. 19B is a flowchart of an overview of a second embodiment of the present invention.
Figure 19A:
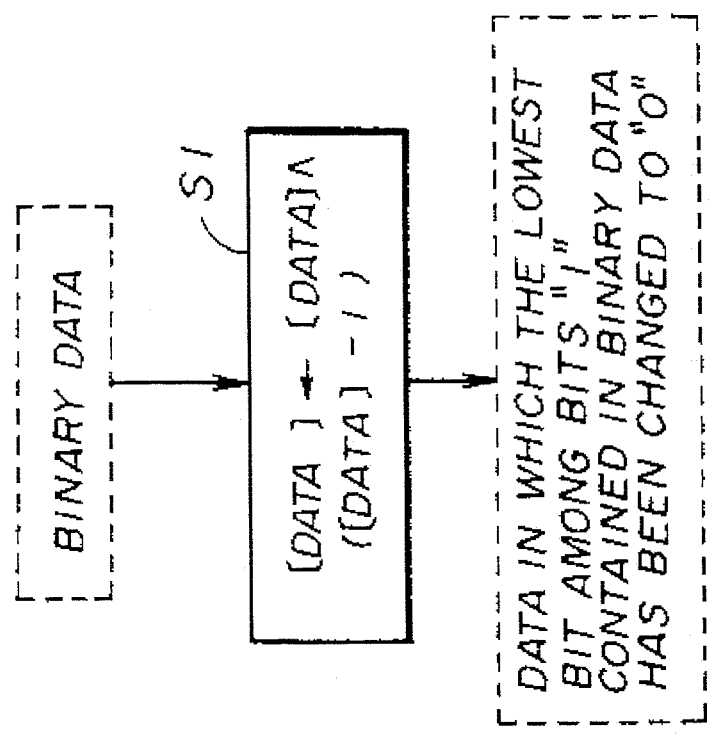
FIG. 19A is a flowchart of an overview of a first embodiment of the present invention.

In FIG. 19A, an AND logic operation on binary input data to be processed and data obtained by subtracting 1 from the input data is executed in step S1. Then, the new data obtained by executing the AND logic operation is processed so that the lowest bit of the new data, among bits indicating "1", is changed to "0".

In FIG. 19B, step S1 shown in FIG. 19A is repeatedly carried out until the result of the AND logic operation on the first data and the previous result of the AND logic operation becomes zero. Then, the number of bits indicating "1" contained in the binary input data is obtained from the number of times that step S1 has been repeatedly executed until the result of step S1 becomes zero.

Figure 19D:
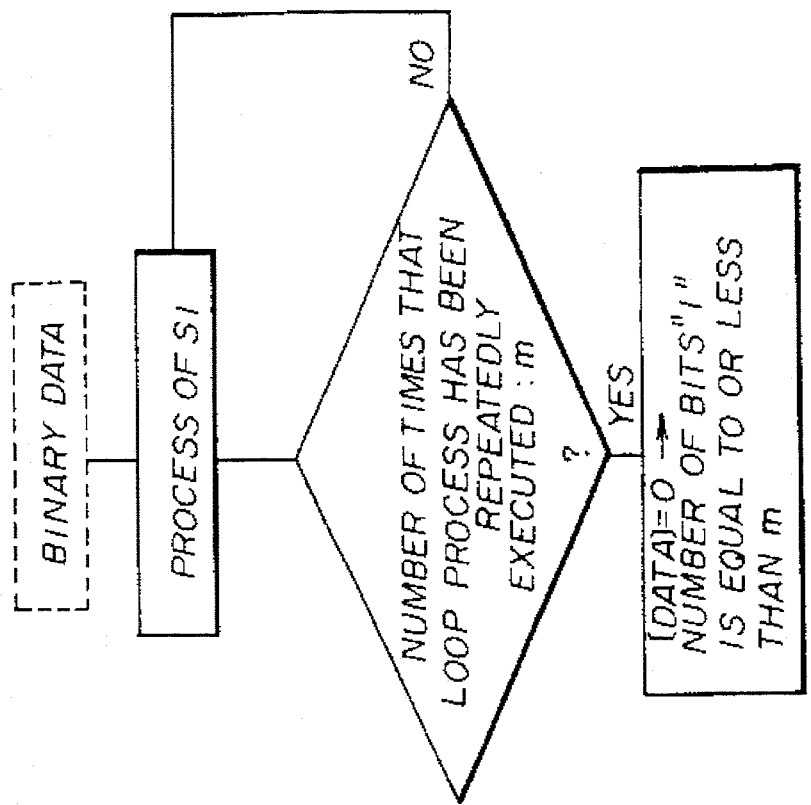
FIG. 19D is a flowchart of an overview of a fourth embodiment of the present invention.
Figure 19C:
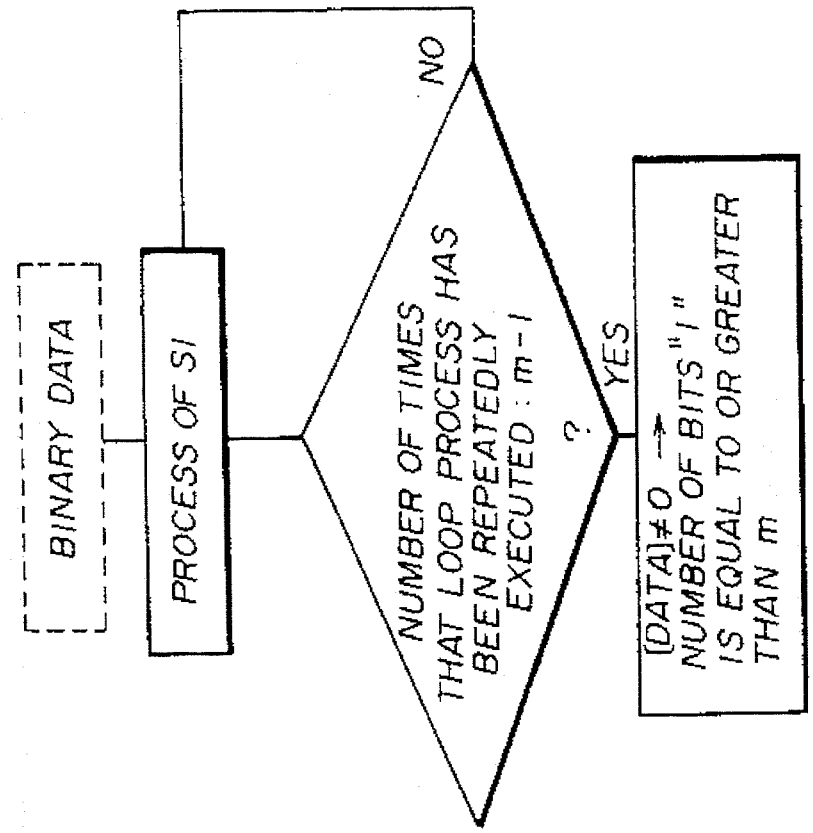
FIG. 19C is a flowchart of an overview of a third embodiment of the present invention.

FIG. 19C shows a method for determining whether or not the number of bits indicating "1" contained in the binary input data is equal to or greater than m. The step S1 shown in FIG. 19A is executed (m–1) times. It can be determined that the number of bits indicating "1" contained in the binary input data is equal to or greater than m when the result of the AND logic operation in step S1, which has been repeatedly executed (m–1) times, is not zero.

FIG. 19D shows a method for determining whether or not the number of bits indicating "1" contained in the binary input data is equal or to less than m. The step S1 shown in FIG. 19A is executed m times. It can be determined that the number of bits indicating "1" contained in the binary input data is equal to or less than m when the result of the AND logic operation in step S1, which has been repeatedly executed m times, is zero.

FIGS. 20A, 20B, 20C and 20D show overviews of fifth, sixth, seventh and eighth embodiments of the present invention.

Figure 20A:
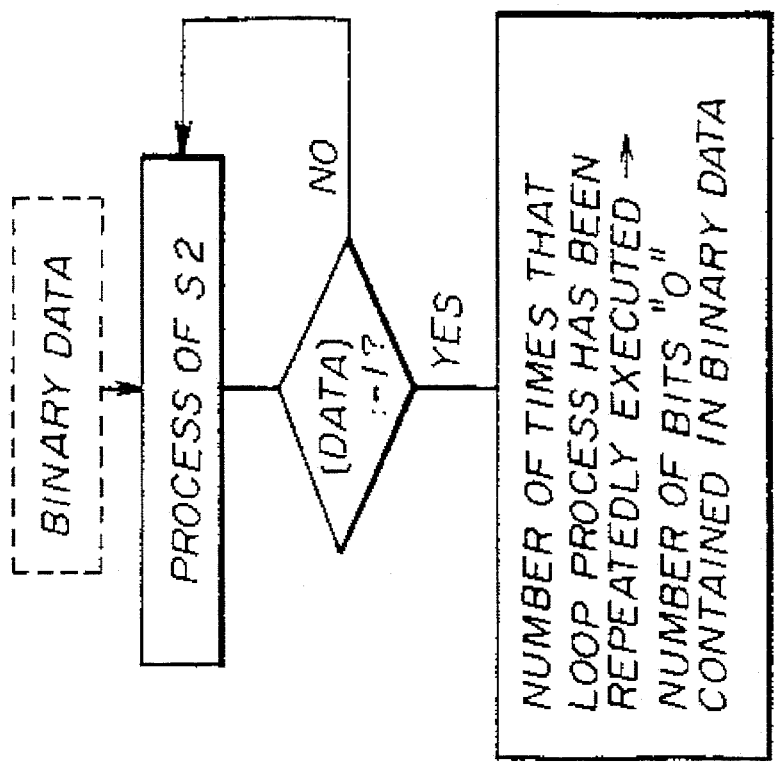
FIG. 20A is a flowchart of an overview of a fifth embodiment of the present invention.

In FIG. 20A, an OR logic operation on binary input data to be processed and data obtained by adding 1 to the input data is executed in step S2. Then, the new data obtained by executing the OR logic operation is processed so that the lowest bit of the new data, among bits indicating "0", is changed to "1".

Figure 20B:
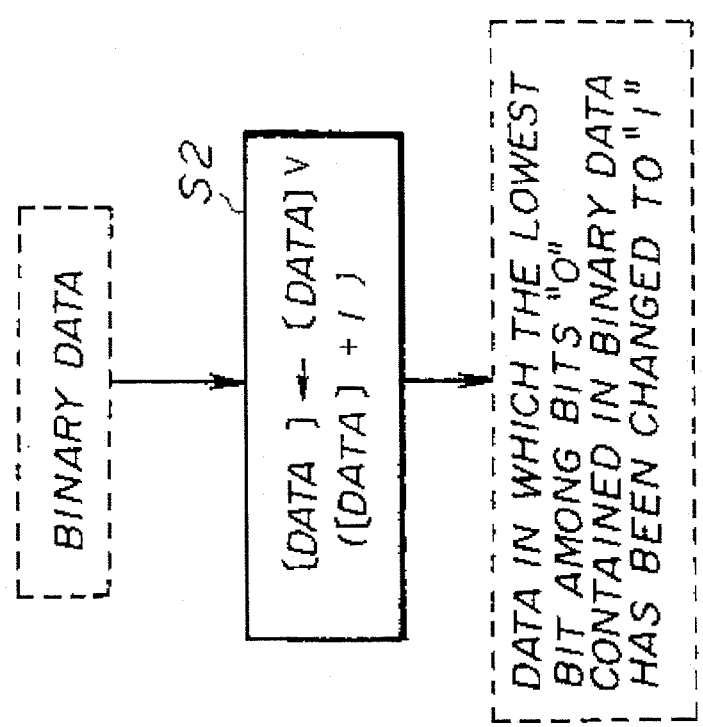
FIG. 20B is a flowchart of an overview of a sixth embodiment of the present invention.

In FIG. 20B, step S2 shown in FIG. 20A is repeatedly carried out until the result of the OR logic operation on the first data and the previous result of the OR logic operation becomes equal to –1. Then, the number of bits indicating "0" contained in the binary input data is obtained from the number of times that step S2 has been repeatedly executed until the result of step S2 becomes equal to –1.

Figure 20D:
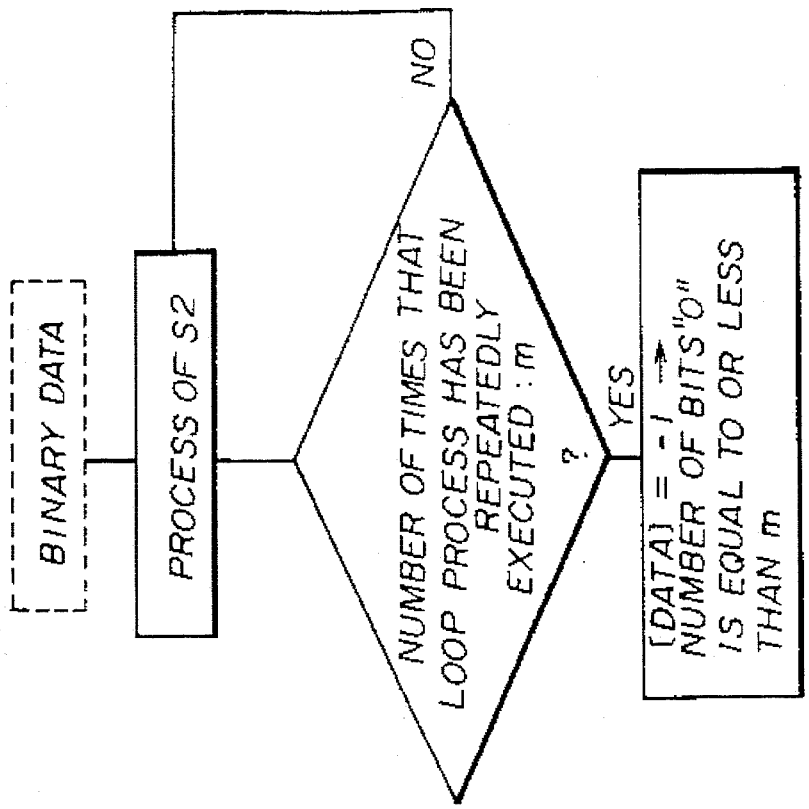
FIG. 20D is a flowchart of an overview of an eighth embodiment of the present invention.
Figure 20C:
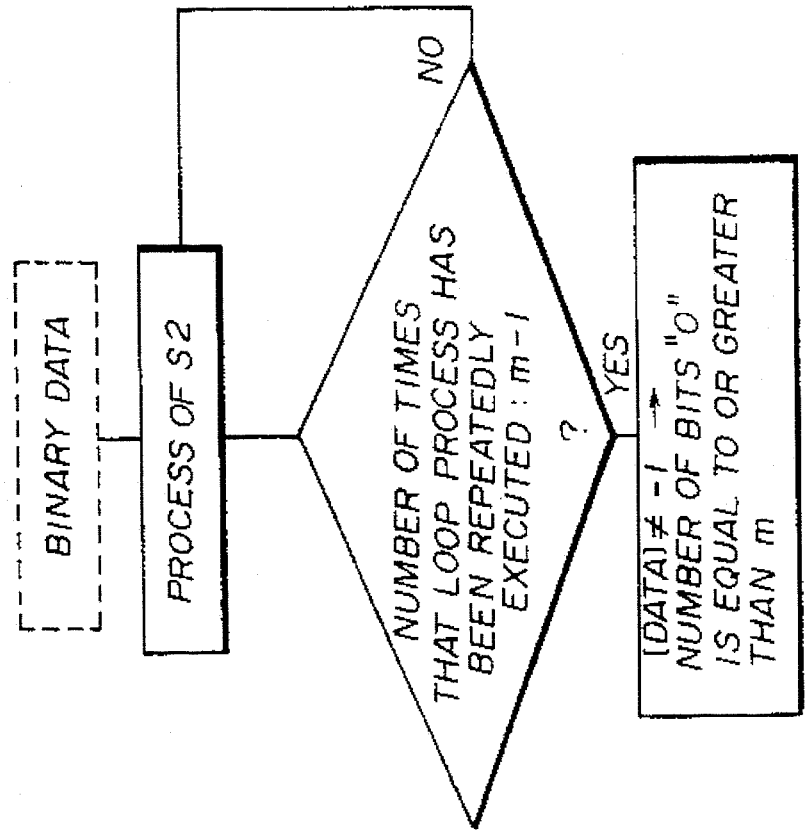
FIG. 20C is a flowchart of an overview of a seventh embodiment of the present invention.

FIG. 20C shows a method for determining whether or not the number of bits indicating "0" contained in the binary input data is equal to or greater than m. The step S2 shown in FIG. 20A is executed (m–1) times. It can be determined that the number of bits indicating "0" contained in the binary input data is equal to or greater than m when the result of the OR logic operation in step S2, which has been repeatedly executed (m–1) times, is not –1.

FIG. 20D shows a method for determining whether or not the number of bits indicating "0" contained in the binary input data is equal to less than m. The step S2 shown in FIG. 20A is executed m times. It can be determined that the number of bits indicating "0" contained in the binary input data is equal to or less than m when the result of the OR logic operation in step S2 which has been repeatedly executed m times is –1.

According to the first embodiment of the present invention, it is possible to change the lowest bit of the input data, among bits indicating "1" to "0", by calculating the AND logic operation between the input data and data obtained by subtracting "1" from the input data. Then, by repeatedly performing the above AND logic operation until the input data becomes zero, it is possible to obtain the number of bits indicating "1", contained in the input data, from the number of times that the AND logic operation was repeatedly performed (second embodiment). Further, by repeatedly performing the AND logic operation (m–1) or m times and checking the data thus obtained, it is possible to determine whether or not the number of bits indicating "1" contained in the input data is equal to or greater than m (third embodiment) and determine whether or not the number of bits indicating "1" contained in the input data is equal to or less than m (fourth embodiment).

According to the fifth embodiment of the present invention, it is possible to change the lowest bit of the input data, among bits indicating "0" to "1" (fifth embodiment), by calculating the OR logic operation between the input data and data obtained by adding "1" to the input data. Then, by repeatedly performing the above OR logic operation until the input data becomes –1, it is possible to obtain the number of bits indicating "0" contained in the input data from the number of times that the OR logic operation was repeatedly performed (sixth embodiment). Further, by repeatedly performing the OR logic operation (m–1) or m times and checking the data thus obtained, it is possible to determine whether or not the number of bits indicating "0" contained in the input data is equal to or greater than m (seventh embodiment) and determine whether or not the number of bits indicating "0" contained in the input data, is equal to or less than m (fourth embodiment).

According to the first through eighth embodiments of the present invention, it becomes possible to efficiently perform the respective data processes in a reduced time without being affected by the length of data to be processed. Particularly, the number of bits indicating "0" or "1" can be obtained by performing the loop process only i times where i is the number of bits indicating "1" or "0" contained in the data to be processed. That is, the method for obtaining the number of bits indicating "1" or "0" contained in the data to be processed is independent of the number of bits contained in the data. Hence, the time necessary to execute the data processes does not increase as the data length becomes longer.

Figure 21A:
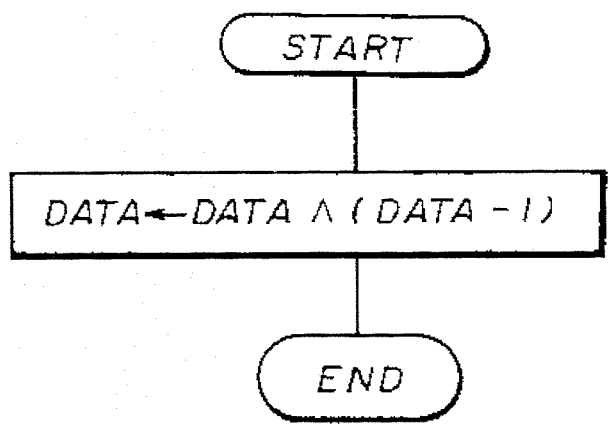
FIG. 21A is a flowchart of the first embodiment of the present invention.
Figure 21B:
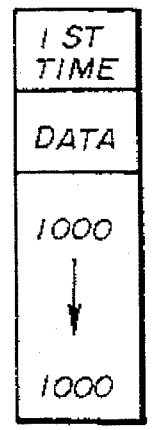
FIG. 21B is a diagram showing how data is processed by the first embodiment shown in FIG. 21A.

FIGS. 21A and 21B show the first embodiment of the present invention in which the lowest bit (n), among bits indicating "1" contained in N-bit data, is changed to "0". FIG. 21A is a flowchart of the first embodiment, and FIG. 21B is a diagram showing how data is processed by the first embodiment. The N-bit data processed in FIGS. 21A and 21B is $(1100)_2$ (N=4). The AND logic operation, on the input data and data obtained by subtracting 1 from the input data, is executed. That is, the AND logic operation on the input data $(1100)_2$ and data $(1011)_2$ obtained by subtracting 1 from data $(1100)_2$ is executed. The result of the AND logic operation is $(1000)_2$. It can be seen from the above that the lowest bit, among the third and fourth bits indicating "1" contained in the input data, is changed to "0" by only one step.

Figure 22A:
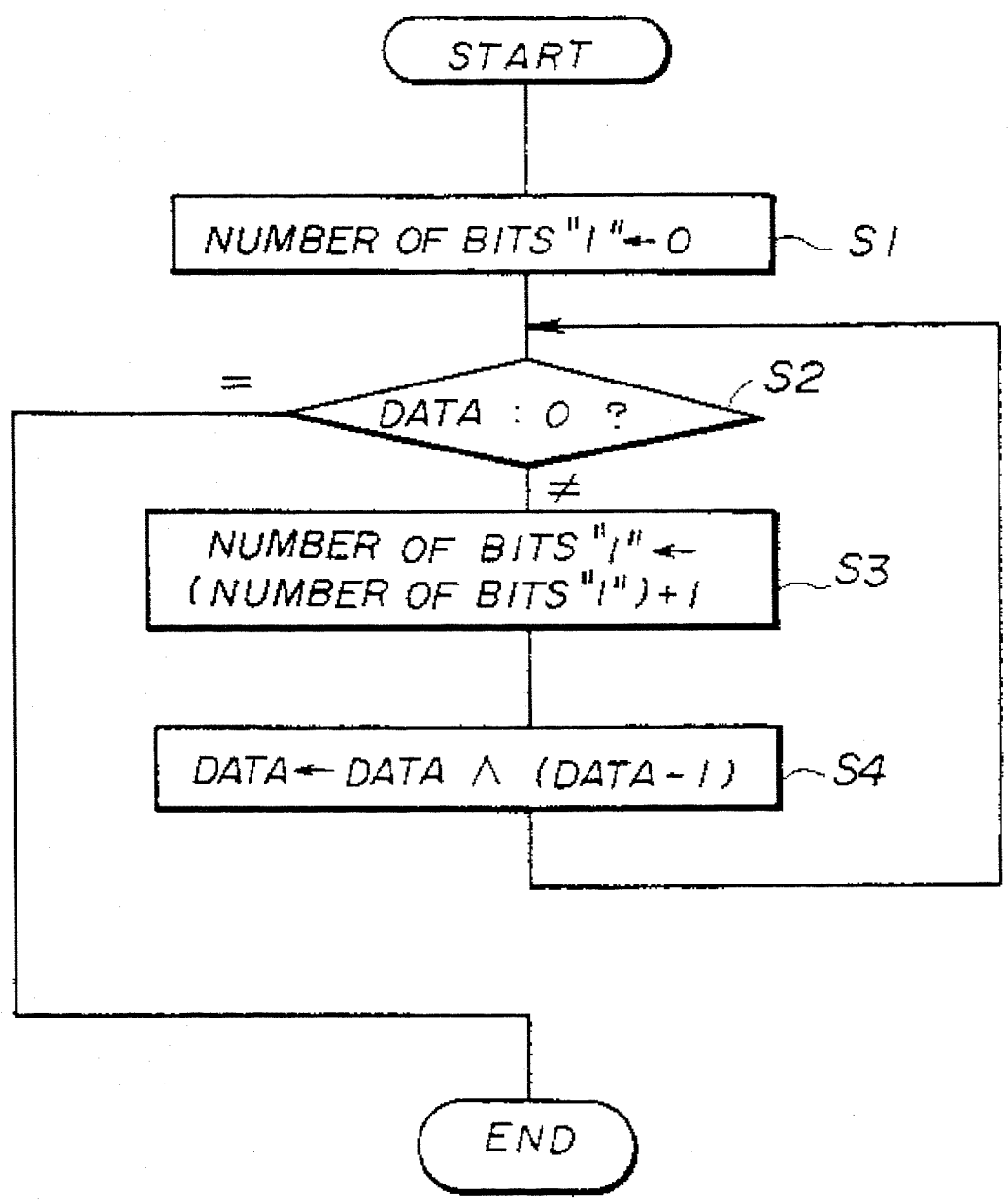
FIG. 22A is a flowchart of the second embodiment of the present invention.

FIGS. 22A and 22B show the second embodiment of the present invention in which the number (n) of bits indicating "1" contained in N-bit data is counted. FIG. 22A is a flowchart of the second embodiment, and FIG. 22B shows how data is processed by the second embodiment. The N-bit data shown in FIGS. 22A and 22B is $(1001)_2$ (N=4).

In step S1 shown in FIGS. 22A and 22B, the variable indicating the number of bits indicating "1"is set to zero. In step S2, it is determined whether or not the data being processed is zero. When it is determined that the data is zero, the process is ended. When it is determined in step S2 that the data is not zero, the value of the variable is incremented by 1 in step S3. Then in step S4, the AND logic operation on the data being processed and data obtained by subtracting 1 therefrom is calculated, and it is determined, in step S2, whether or not the result of the AND logic operation is zero. The above process is repeatedly performed until it is determined in step S2 that the data being processed is zero.

When input data $(1001)_2$ is processed, the AND logic operation on $(1001)_2$ and $(1000)_2$ is calculated by the first execution of the loop consisting of steps S2–S4 The resultant data of the AND logic operation is $(1000)_2$, and the variable indicating the number of bits "1" indicates 1. By the second execution of the loop containing the AND logic operation, the resultant data is $(0000)_2$ and the variable indicates 2. Then, the process is ended by the third execution of step S2. As described above, according to the second embodiment, it becomes possible to count the number (n) of bits indicating "1" by detecting how many times the loop consisting of the steps S2–S4 has been repeatedly executed.

Figure 23A:
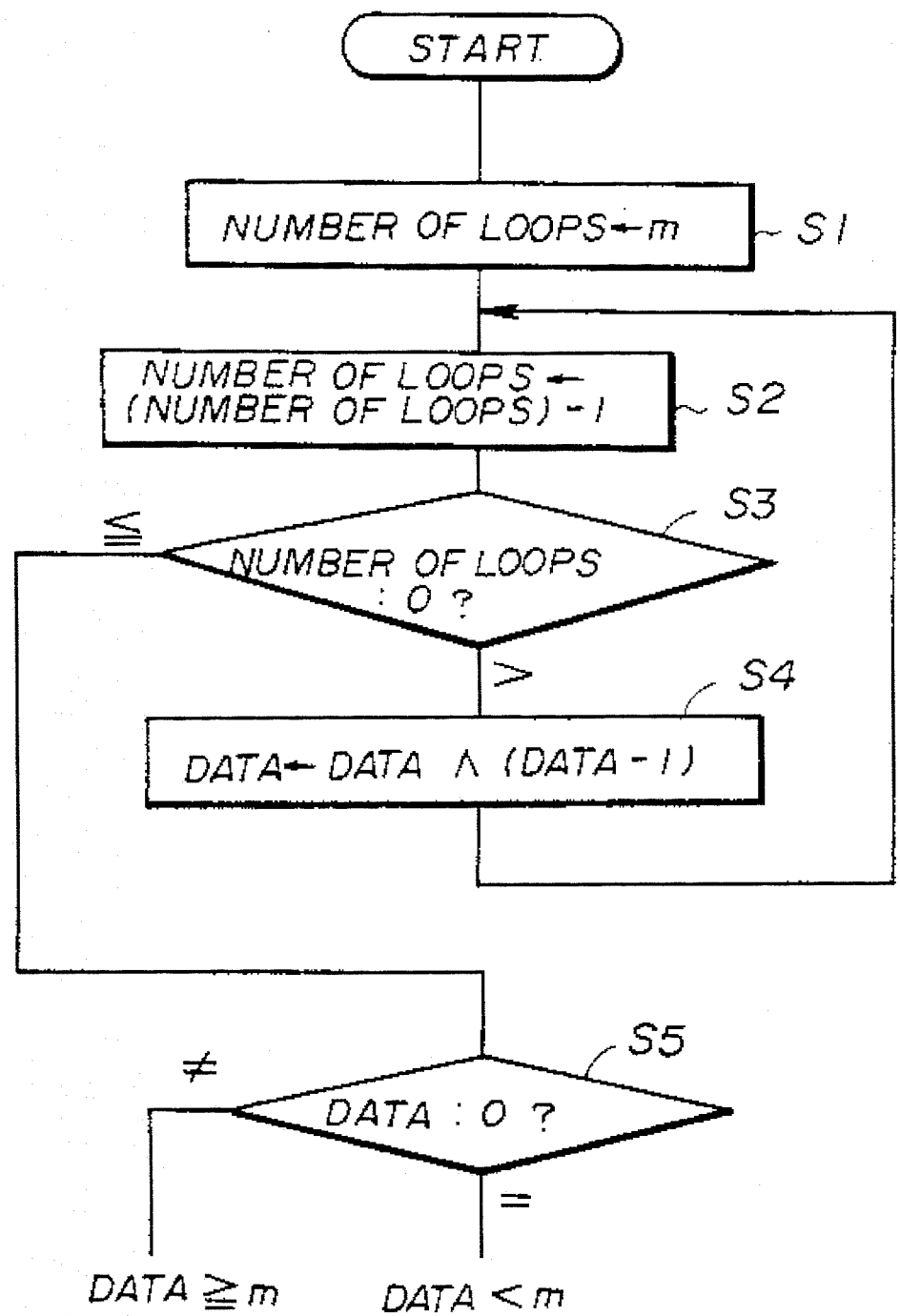
FIG. 23A is a flowchart of the third embodiment of the present invention.

FIGS. 23A and 23B show the third embodiment of the present invention in which it is determined whether or not the number (n) of bits indicating "1" contained in N-bit data is equal to or greater than m.

FIG. 23A is a flowchart of the third embodiment, and FIG. 23B shows how data is processed by the third embodiment. The N-bit data shown in FIGS. 23A and 23B is $(1001)_4$ (N=4), and m=3.

In step S1 shown in FIGS. 23A and 23B, the variable indicating the number of loops is set to m. In step S2, the value of the variable is decremented by 1. In step S3, the value of the variable obtained in step S2 is compared with 0. When it is determined in step S3 that the value of the variable is equal to or less than zero, step S5 is executed. When it is determined in step S3 that the value of the variable is greater than zero, the AND logic operation on the data and data obtained by subtracting 1 therefrom is calculated. Then, the process returns to step S2.

When it is determined in step S3 that the variable indicates zero, step S5 is executed in which it is determined whether or not the resultant data obtained in step S4 is zero. When it is determined that the resultant data obtained in step S4 is not zero, it is concluded that the number of bits indicating "1" contained in the data is equal to or greater than m. When it is determined that the resultant data is zero, it is concluded that the number of bits indicating "1" is not equal to or greater than m.

Figure 24A:
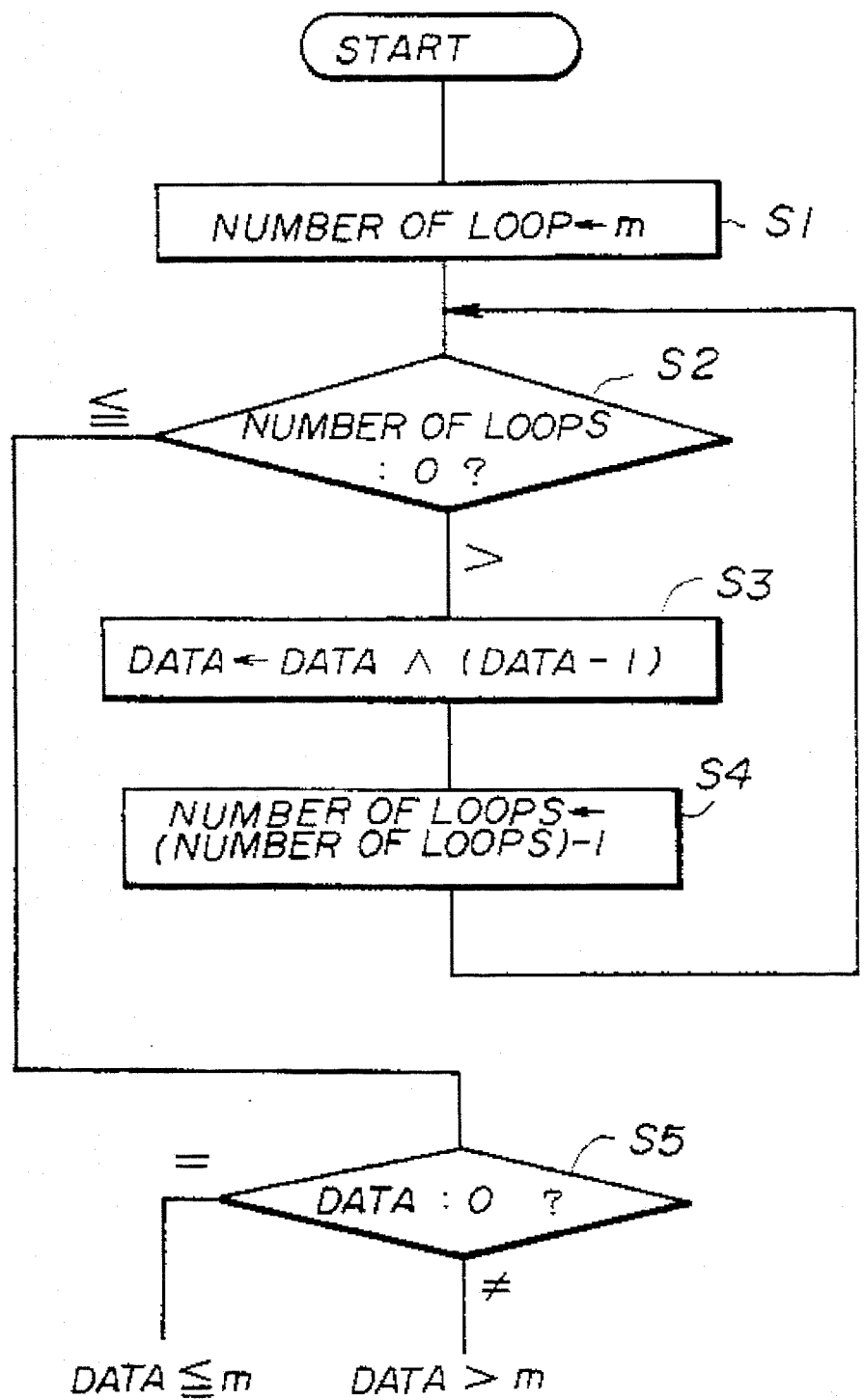
FIG. 24A is a flowchart of the fourth embodiment of the present invention.

When data $(1001)_2$ is processed, the AND logic operation on $(1001)_2$ and $(1000)_2$ generates data $(1000)_2$ by the first execution of the loop consisting of the steps S2–S4, and the number of loops becomes 2. The resultant data obtained by the second execution of the loop is $(0000)_2$ and the number of loops becomes one. In the third execution of step S3, the number of loops is zero and the resultant data is $(0000)_2$. As a result, it is concluded that the number of bits indicating "1" is less than m (=3). FIGS. 24A and 24B show the fourth embodiment of the present invention in which it is determined whether or not the number (n) of bits indicating "1" contained in N-bit data is equal to or less than m. FIG. 24A shows a flowchart of the fourth embodiment, and FIG. 24B shows how data is processed by the fourth embodiment. The N-bit data shown in FIGS. 24A and 24B is $(1001)_2$ (N=4), and m=3.

The process shown in FIG. 24A is the same as that of the third embodiment shown in FIG. 23A except that the process of step S2 shown in FIG. 24A is executed before step S3. When data $(1001)_2$ is processed, the AND logic operation on $(1001)_2$ and $(1000)_2$ results in data $(1000)_2$ by the first execution of the loop consisting of the steps S2–S4, and the number of loops becomes 2. The resultant data obtained by the second execution of the loop is $(0000)_2$ and the number of loops becomes one. In the third execution of step S2, the number of loops is one and the resultant data is $(0000)_2$. Further, in the fourth execution of step S2, the number of loops is zero and step S5 is processed. In step S5, it is concluded that the number of bits indicating "1" is equal to or less than m (=3).

Figure 25A:
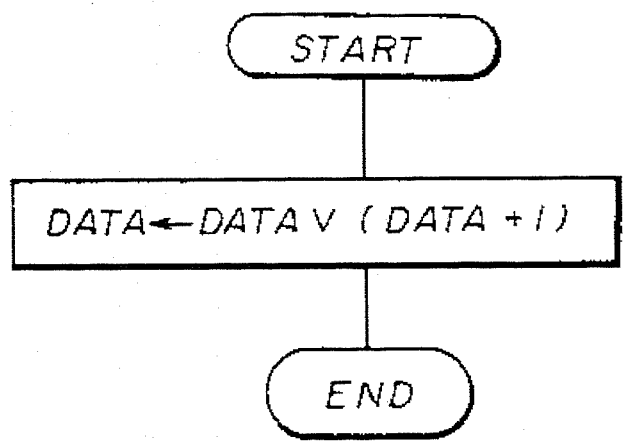
FIG. 25A is a flowchart of the fifth embodiment of the present invention.
Figure 25B:
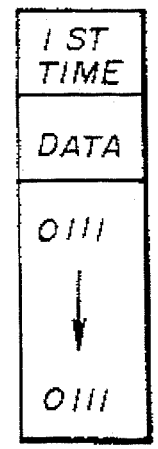
FIG. 25B is a diagram showing how data is processed by the fifth embodiment shown in FIG. 25A.

FIGS. 25A and 25B show the fifth embodiment of the present invention in which the lowest bit (n) among bits indicating "0" contained in N-bit data is changed to "1". FIG. 25A is a flowchart of the fifth embodiment, and FIG. 25B is a diagram showing how data is processed by the fifth embodiment. The N-bit data processed in FIGS. 25A and 25B is $(0011)_2$ (N=4). The OR logic operation on the input data and data obtained by adding 1 to the input data is executed. That is, the OR logic operation on the input data $(0011)_2$ and data $(0100)_2$ obtained by adding 1 to data $(0011)_2$ is executed. The result of the OR logic operation is $(0111)_2$. It can be seen from the above that the lowest bit, among the third and fourth bits indicating "0" contained in the input data, is changed to "1" by only one step.

Figure 26A:
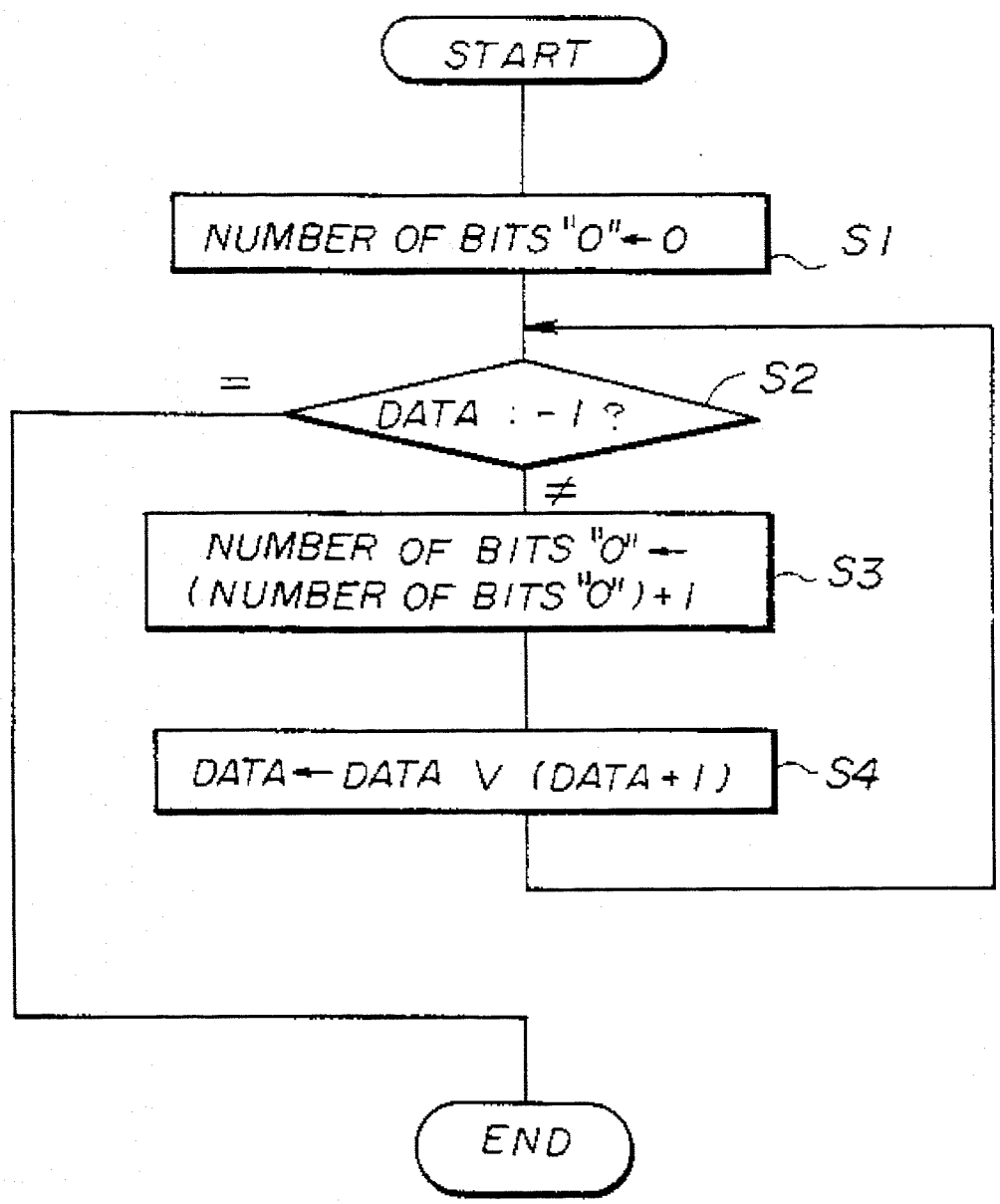
FIG. 26A is a flowchart of the sixth embodiment of the present invention.

FIGS. 26A and 26B show the sixth embodiment of the present invention in which the number (n) of bits indicating "0" contained in N-bit data is counted. FIG. 26A is a flowchart of the sixth embodiment, and FIG. 26B shows how data is processed by the sixth embodiment. The N-bit data shown in FIGS. 26A and 26B is $(1001)_2$ (N=4).

In step S1 shown in FIGS. 26A and 26B, the variable indicating the number of bits indicating "0" is set to zero. In step S2, it is determined whether or not the data being processed is −1. When it is determined that the data is −1, the process is ended. When it is determined in step S2 that the data is not −1, the value of the variable is incremented by 1 in step S3. Then in step S4, the OR logic operation on the data being processed and data obtained by adding 1 thereto is calculated, and it is determined, in step S2, whether or not the result of the OR logic operation is −1. The above process is repeatedly performed until it is determined in step S2 that the data being processed is −1.

When input data $(1001)_2$ is processed, the OR logic operation on $(1001)_2$ and $(1010)_2$ is calculated by the first execution of the loop consisting of steps S2–S4. The resultant data of the OR logic operation is $(1011)_2$, and the variable indicating the number of bits "0" indicates 1. By the second execution of the loop containing the OR logic operation, the resultant data is $(1111)_2$ and the variable indicates 2. Then, the process is ended by the third execution of step S2. It is noted that $(1111)_2$ is the complement of "1" and is "−1". As described above, according to the sixth embodiment, it becomes possible to count the number (n) of bits indicating "0" by detecting how many times the loop consisting of the steps S2–S4 has been repeatedly executed.

Figure 27A:
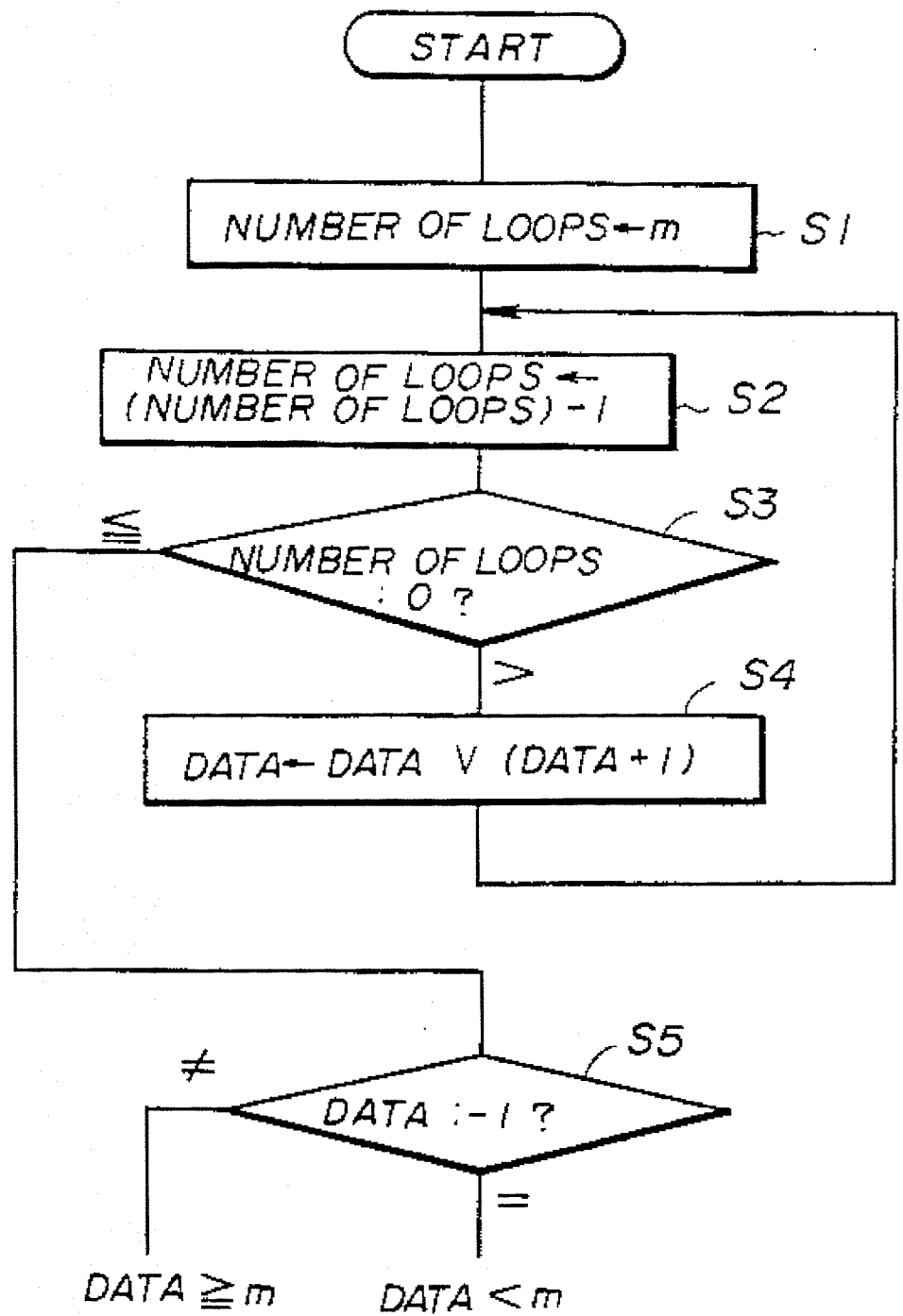
FIG. 27A is a flowchart of the seventh embodiment of the present invention.

FIGS. 27A and 27B show the seventh embodiment of the present invention in which it is determined whether or not the number (n) of bits indicating "0" contained in N-bit data is equal to or greater than m. FIG. 27A is a flowchart of the seventh embodiment, and FIG. 27B shows how data is processed by the seventh embodiment. The N-bit data shown in FIGS. 27A and 27B is $(1001)_4$ (N=4), and m=3.

In step S1 shown in FIGS. 27A and 27B, the variable indicating the number of loops is set to m. In step S2, the value of the variable is decremented by 1. In step S3, the value of the variable obtained in step S2 is compared with 0. When it is determined in step S3 that the value of the variable is equal to or less than zero, step S5 is executed. When it is determined in step S3 that the value of the variable is greater than zero, the OR logic operation on the data and data obtained by adding 1 thereto is calculated. Then, the process returns to step S2.

When it is determined in step S3 that the variable indicates zero, step S5 is executed in which it is determined whether or not the resultant data obtained in step S4 is −1. When it is determined that the resultant data obtained in step S4 is not −1, it is concluded that the number of bits indicating "0" contained in the data is equal to or greater than m. When it is determined that the resultant data is −1, it is concluded that the number of bits indicating "0" is not equal to or greater than m.

When data $(1001)_2$ is processed, the OR logic operation on $(1001)_2$ and $(1010)_2$ generates data $(1011)_2$ by the first execution of the loop consisting of the steps S2–S4, and the number of loops becomes 2. The resultant data obtained by the second execution of the loop is $(1111)_2$ and the number of loops becomes one. In the third execution of step S3, the number of loops is zero and the resultant data is $(1111)_2$. As a result, it is concluded that the number of bits indicating "0" is less than m (=3).

Figure 28A:
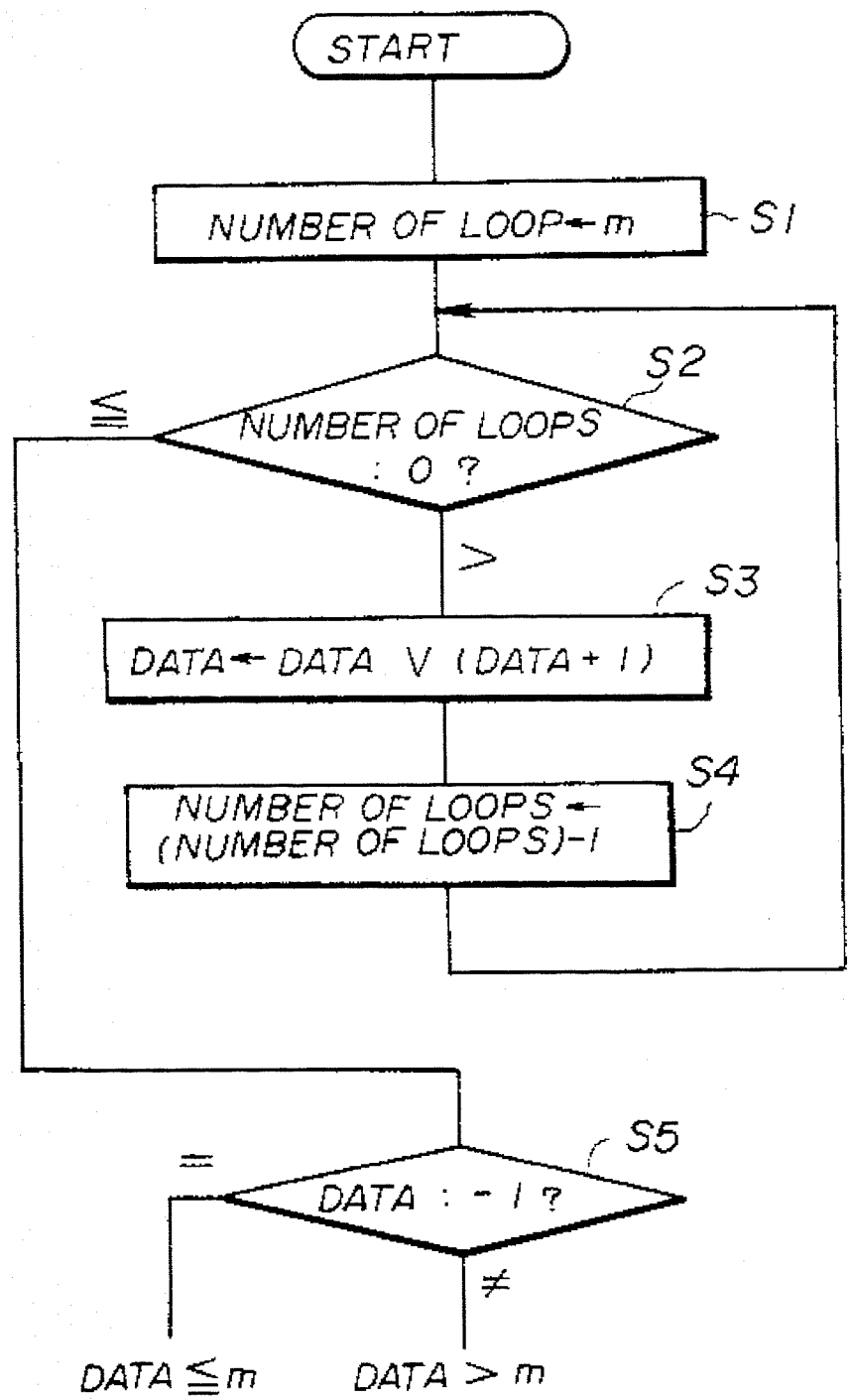
FIG. 28A is a flowchart of the eighth embodiment of the present invention.

FIGS. 28A and 28B show the eighth embodiment of the present invention in which it is determined whether or not the number (n) of bits indicating "0" contained in N-bit data is equal to or less than m.

FIG. 28A shows a flowchart of the eighth embodiment, and FIG. 28B shows how data is processed by the eighth embodiment. The N-bit data shown in FIGS. 28A and 28B is $(1001)_2$ (N=4), and m=3.

The process shown in FIG. 28A is the same as that of the seventh embodiment shown in FIG. 27A except that the process of step S2 shown in FIG. 28A is executed before step S3. When data $(1001)_2$ is processed, the OR logic operation on $(1001)_2$ and $(1010)_2$ results in data $(1011)_2$ by the first execution of the loop consisting of the steps S2–S4, and the number of loops becomes 2. The resultant data obtained by the second execution of the loop is $(1111)_2$ and the number of loops becomes one. In the third execution of step S2, the number of loops is one and the resultant data is $(1111)_2$. Further, in the fourth execution of step S2, the number of loops is zero and step S5 is processed. In step S5, it is concluded that the number of bits indicating "0" is equal to or less than m (=3).

According to the first through eighth embodiments of the present invention, it becomes possible to efficiently perform the respective data processes in a reduced time without being affected by the length of data to be processed. Particularly, the number of bits indicating "0" or "1" can be obtained by performing the loop process only i times where i is the number of bits indicating "1" or "0" contained in the data to be processed. That is, the method for obtaining the number of bits indicating "1" or "0" contained in the data to be processed is independent of the number of bits contained in the data. Hence, the time necessary to execute the data processes does not increase as the data length becomes longer.

Figure 29:
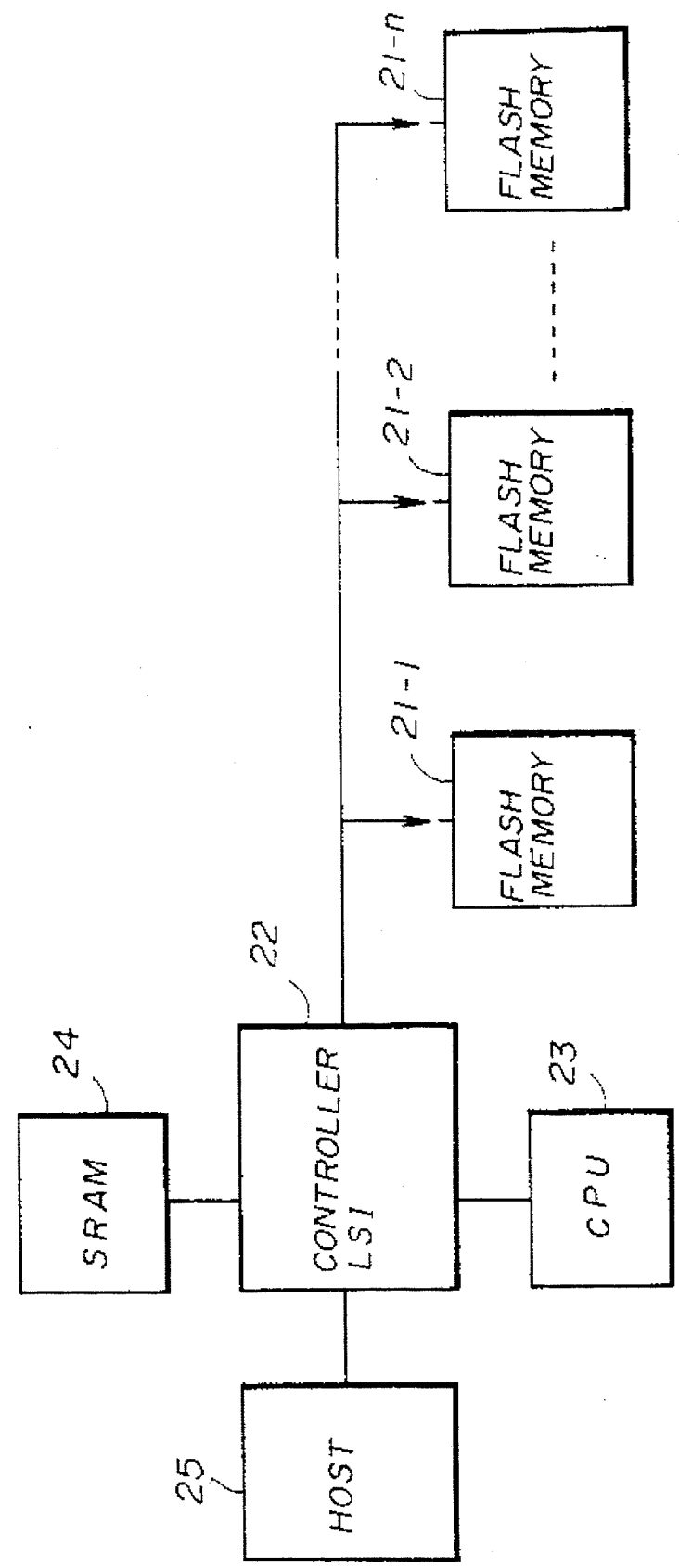
FIG. 29 is a block diagram of a flash memory device to which the present invention is applied.

FIG. 29 is a block diagram of a flash memory device to which the above first through eighth embodiments of the present invention can be applied. The flash memory device shown in FIG. 29 includes n (n is an integer) flash memories 21-1 through 21-n, a controller LSI 22, a CPU 23 and an SRAM 24. A host computer 25 is connected to the flash memory device via the controller LSI 22. Data read and write operations are performed between the host computer 25 and the SRAM 24 via the controller LSI 22 and between the SRAM 24 and the flash memories 21-1 through 21-n via the controller LSI 22 under the control of the CPU 23.

Figure 30:
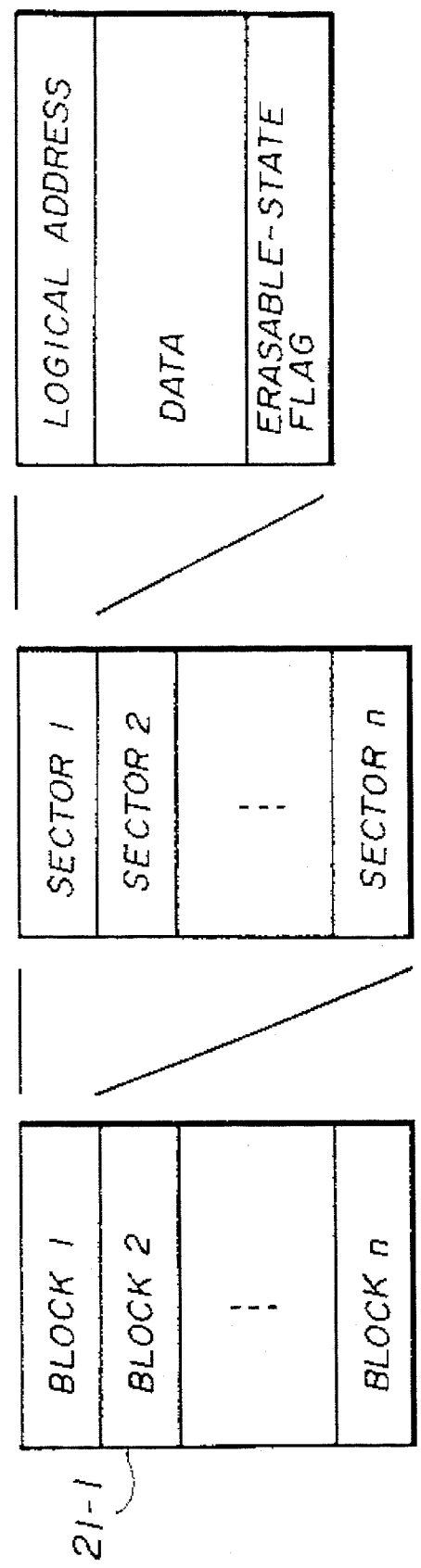
FIG. 30 is a diagram showing the structure of each flash memory shown in FIG. 29.

FIG. 30 shows the structure of the flash memory 21-1 shown in FIG. 29. Each of the other flash memories 21-2 through 21-n has the same structure as shown in FIG. 30. The flash memory 21-1 has n blocks, each of which has n sectors. It will be noted that the number n of flash memories, the number n of blocks and the number n of sectors may be the same as each other or different from each other. For the sake of convenience, there are n flash memories 21-1 through 21-n, n blocks provided in each of the flash memories, and n sectors provided in each of the blocks.

Each of the blocks corresponds to the erasable minimum unit. Each of the sectors includes data and information used to manage the above data. The information stored in each of the sectors includes a logical address and an erasable-state flag. Data is written into the flash memories 21-1 through 21-n in a following manner. Data written into the SRAM 24 by the host computer 25 is written into one or a plurality of sectors in which there is no data. If there is the same logic address as the logical address specified by the host computer 25 in the related flash memory, the erasable-state flag or flags are written into the related sector or sectors. If the data write operation continues in the following manner, a sector having no data will not become available. In order to eliminate the above problem, when the number of blocks having no data becomes equal to or less than a definite value, sectors into which erasable-state flags have not been written (OFF) are transferred from a block having sectors into which the erasable-state flags have been written (ON) to another block in which no data has been written. Then, the block from which all sectors have been transferred is erased, so that sectors into which no data has been written are provided. Each of the erasable-state flags consists of a plurality of bits containing a redundant bit, and the state of each erasable-state flag is determined by the majority operation on the bits.

Figure 31:
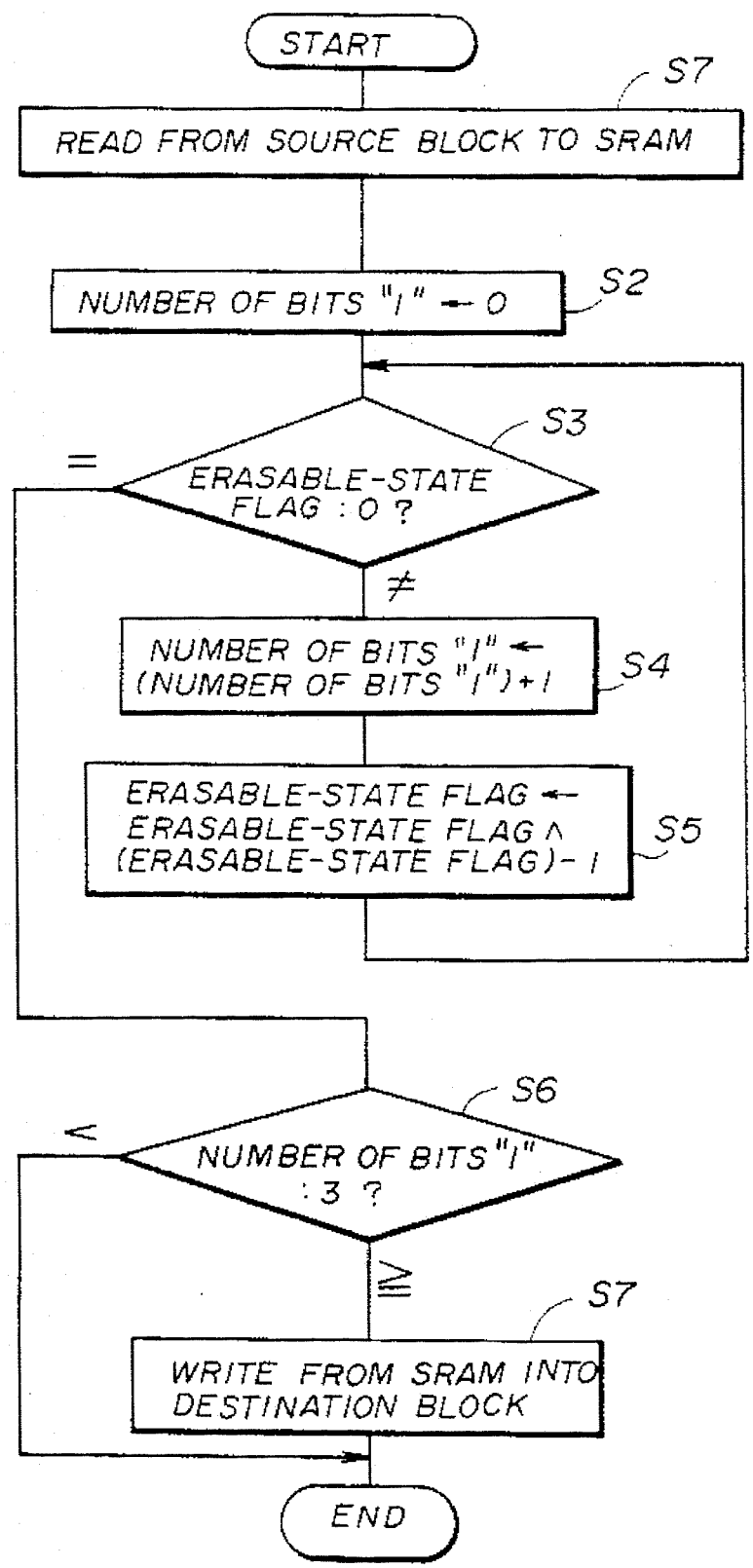
FIG. 31 is a flowchart of a first application of the present invention to the device shown in FIG.. 29.

FIG. 31 is a flowchart of a first application of the present invention to the flash memory device. The first application is intended to recognize the states of the bits of the erasable-state flag formed in the redundant formation. FIG. 32 shows how the erasable-state flag is processed in the first application. In FIGS. 31 and 32, it is assumed that the erasable-state flag consists of four bits and a transfer of data is executed when the erasable-state flag contains three bits indicating a value of "1" or more.

In step S1, a sector is from a source block of a flash memory into the SRAM 24, so that the erasable-state flag stored in the read sector is ready to be read by the CPU 23. In step S2, the value of the variable indicating number of bits "1" is set to zero. In step S3, it is determined whether or not the erasable-state flag is zero. When it is determined that the erasable-state flag is zero, the process proceeds with step S6. When it is determined, in step S3, that the erasable-state flag is not zero, the value of the variable indicating the number of bits indicating "1" is incremented by 1 in step S4. In step S5, the AND logic operation on the value of the erasable-state flag and (the value of the erasable-state flag −1) is calculated. Then the process returns to step S3. The loop process consisting of the steps S3–S5 is repeatedly performed until it is determined in step S3 that the erasable-state flag is zero.

In step S6, it is determined whether or not the current value of the variable is equal to or greater than 3 because the number of bits indicating "1" contained in the latest value of the erasable-state flag obtained in step S5 is equal to the current value of the variable. When it is determined, in step S6, that the current value of the variable is less than 3, the process is ended. When it is determined, step S6, the current value of the variable is equal to or greater than 3, it is concluded that data stored in the sector being considered is not erasable, and data of the source block is transferred to a destination block from the SRAM 24 via the controller LSI 22.

In the example shown in FIG. 32, the erasable-state flag read from the source sector is $(1001)_2$. In this case, the first execution of the loop consisting of steps S3–S5 calculates the AND logic operation on $(1001)_2$ and $(1000)_2$, and outputs the resultant data $(1000)_2$. Further, the value of the variable is changed from 0 to 1. By the second execution of the loop, data $(0000)_2$ is output and the value of the variable is increased to 2. In step S3 after the loop has been performed three times, the current value of the erasable-state flag is $(0000)_2$ and it is concluded in step S6 that the number of bits indicating "1" contained in the original erasable-state flag is less than 3.

Figure 33:
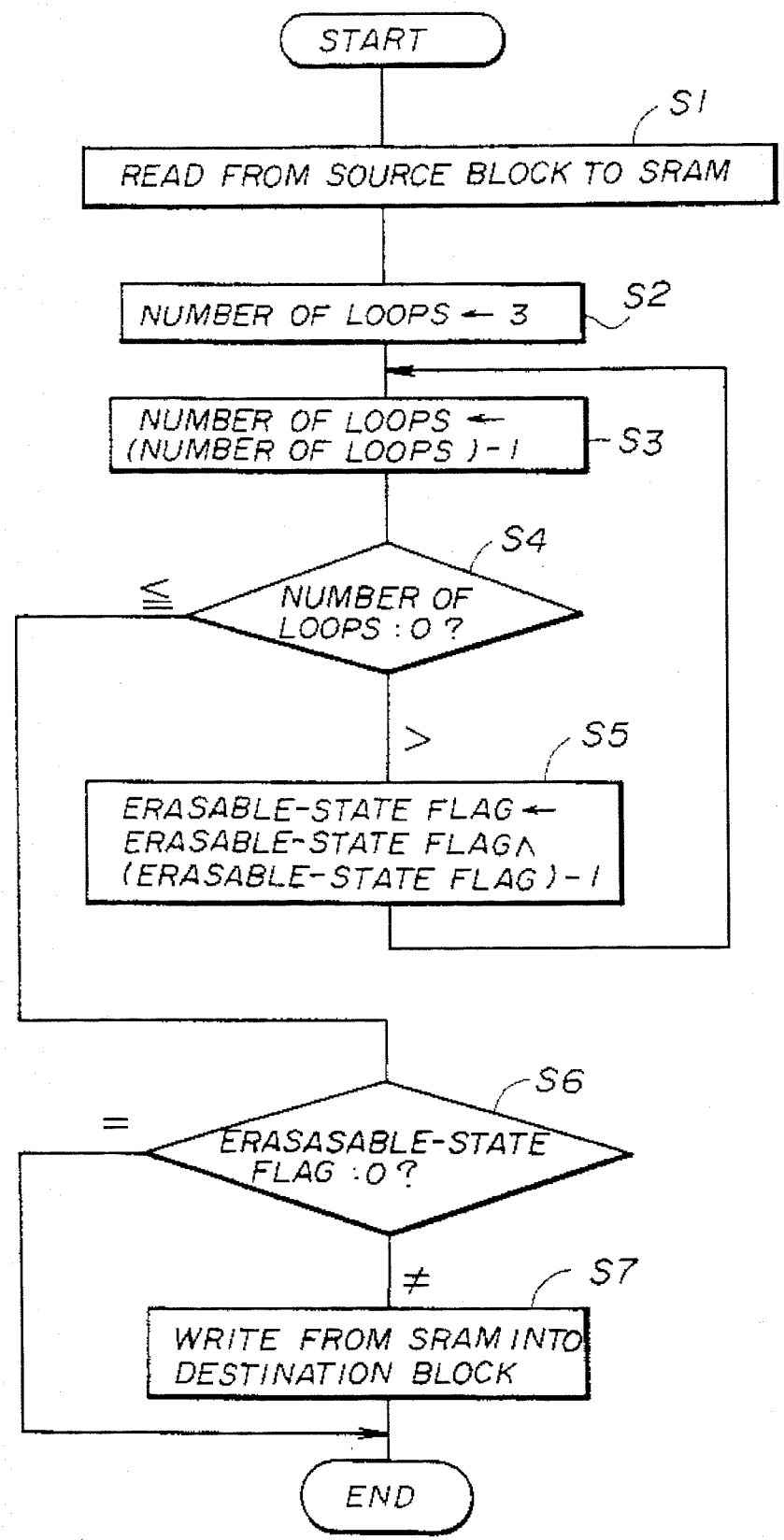
FIG. 33 is a flowchart of a second application of the present invention to the device shown in FIG. 29.

FIG. 33 is a flowchart of a second application of the present invention to the flash memory device. The second application is intended to recognize the states of the bits of the erasable-state flag formed in the redundant formation. FIG. 34 shows how the erasable-state flag is processed in the second application. In FIGS. 33 and 34, it is assumed that the erasable-state flag consists of four bits and a transfer of data is executed when the erasable-state flag contains three bits indicating "1" or more.

In step S1, a sector is copied from a source block of a flash memory into the SRAM 24, so that the erasable-state flag stored in the read sector is ready to be read by the CPU 23. In step S2, the value of the variable indicating number of execution of loops consisting of steps S3–S5 is set to three. In step S3, 1 is subtracted from the value of the variable. In step S4, the value of the variable is compared with zero. When it is determined, in step S4, that the value of the variable is greater than zero, the AND logic operation is performed on the value of the erasable-state flag and (the value of the erasable-state flag $-1$), and the resultant value is handled as the new erasable-state flag. The loop consisting of steps S3–S5 is repeatedly executed until it is determined in step S4 that the value of the variable is greater than zero.

In step S6, it is determined whether or not the current value of the erasable-state flag is zero. When it is determined that the current value of the erasable-state flag is zero, it is concluded that the number of bits "1" contained in the original erasable-state flag is less than 3, and the process is ended. When it is determined in step S6 that the current value of the erasable-state flag is not zero, it is concluded that the number of bits "1" contained in the original erasable-state flag is equal to or greater than 3 and therefore the related data is not erasable. In step S7, data of the source block is transferred to the destination block via the controller LSI 22.

In the example shown in FIG. 34, the erasable-state flag read from the source sector is $(1101)_2$. In this case, the first execution of the loop consisting of steps S3–S5 calculates the AND logic operation on $(1101)_2$ and $(1100)_2$, and outputs the resultant data $(1100)_2$. Further, the value of the variable is decreased to 2. By the second execution of the loop, data $(1000)_2$ is output and the value of the variable is decreased to 1. In step S4 after the loop has been performed three times, the current value of the erasable-state flag is $(1000)_2$ and it is concluded in step S6 that the number of bits indicating "1" contained in the original erasable-state flag is equal to or greater than 3. Hence, the data of the source block is transferred to the destination block via the controller LSI 22 in step S7. Then, the process is ended.

Figure 35:
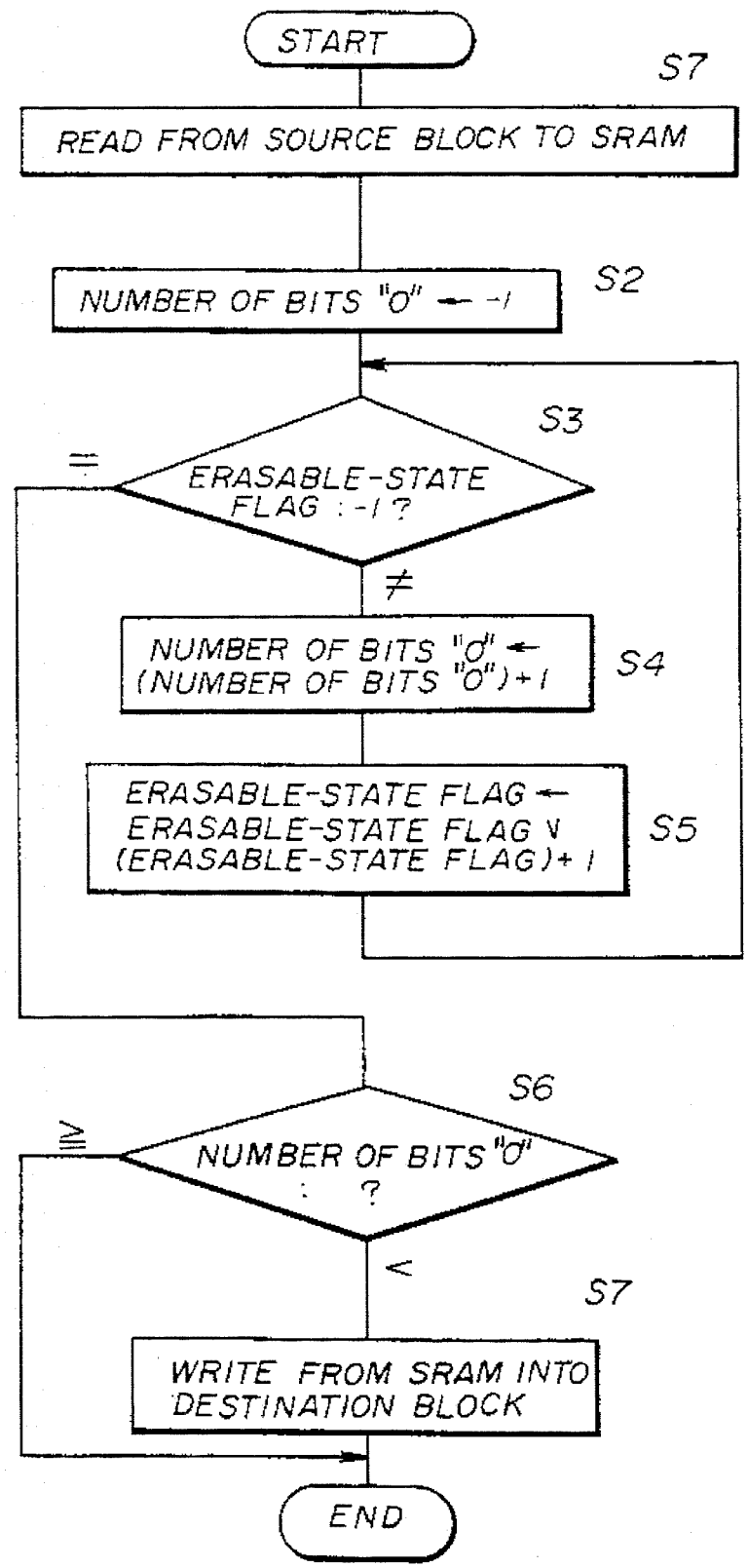
FIG. 35 is a flowchart of a third application of the present invention to the device shown in FIG. 29.

FIG. 35 is a flowchart of a third application of the present invention to the flash memory device. The third application is intended to recognize the states of the bits of the erasable-state flag formed in the redundant formation. FIG. 36 shows how the erasable-state flag is processed in the third application. In FIGS. 35 and 36, it is assumed that the erasable-state flag consists of four bits and a transfer of data is executed when the number of bits indicating "0" contained in the erasable-state flag is less than three.

In step S1 shown in FIG. 35, a sector is from a source block of a flash memory into the SRAM 24, so that the erasable-state flag stored in the read sector is ready to be read by the CPU 23. In step S2, the value of the variable indicating the number of bits "0" is set to zero. In step S3, it is determined whether or not the erasable-state flag is zero. When it is determined that the erasable-state flag is zero, the process proceeds with step S6. When it is determined, in step S3, that the erasable-state flag is not zero, the value of the variable indicating the number of bits indicating "0" is incremented by 1 in step S4. In step S5, the OR logic operation is performed on the value of the erasable-state flag and (the value of the erasable-state flag $+1$) is calculated. Then the process returns to step S3. The loop process consisting of the steps S3–S5 is repeatedly performed until it is determined in step S3 that the erasable-state flag is $-1$.

In step S6, it is determined whether or not the current value of the variable is less than 3 because the number of bits indicating "0" contained in the latest value of the erasable-state flag obtained in step S5 is equal to the current value of the variable. When it is determined, in step S6, that the current value of the variable is equal to or greater than 3, the process is ended. When it is determined, in step S6, that the current value of the variable is less than 3, it is concluded that data stored in the sector being considered is not erasable and data of the source block is transferred to a destination block from the SRAM 24 via the controller LSI 22.

In the example shown in FIG. 36, the erasable-state flag read from the source sector is $(1001)_2$. In this case, the first execution of the loop consisting of steps S3–S5 calculates the OR logic operation on $(1001)_2$ and $(1010)_2$, and outputs the resultant data $(1011)_2$. Further, the value of the variable is changed from 0 to 1. By the second execution of the loop, data $(1111)_2$ is output and the value of the variable is increased to 2. In step S3 after the loop has been performed three times, the current value of the erasable-state flag is $(1111)_2$ and it is concluded in step S6 that the number of bits indicating "0" contained in the original erasable-state flag is less than 3.

Figure 37:
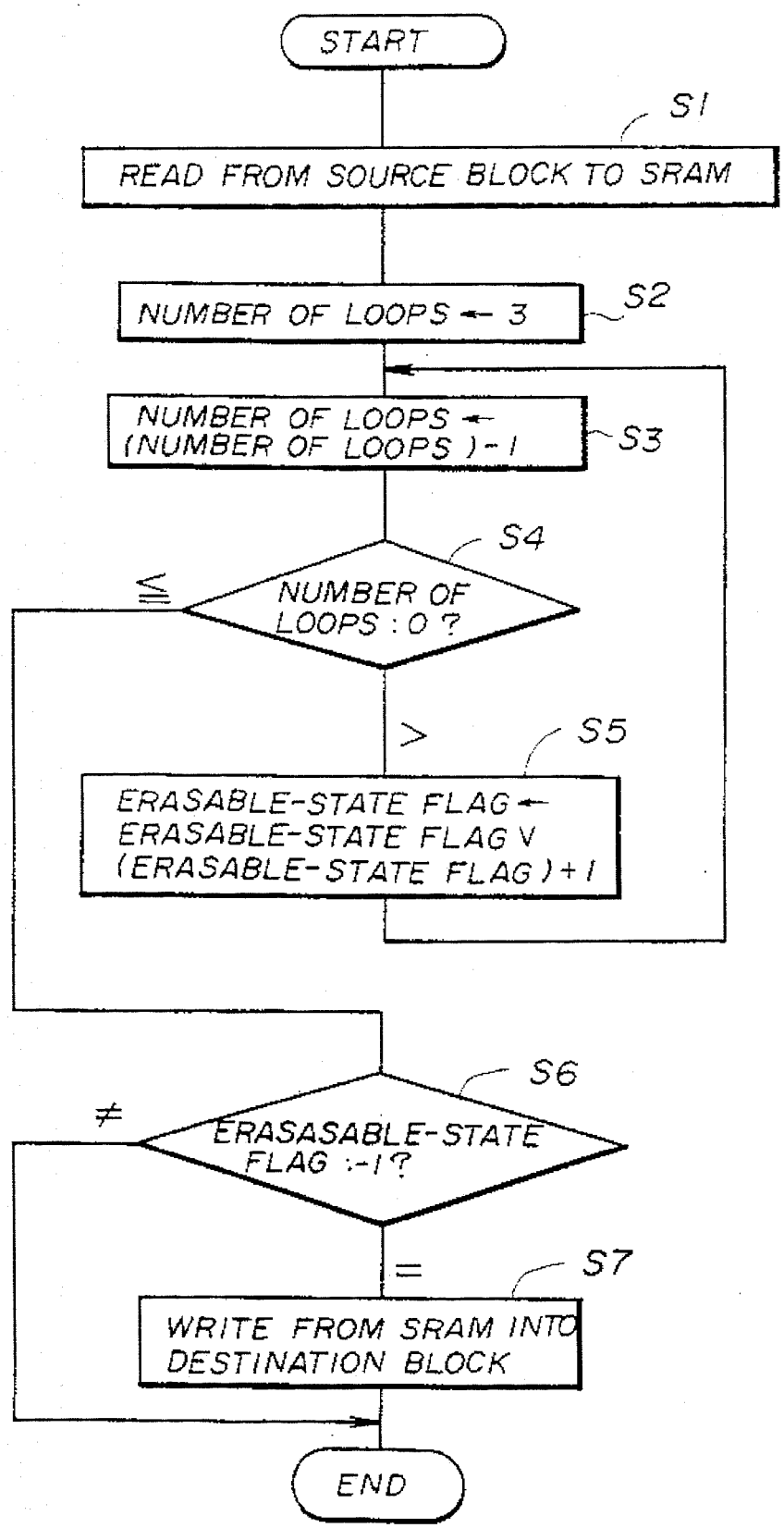
FIG. 37 is a flowchart of a fourth application of the present invention to the device shown in FIG. 29.
Figure 1:
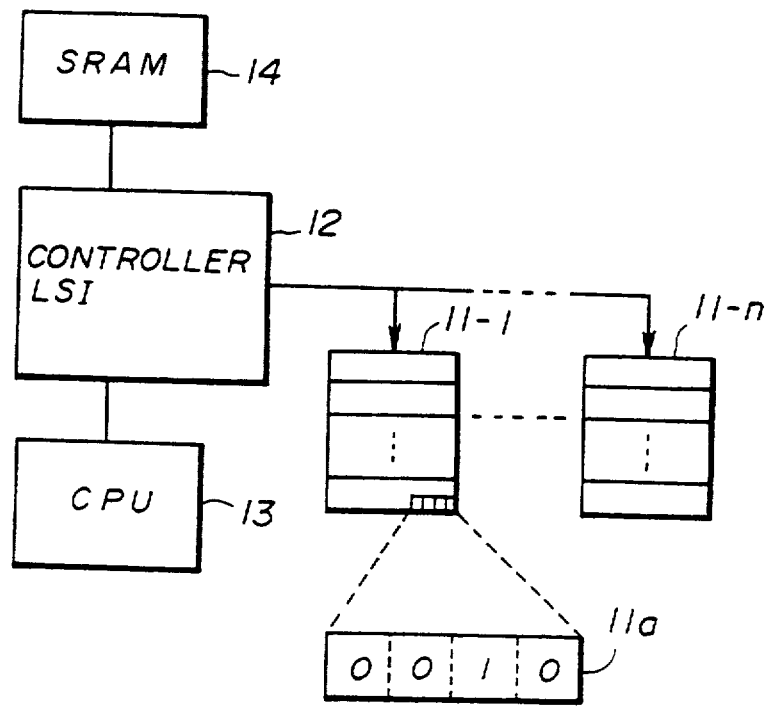
Figure 2:
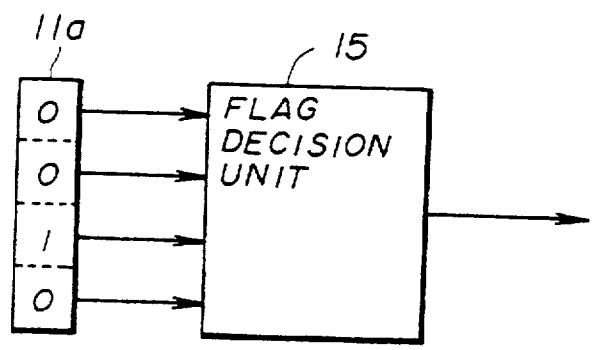
Figure 3:
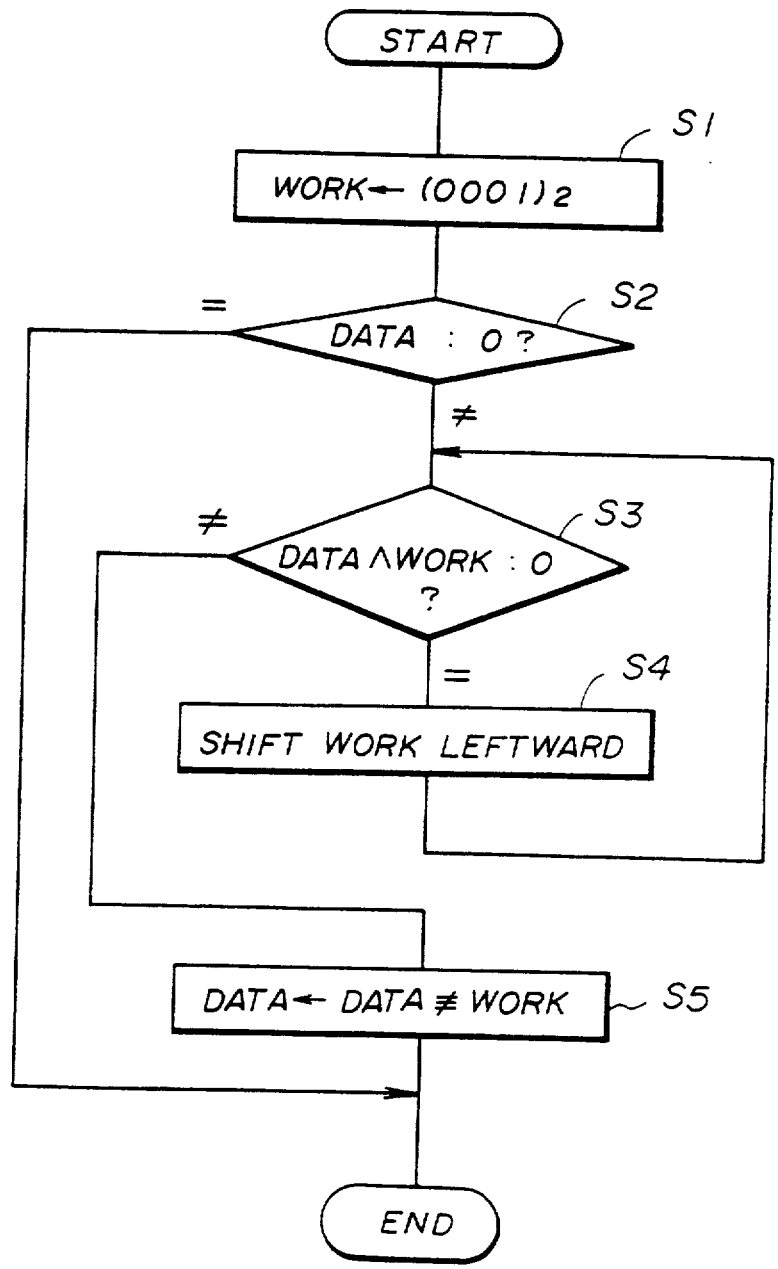
Figure 5:
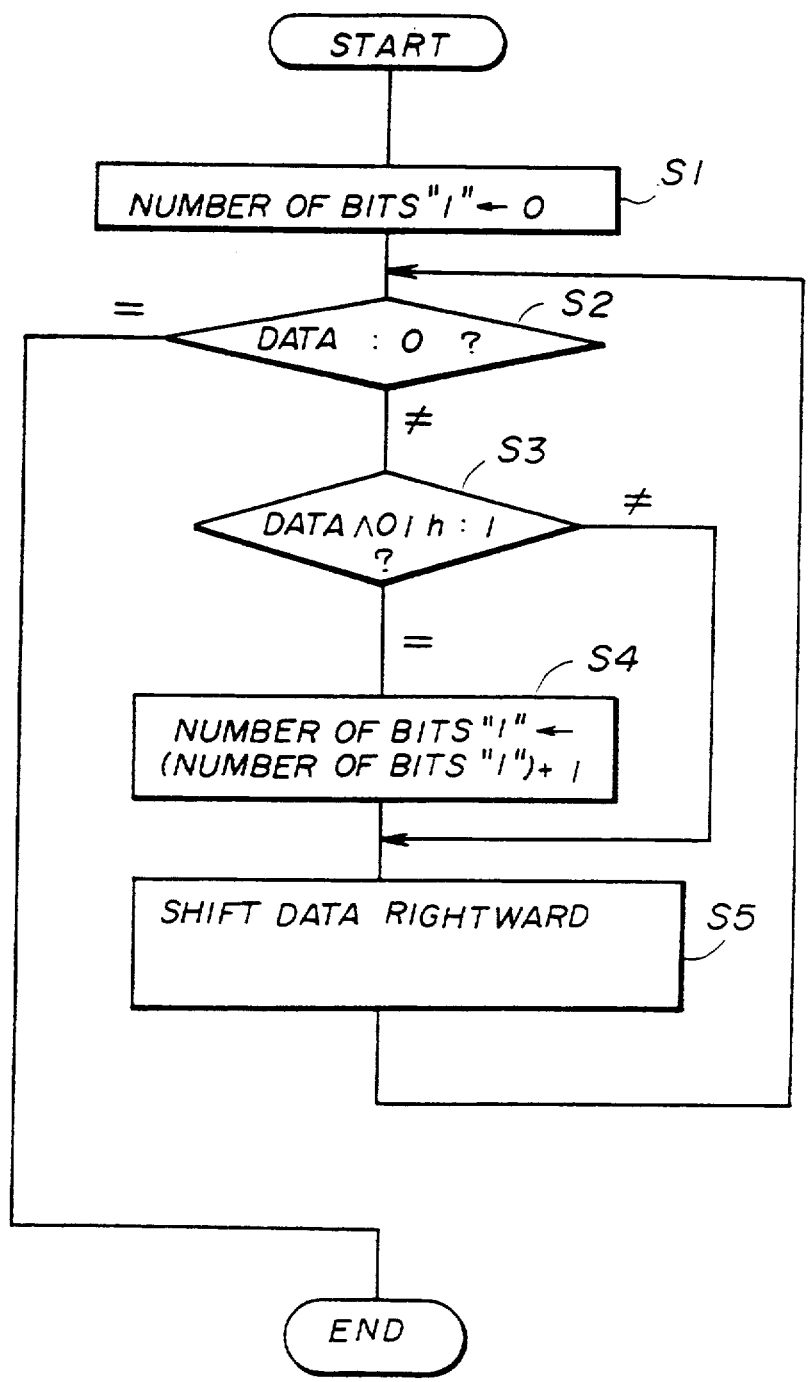
Figure 7:
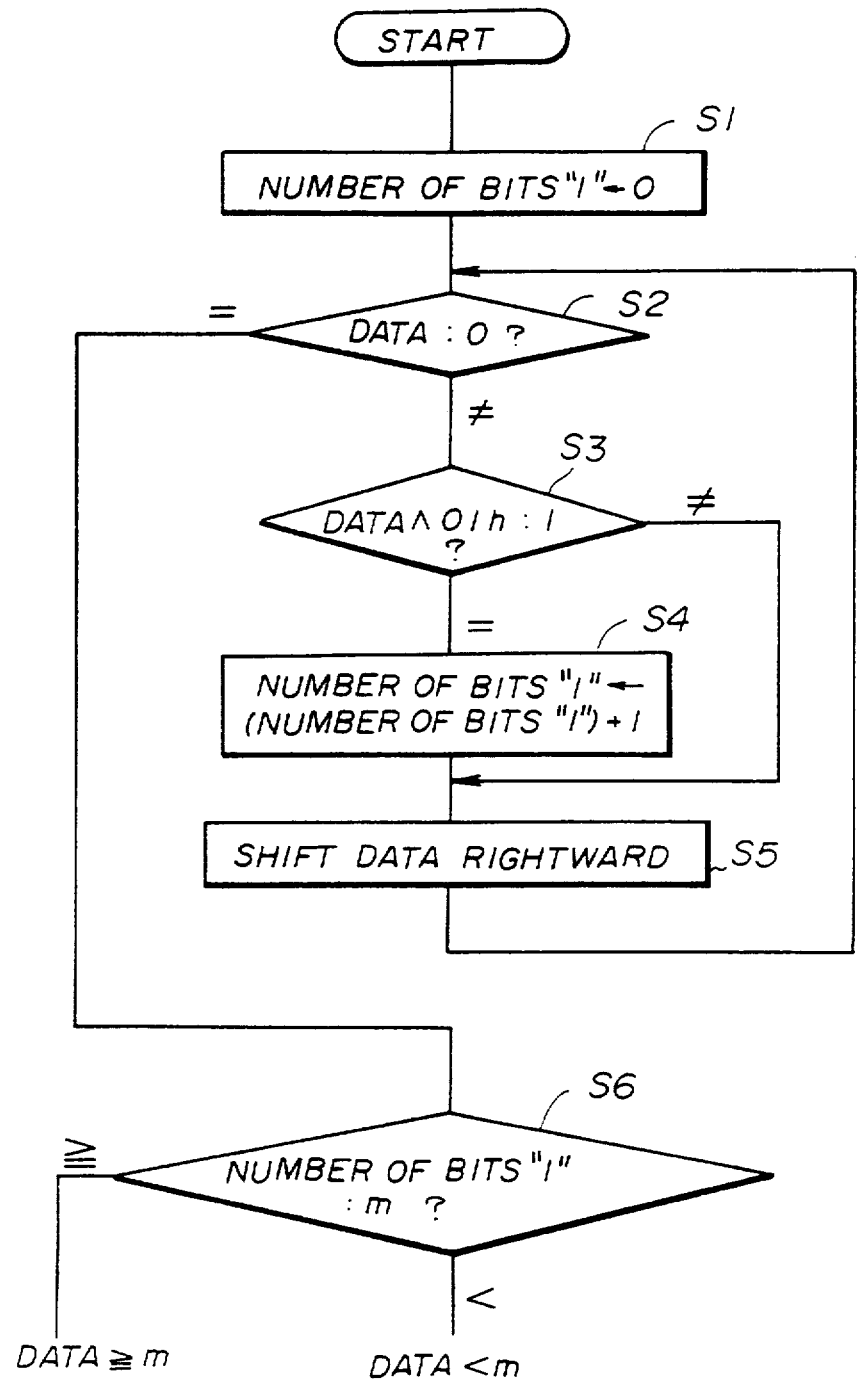
Figure 11:
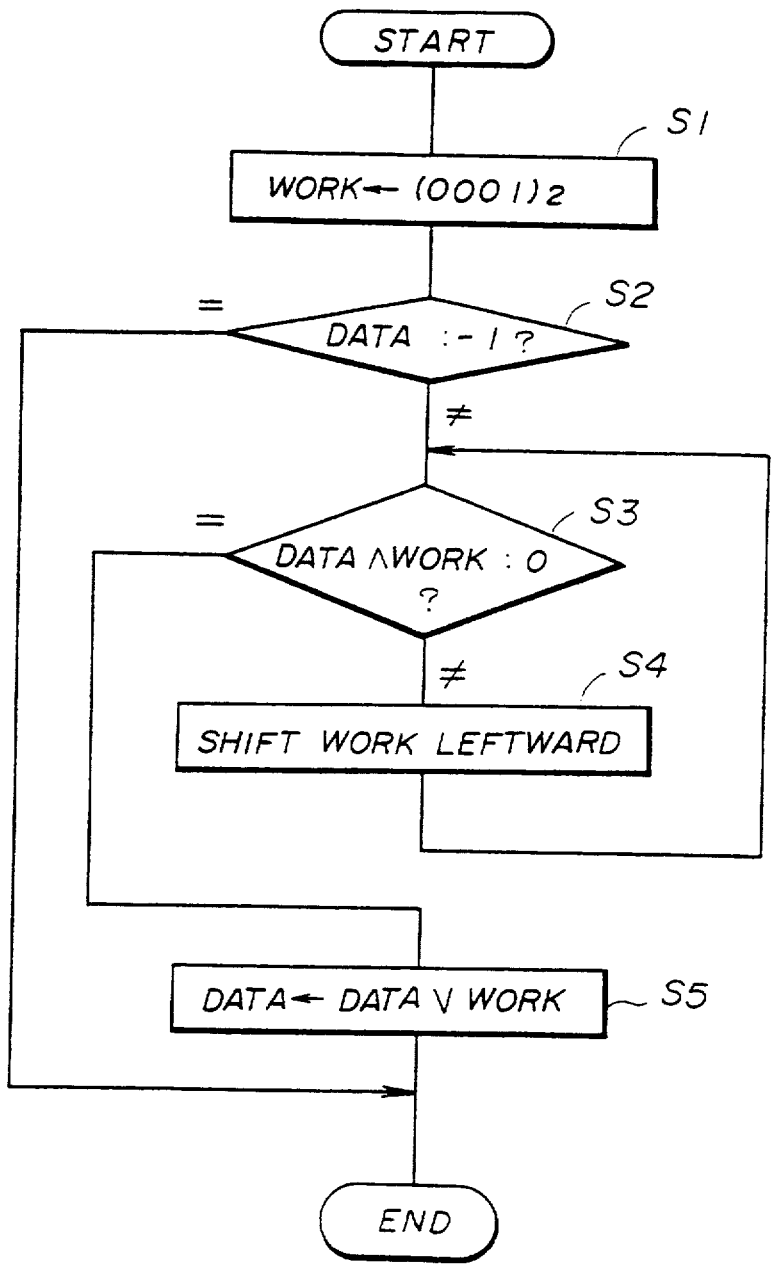
Figure 13:
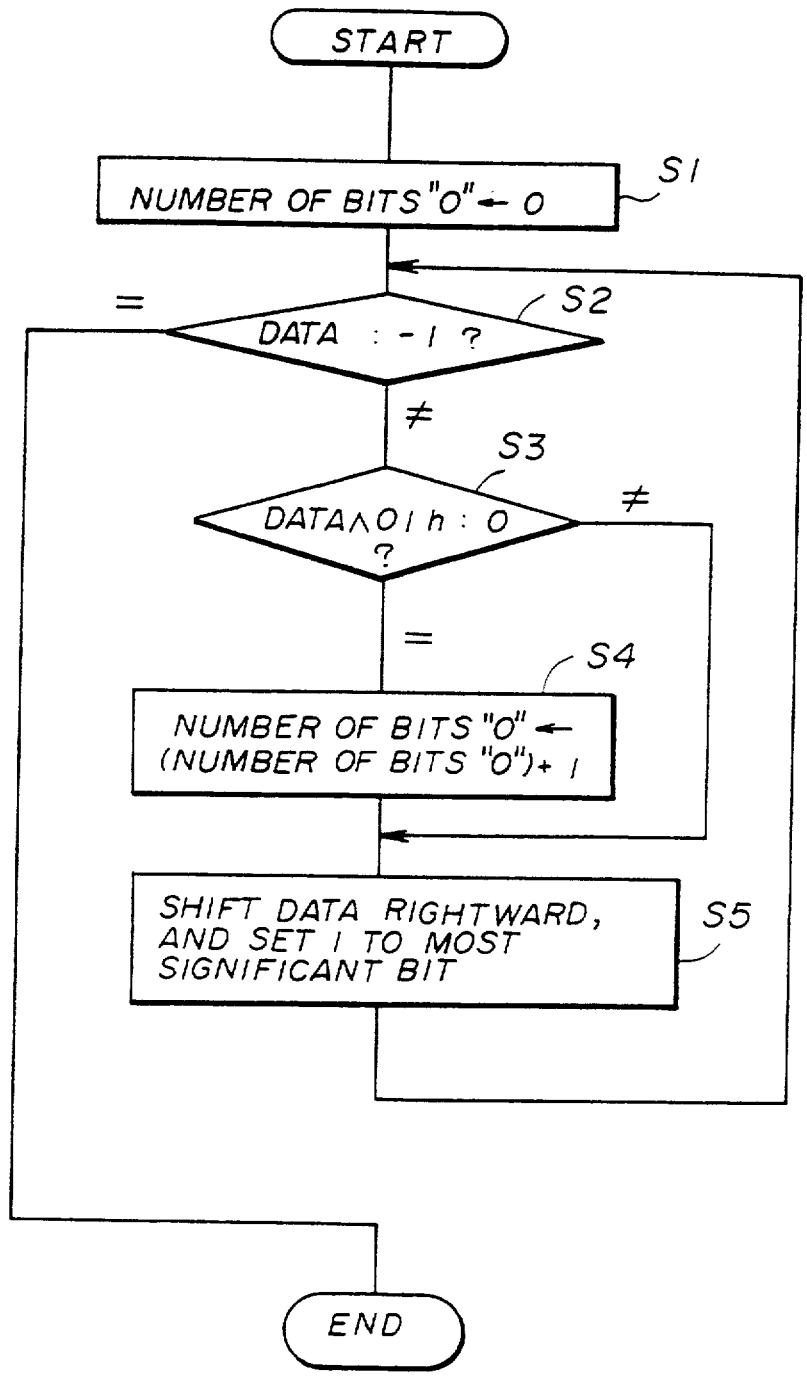
Figure 19B:
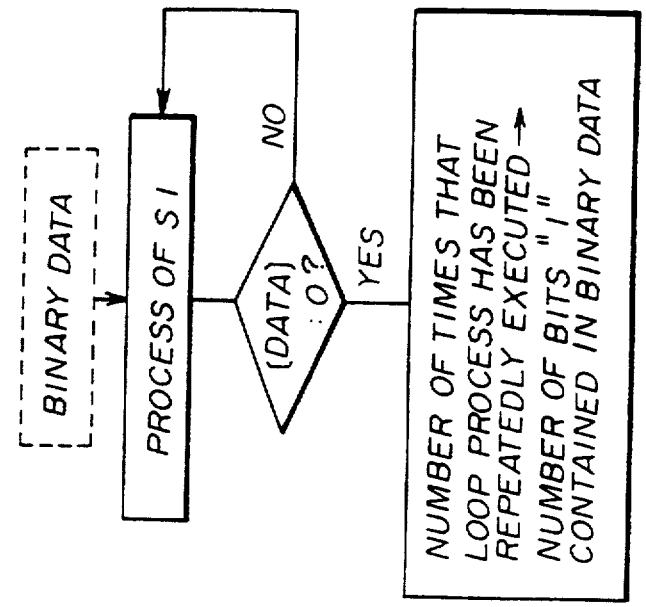
Figure 19A:
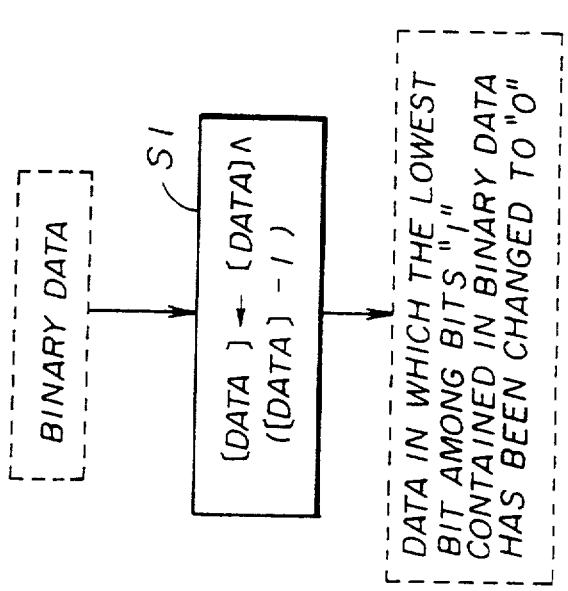
Figure 19C:
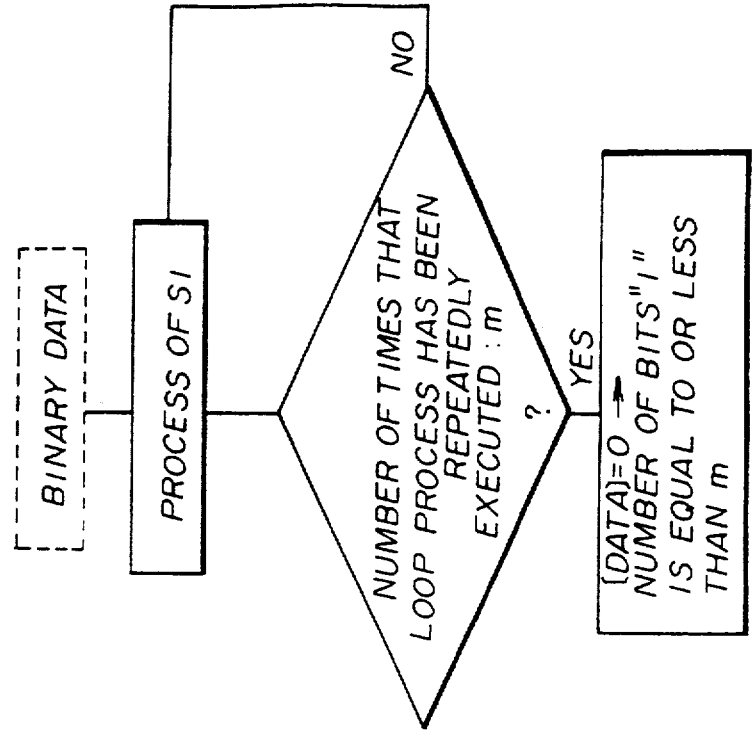
Figure 19D:
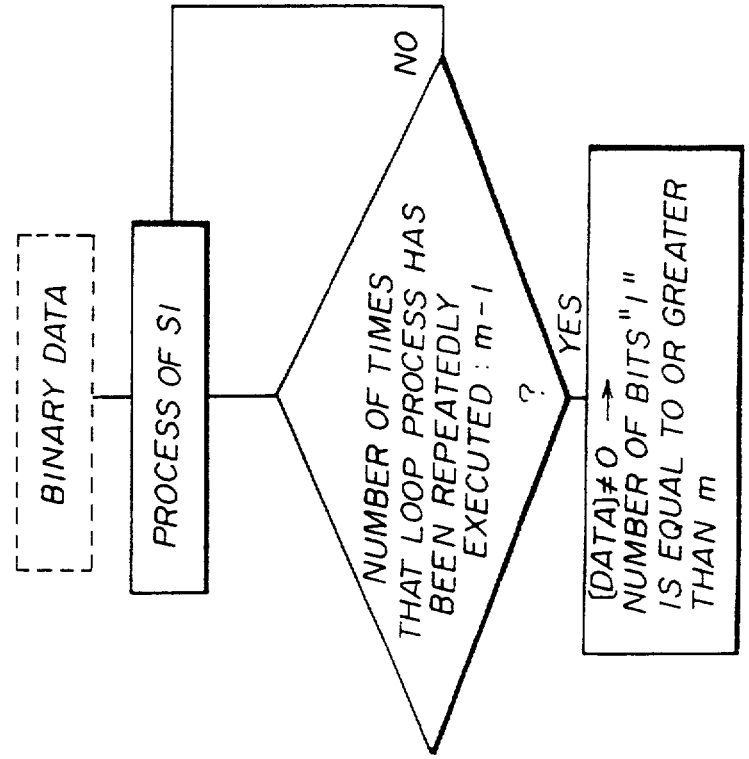
Figure 20B:
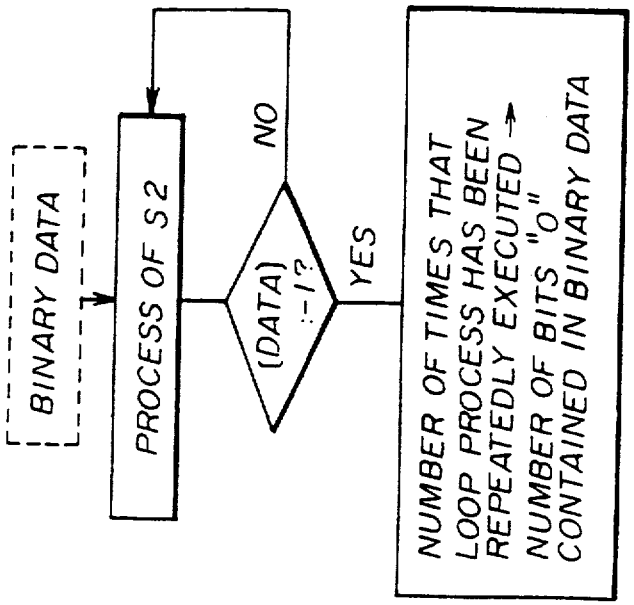
Figure 20A:
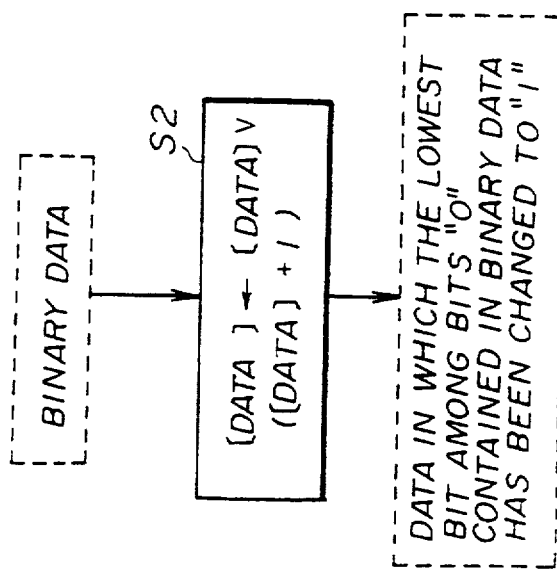
Figure 21A:
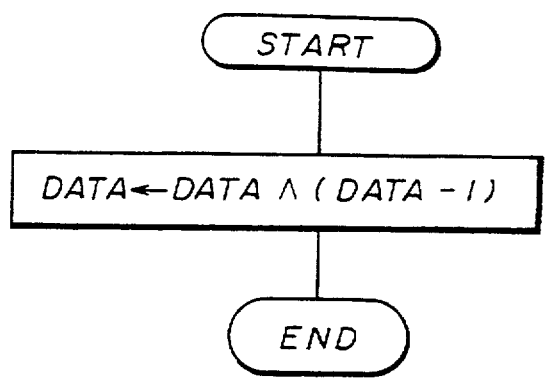
Figure 21B:
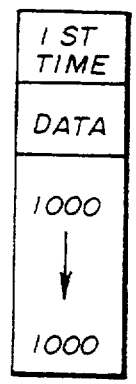
Figure 22A:
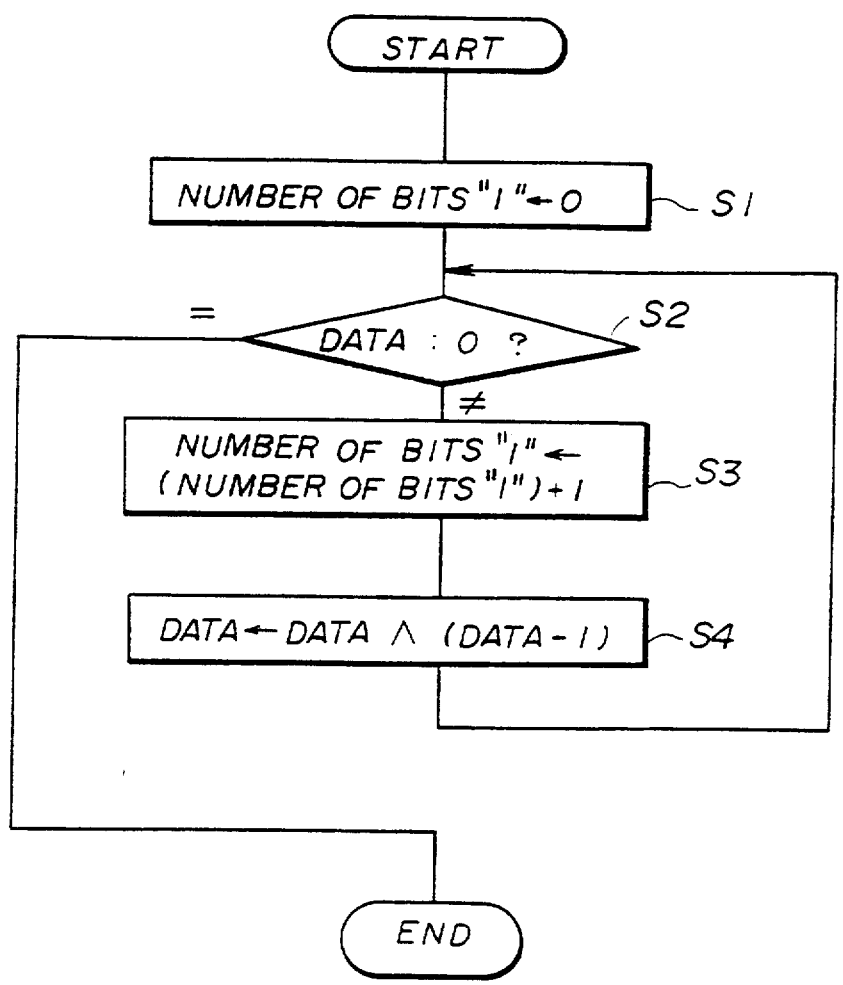
Figure 23A:
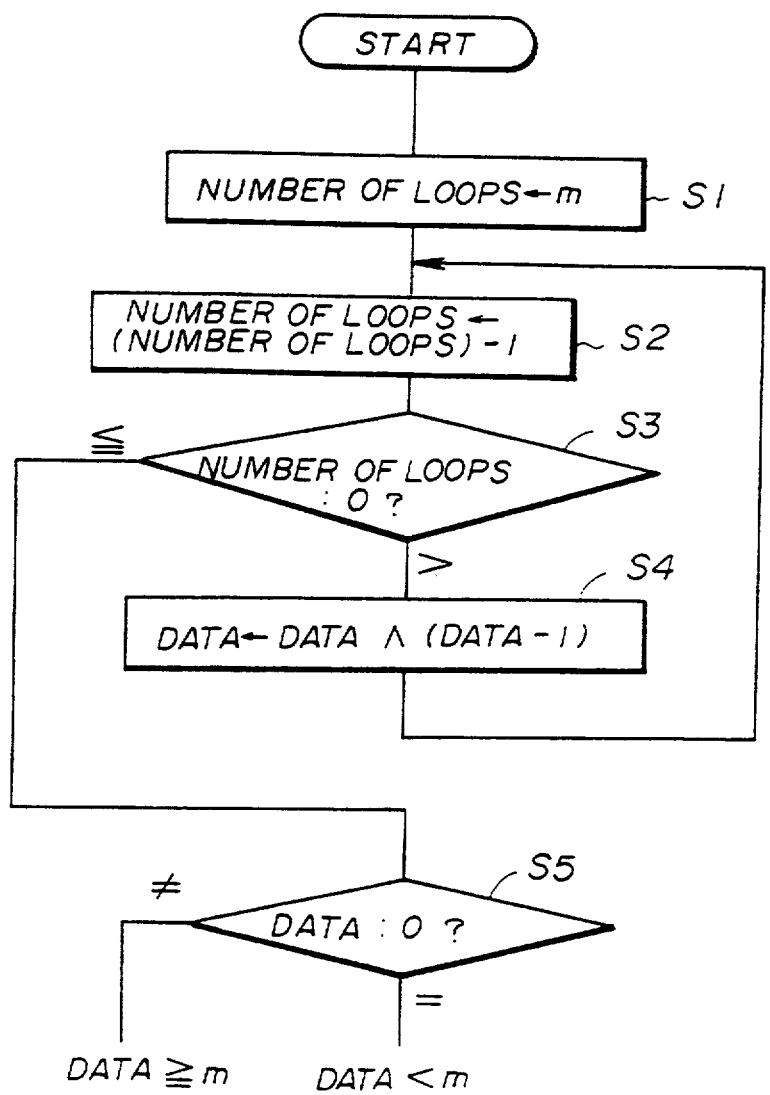
Figure 24A:
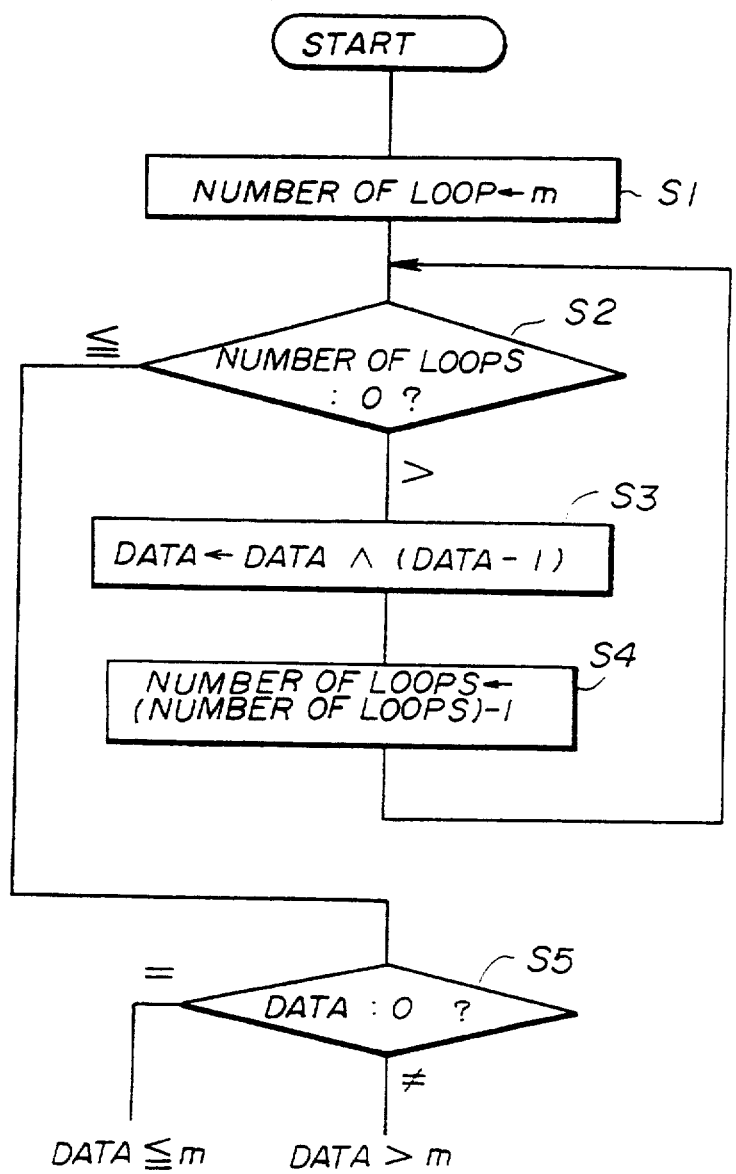
Figure 25A:
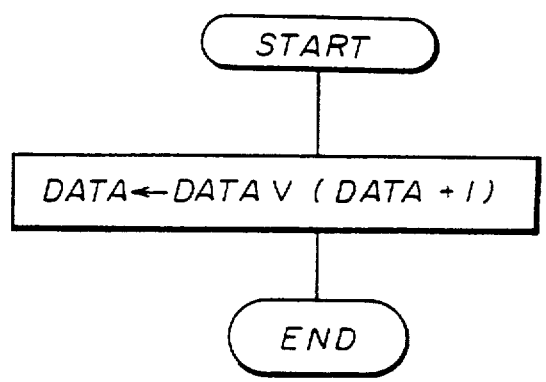
Figure 25B:
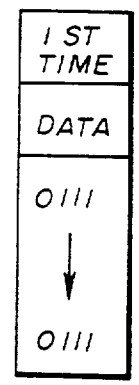
Figure 26A:
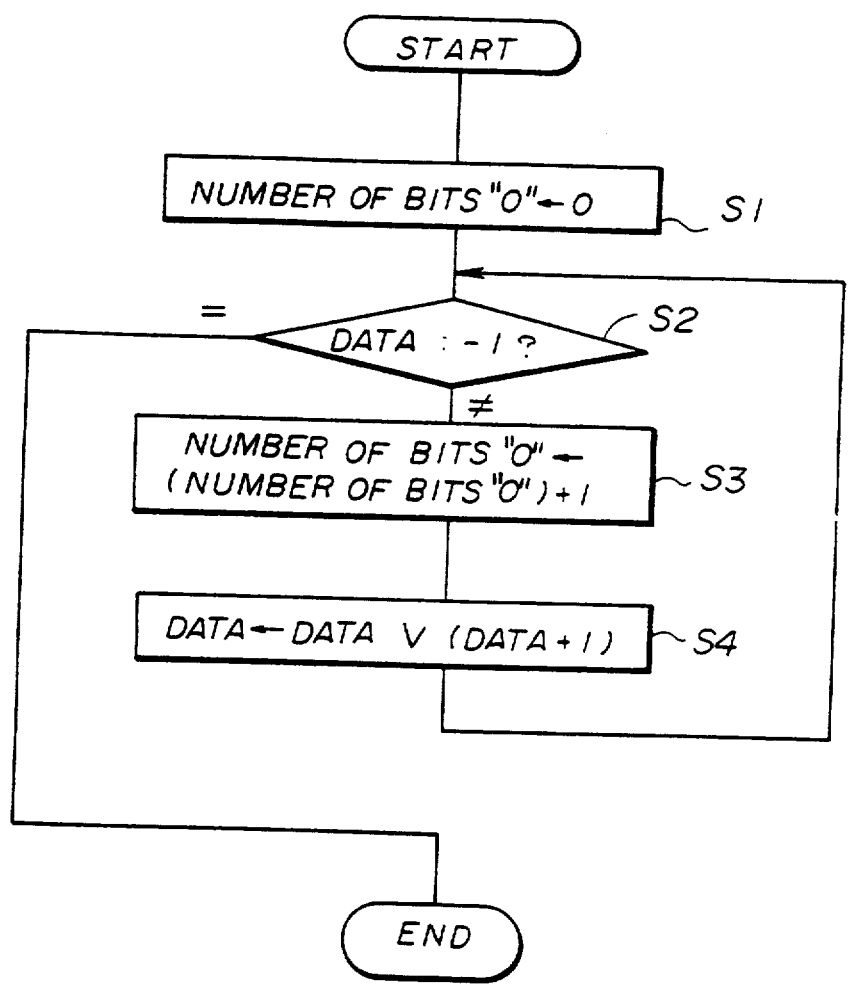
Figure 27A:
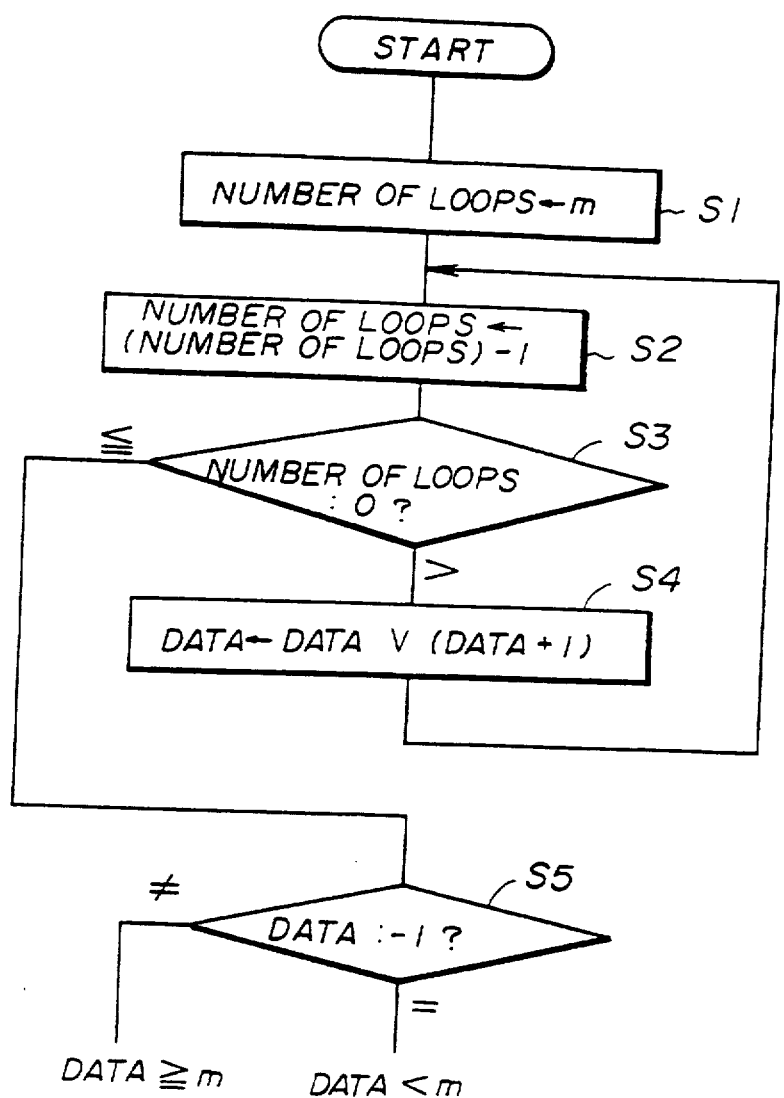
Figure 28A:
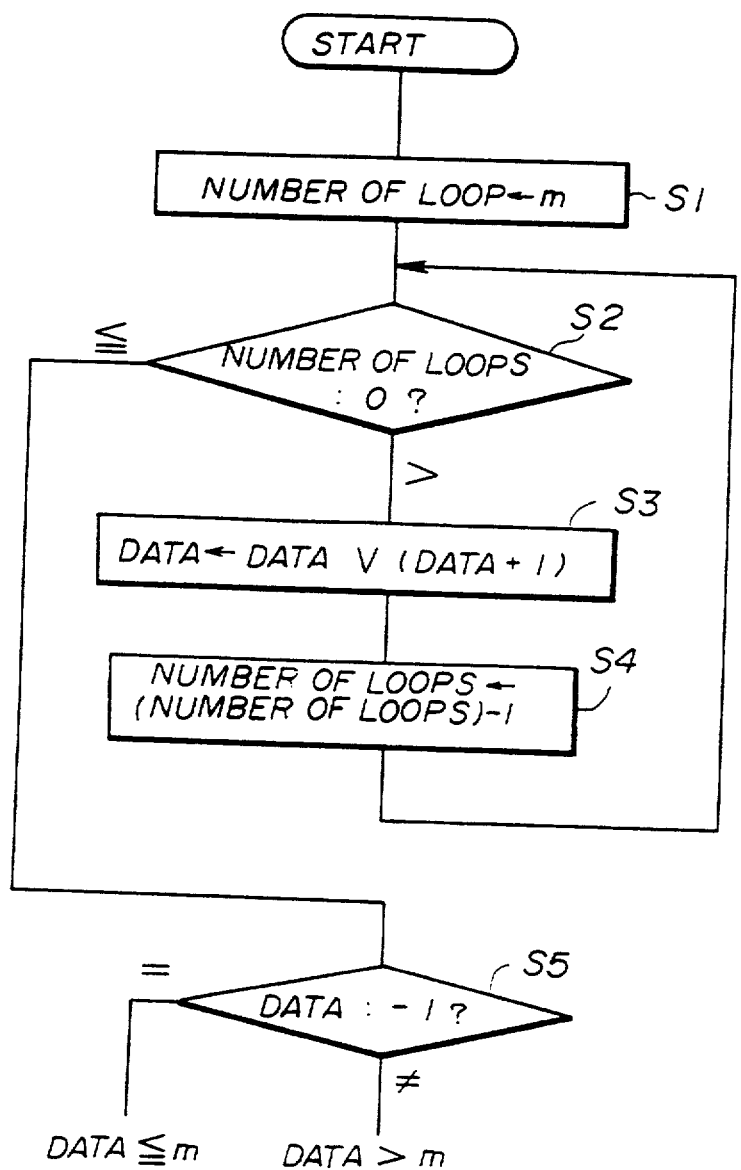
Figure 29:
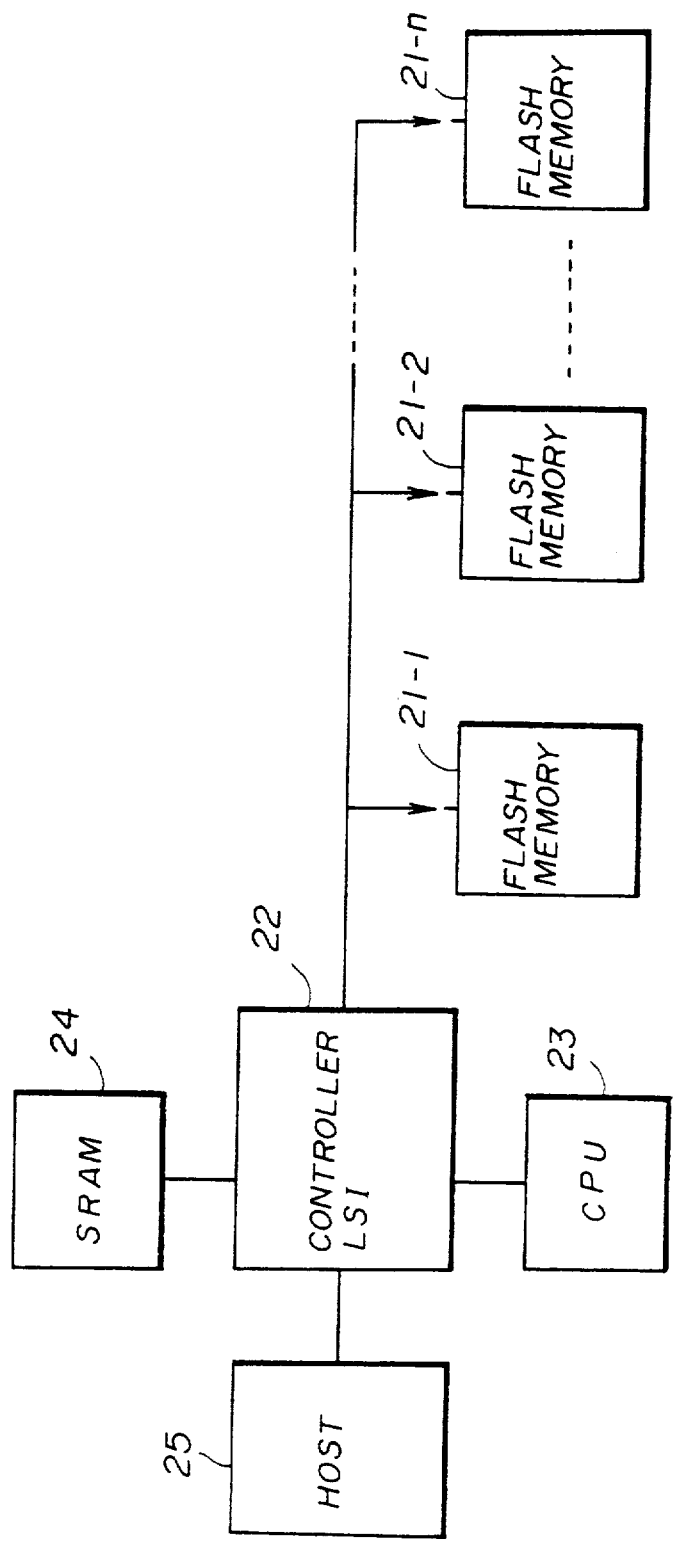
Figure 30:
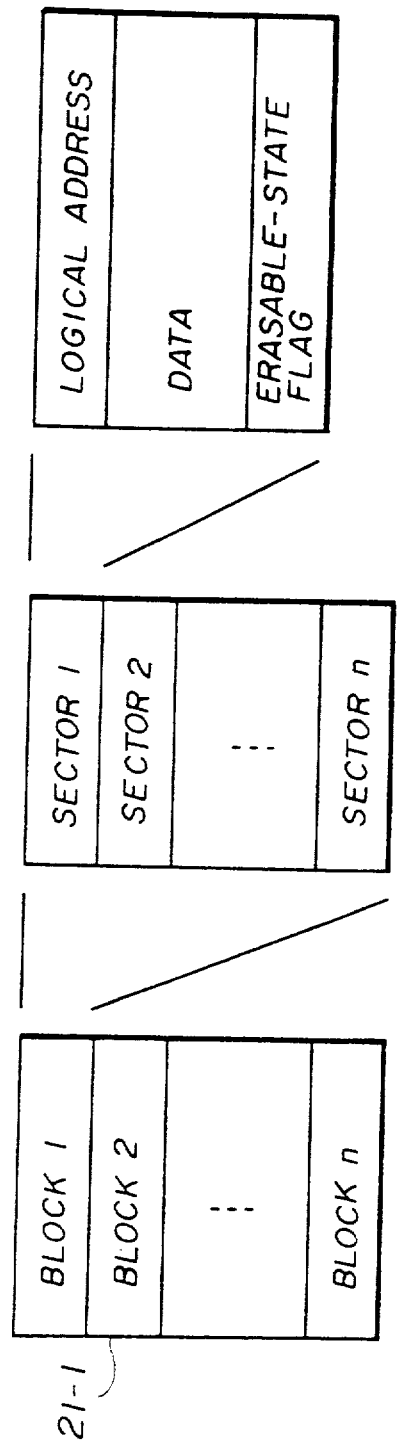
Figure 33:
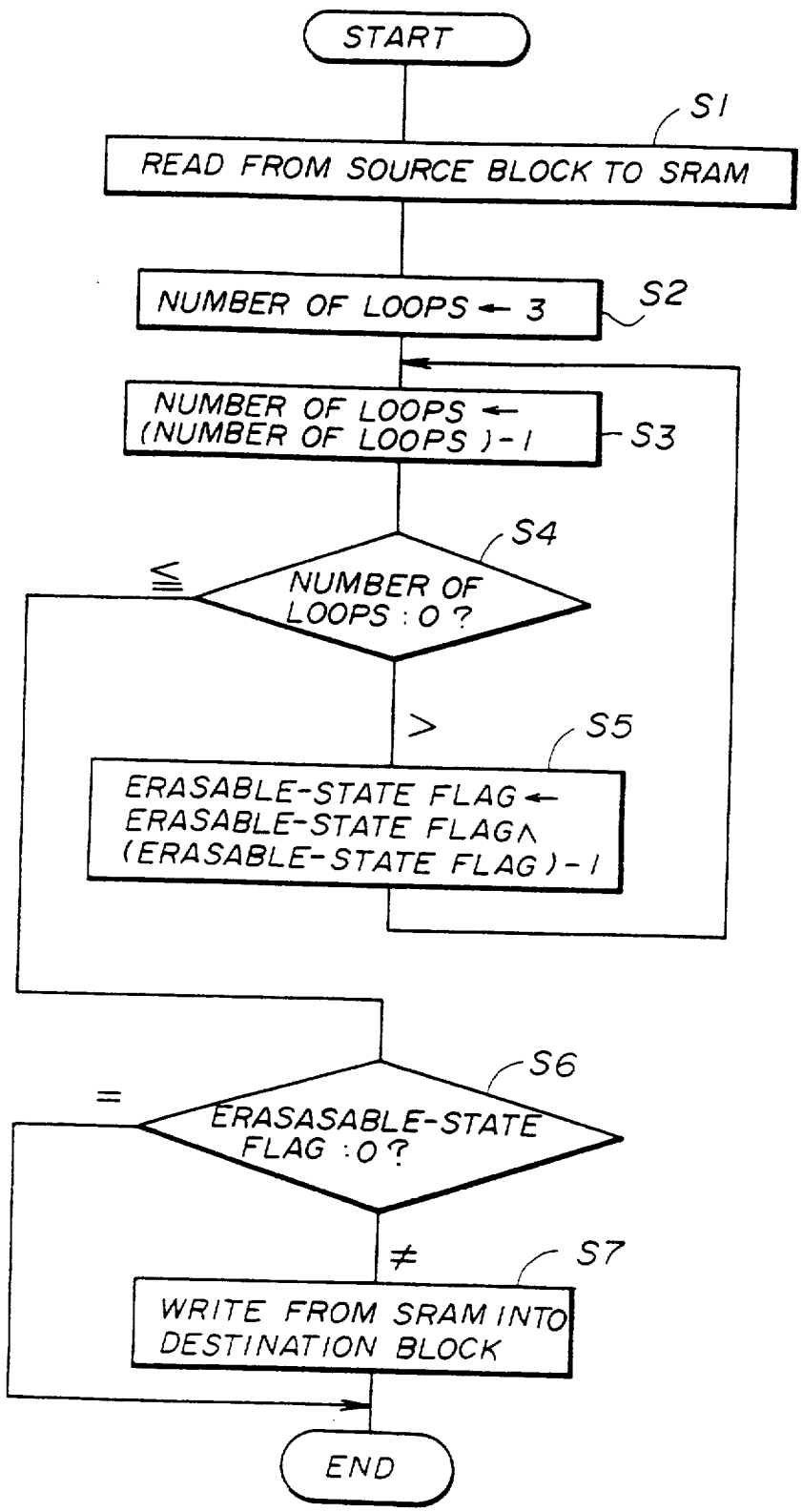
Figure 35:
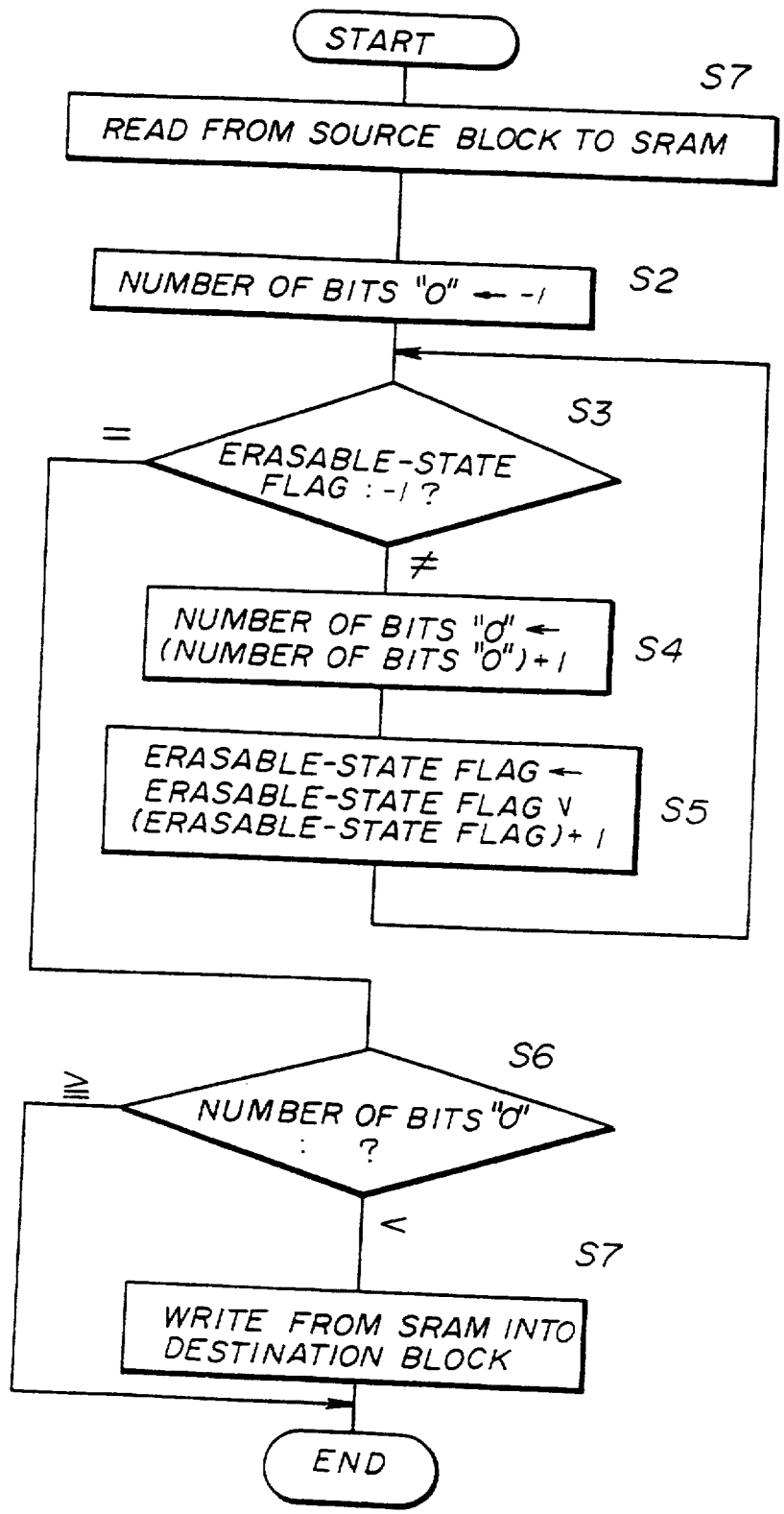
Figure 37:
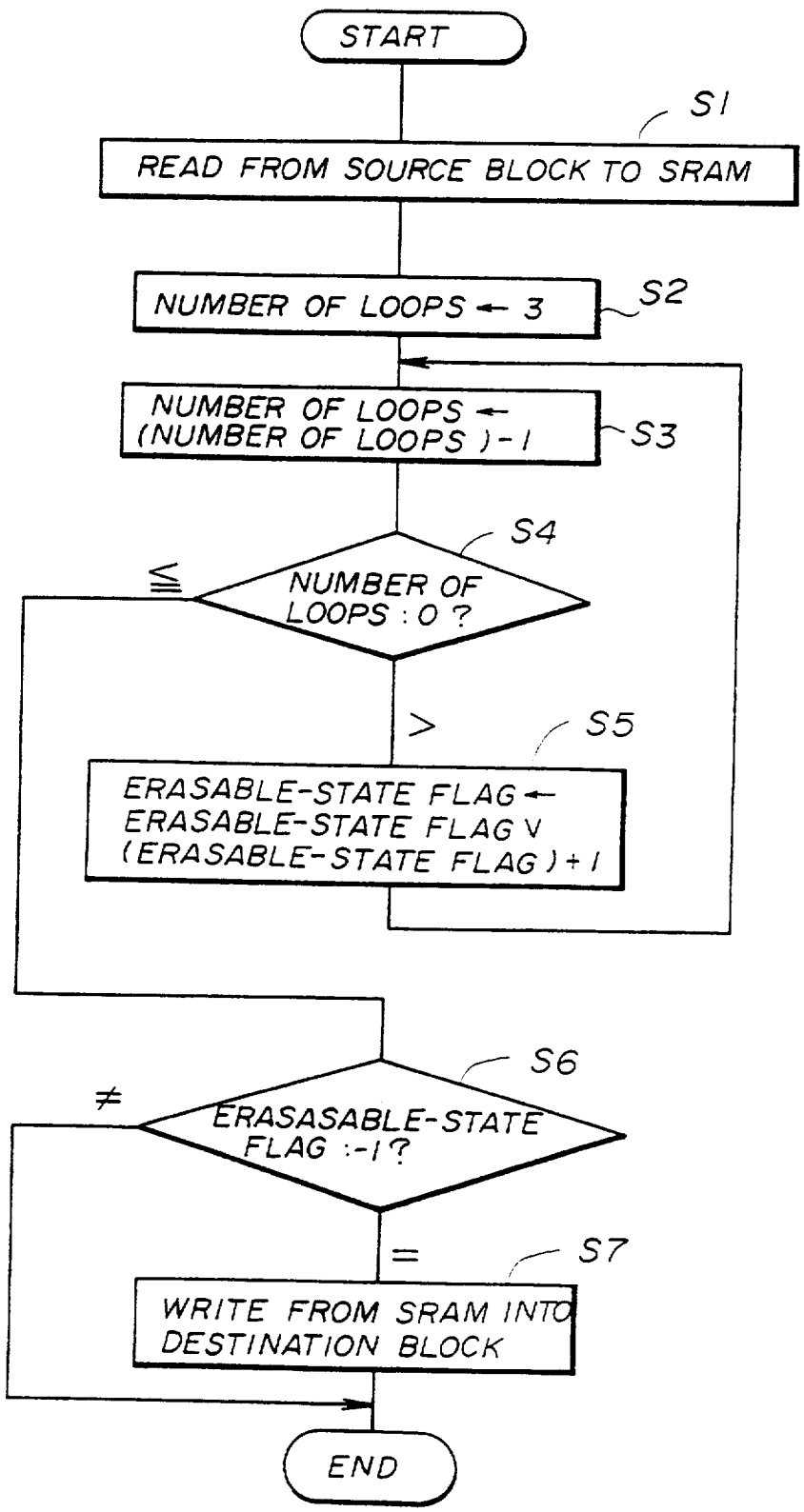

FIG. 37 is a flowchart of a fourth application of the present invention to the flash memory device. The fourth application is intended to recognize the states of the bits of the erasable-state flag formed in the redundant formation. FIG. 38 shows how the erasable-state flag is processed in the fourth application. In FIGS. 37 and 38, it is assumed that the erasable-state flag consists of four bits and a transfer of data is executed when the number of bits indicating "0", contained in the erasable-state flag, is less than three.

In step S1, a sector is from a source block of a flash memory into the SRAM 24, so that the erasable-state flag stored in the read sector is ready to be read by the CPU 23. In step S2, the value of the variable indicating number of loops consisting of steps S3–S5 is set to three. In step S3, 1 is subtracted from the value of the variable. In step S4, the value of the variable is compared with zero. When it is determined, in step S4, that the value of the variable is greater than zero, the OR logic operation on the value of the erasable-state flag and (the value of the erasable-state flag $+1$), and the resultant value is handled as the new erasable-state flag. The loop consisting of steps S3–S5 is repeatedly executed until it is determined in step S4 that the value of the variable is greater than zero.

In step S6, it is determined whether or not the current value of the erasable-state flag is −1. When it is determined that the current value of the erasable-state flag is not equal to −1, it is concluded that the number of bits "0" contained in the original erasable-state flag is equal to or greater than 3, and the process is ended. When it is determined in step S6 that the current value of the erasable-state flag is equal to −1, it is concluded that the number of bits "0" contained in the original erasable-state flag is less than 3 and therefore the related data is not erasable. In step S7, data of the source block is transferred to the destination block via the controller LSI 22.

In the example shown in FIG. 38, the erasable-state flag read from the source sector is $(1000)_2$. In this case, the first execution of the loop consisting of steps S3–S5 calculates the OR logic operation on $(1000)_2$ and $(1001)_2$, and outputs the resultant data $(1001)_2$. Further, the value of the variable is decreased to 2. By the second execution of the loop, data $(1011)_2$ is output and the value of the variable is decreased to 1. In step S4 after the loop has been performed three times, the current value of the erasable-state flag is $(1011)_2$ and it is concluded in step S6 that the number of bits indicating "0" contained in the original erasable-state flag is equal to or greater than 3. Then, the process is ended.

The first through eight embodiments of the present invention can be implemented by software or hardware. When the present invention is implemented by software, a computer-aided data processing system is provided in which a CPU or the like executes the aforementioned processes. Further, the present invention is not limited to processing the flag data as in the case of the first through fourth applications.

The present invention is not limited to the specifically disclosed embodiments, and variations and modifications may be made without departing from the scope of the present invention.

What is claimed is:

1. A method of processing binary data by a computer to detect a state of the binary data, said method comprising the steps of:
   a) performing an AND logic operation on the binary data and data obtained by subtracting binary one from the binary data;
   b) repeatedly performing the AND logic operation on new binary data obtained by the AND logic operation executed in step a) and data obtained by subtracting binary one from the new binary data until a result of the AND logic operation executed in step b) becomes zero;
   c) counting the number of times that the step b) has been repeatedly performed until the result of the AND logic operation becomes zero; and
   d) detecting the state of the binary data on the basis of the number of times counted by the step c), the number of times counted by the step c) indicating the number of bits indicating binary ones contained in the binary data.

2. A method of binary data processing by a computer to detect a state of input binary data, comprising the steps of:
   (a) performing (m−1) successive AND operations respectively producing (m−1) successively updated binary data outputs, and comprising:
      (a–1) performing a first AND operation on the input binary data and data obtained by subtracting binary one from the input binary data, and
      (a–2) performing each successive AND operation on the binary data output of the respectively next preceding AND operation and binary data obtained by subtracting binary one from the binary data output of the respectively next preceding AND operation, wherein (m) is an integer and is used to determine whether or not the binary data contains a number of binary ones equal to or grater than (m);
   (b) checking a value indicated by the binary data which has been updated (m−1) times; and
   (c) detecting the state of the input binary data on the basis of the value checked in step (b), and concluding that the number of bits indicating binary ones contained in the input binary data is equal to or greater than (m) when the value checked at step (b) is not zero.

3. A method of binary data processing by a computer to detect a state of input binary data, comprising the steps of:
   (a) performing (m) successive AND operations respectively producing (m) successively updated binary data outputs, and comprising:
      (a–1) performing a first AND operation on the input binary data and data obtained by subtracting binary one from the input binary data, and
      (a–2) performing each successive AND operation on the binary data output of the respectively next preceding AND operation and binary data obtained by subtracting binary one from the binary data output of the respectively next preceding AND operation, wherein (m) is an integer and is used to determine whether or not the binary data contains a number of binary ones equal to or less than (m);
   (b) checking a value indicated by the binary data which has been updated (m) times; and
   (c) detecting the state of the input binary data on the basis of the value checked in step (b), and concluding that the number of bits indicating binary ones contained in the input binary data is equal to or less than (m) when the value checked at step (b) is zero.

4. A method of processing binary data by a computer to detect a state of the binary data, said method comprising the steps of:
   a) performing an OR logic operation on the binary data and data obtained by adding binary one to the binary data;
   b) repeatedly performing the OR logic operation on new binary data obtained by the OR logic operation executed in step a) and data obtained by adding binary one to the new binary data until a result of the OR logic operation executed in step b) becomes −1;
   c) counting the number of times that the step b) has been repeatedly performed until the result of the OR logic operation becomes −1; and
   d) detecting the state of the binary data on the basis of the number of times counted by the step c), the number of times counted by the step c) indicating the number of bits indicating binary zeros contained in the binary data.

5. A method of binary data processing by a computer to detect a state of input binary data, comprising the steps of:
   (a) performing (m−1) successive OR operations respectively producing (m−1) successively updated binary data outputs, and comprising:
      (a–1) performing a first OR operation on the input binary data and data obtained by subtracting binary one from the input binary data, and
      (a–2) performing each successive OR operation on the binary data output of the respectively next preceding OR operation and binary data obtained by subtracting binary one from the binary data output of the respectively next preceding OR operation, wherein (m) is an integer and is used to determine whether or not the binary data contains a number of binary ones equal to greater than (m);

(b) checking a value indicated by the binary data which has been updated (m−1) times; and (c) detecting the state of the input binary data on the basis of the value checked in step (b), and concluding that the number of bits indicating binary ones contained in the input binary data is equal to or greater than (m) when the value checked at step (b) is not −1.

6. A method of binary data processing by a computer to detect a state of input binary data, comprising the steps of:

(a) performing (m) successive OR operations respectively producing (m) successively updated binary data outputs, and comprising:

(a−1) performing a first OR operation on the input binary data and data obtained by subtracting binary one from the input binary data, and (a−2) performing each successive OR operation on the binary data output of the respectively next preceding OR operation and binary data obtained by subtracting binary one from the binary data output of the respectively next preceding OR operation, wherein m is an integer and is used to determine whether or not the binary data contains a number of binary ones equal to or less than (m);

(b) checking a value indicated by the binary data which has been updated (m) times; and (c) detecting the state of the input binary data on the basis of the value checked in step (b), and concluding that the number of bits indicating binary ones contained in the input binary data is equal to or less than m when the value checked at step (b) is −1.

7. A device for processing binary data by a computer to detect a state of the binary data, said device comprising:

first means for performing an AND logic operation on the binary data and data obtained by subtracting binary one from the binary data;

second means for repeatedly performing the AND logic operation on new binary data obtained by the AND logic operation executed by the first means and data obtained by subtracting binary one from the new binary data until a result of the AND logic operation executed by the second means becomes zero;

third means for counting the number of times that the second means has repeatedly performed the AND logic operation until the result of the AND logic operation becomes zero; and fourth means for detecting the state of the binary data on the basis of the number of times counted by the third means, the number of times counted by the third means indicating the number of bits indicating binary ones contained in the binary data.

8. A device for processing binary data by a computer to detect a state of the binary data, said device comprising:

performing means for performing (m−1) successive AND operations respectively producing (m−1) successively updated binary data outputs, further comprising:

(a−1) performing a first AND operation on the input binary data and data obtained by subtracting binary one from the input binary data, and (a−2) performing each successive AND operation on the binary data output of the respectively next preceding AND operation and binary data obtained by subtracting binary one from the binary data output of the respectively next preceding AND operation, wherein (m) is an integer and is used to determine whether or not the binary data contains a number of binary ones equal to or greater than (m); checking means for checking a value indicated by the binary data which has been updated (m−1) times;

detecting means for detecting the state of the input binary data on the basis of the value checked by the checking means and concluding that the number of bits indicating binary ones contained in the input binary data is equal to or greater than m when the value checked by the checking means is not zero; and the read and write operations being controlled by the state of the binary data detected by the detecting means.

9. A device for processing binary data by a computer to detect a state of the binary data, said device comprising:

performing means for performing (m) successive AND operations respectively producing (m) successively updated binary data outputs, further comprising:

(a−1) performing a first AND operation on the input binary data and data obtained by subtracting binary one from the input binary data, and (a−2) performing each successive AND operation on the binary data output of the respectively next preceding AND operation and binary data obtained by subtracting binary one from the binary data output of the respectively next preceding AND operation, wherein (m) is an integer and is used to determine whether or not the binary data contains a number of binary ones equal to or less than (m); checking means for checking a value indicated by the binary data which has been updated (m) times; and detecting means for detecting the state of the input binary data on the basis of the value checked by the checking means and concluding that the number of bits indicating binary ones contained in the input binary data is equal to or less than (m) when the value checked by the checking means is zero; and the read and write operations being controlled by the state of the binary data detected by the detecting means.

10. A device for processing binary data by a computer to detect a state of the binary data, said device comprising:

first means for performing an OR logic operation on the binary data and data obtained by adding binary one to the binary data;

second means for repeatedly performing the OR logic operation on new binary data obtained by the OR logic operation executed by the first means and data obtained by adding binary one to the new binary data until a result of the OR logic operation executed by the second means becomes −1;

third means for counting the number of times that the second means has repeatedly performed the AND logic operation until the result of the OR logic operation becomes −1; and fourth means for detecting the state of the binary data on the basis of the number of times counted by the third means, the number of times counted by the third means indicating the number.

11. A device for processing binary data by a computer to detect a state of the binary data, said device comprising:

performing means for performing (m−1) successive OR operations respectively producing (m−1) successively updated binary data outputs, further comprising:

(a–1) performing a first OR operation on the input binary data and data obtained by subtracting binary one from the input binary data, and (a–2) performing each successive OR operation on the binary data output of the respectively next preceding OR operation and binary data obtained by subtracting binary one from the binary data output of the respectively next preceding OR operation, wherein (m) is an integer and is used to determine whether or not the binary data contains a number of binary ones equal to greater than (m); checking means for checking a value indicated by the binary data which has been updated (m–1) times;

detecting means for detecting the state of the input binary data on the basis of the value checked by the checking means and concluding that the number of bits indicating binary ones contained in the input binary data is equal to or greater than (m) when the value checked by the checking means is not −1; and the read and write operations being controlled by the state of the binary data detected by the detecting means.

12. A device for processing binary data by a computer to detect a state of the binary data, said device comprising:

performing means for performing (m) successive OR operations respectively producing (m) successively updated binary data outputs, further comprising:

(a–1) performing a first OR operation on the input binary data and data obtained by subtracting binary one from the input binary data, and (a–2) performing each successive OR operation on the binary data output of the respectively next preceding OR operation and binary data obtained by subtracting binary one from the binary data output of the respectively next preceding OR operation, wherein m is an integer and is used to determine whether or not the binary data contains a number of binary ones equal to or less than (m); checking means for checking a value indicated by the binary data which has been updated (m) times;

detecting means for detecting the state of the input binary data on the basis of the value checked by the checking means and concluding that the number of bits indicating binary ones contained in the input binary data is equal to or less than m when the value checked by the checking means is −1; and the read and write operations being controlled by the state of the binary data detected by the detecting means.

13. A method of processing binary data by a computer to detect a state of the binary data, said method comprising the steps of:

a) performing an AND logic operation on the binary data and data obtained by subtracting binary one from the binary data;

b) repeatedly performing the AND logic operation on new binary data obtained by the AND logic operation executed in step a) and data obtained by subtracting binary one from the new binary data;

c) counting the number of times that the step b) has been repeatedly performed; and d) detecting the state of the binary data on the basis of the number of times counted by the step c) and a latest result of the AND logic operation.

14. A method of processing binary data by a computer to detect a state of the binary data, said method comprising the steps of:

a) performing an OR logic operation on the binary data and data obtained by adding binary one to the binary data;

b) repeatedly performing the OR logic operation on new binary data obtained by the OR logic operation executed in step a) and data obtained by adding binary one to the new binary data;

c) counting the number of times that the step b) has been repeatedly performed; and d) detecting the state of the binary data on the basis of the number of times counted by the step c) and a latest result of the OR logic operation.

15. A device for processing binary data by a computer to detect a state of the binary data, said device comprising:

first means for performing an AND logic operation on the binary data and data obtained by subtracting binary one from the binary data;

second means for repeatedly performing the AND logic operation on new binary data obtained by the AND logic operation executed by the first means and data obtained by subtracting binary one from the new binary data;

third means for counting the number of times that the second means has repeatedly performed the AND logic operation; and fourth means for detecting the state of the binary data on the basis of the number of times counted by the third means and a latest result of the AND logic operation.

16. A device having a memory in which data write and read operations are controlled by binary data, said device comprising:

first means for performing an OR logic operation on the binary data and data obtained by adding binary one to the binary data;

second means for repeatedly performing the OR logic operation on new binary data obtained by the OR logic operation executed by the first means and data obtained by adding binary one to the new binary data;

third means for counting the number of times that the second means has repeatedly performed the AND logic operation; and fourth means for detecting the state of the binary data on the basis of the number of times counted by the third means and a latest result of the OR logic operation.

* * * * *

UNITED STATES PATENT AND TRADEMARK OFFICE
CERTIFICATE OF CORRECTION

PATENT NO. : 5,539,683
DATED : July 23, 1996
INVENTOR(S) : KOMATSU

It is certified that error appears in the above-indentified patent and that said Letters Patent is hereby corrected as shown below:

Col. 1, line 25, after "disadvantage" insert --,--.

Col. 3, line 14, after "same as" insert --those--;
line 27, after "method" insert --,--;
line 51, change ""1"" to --"-1"--.

Col. 4, line 9, change ""1"" to --"-1"--.

Col. 5, line 37, change "grater" to --greater--.

Col. 6, line 28, after "equal to" insert --or--.

Col. 7, line 15, after "prising:" delete "to";
line 39, after "prising" insert --:--.

Col. 8, lines 1-21, change to read as follows:

--(m) successive AND operations respectively producing (m) successively updated binary data outputs, further comprising: (a-1) performing a first AND operation on the input binary data and data obtained by subtracting binary one from the input binary data, and (a-2) performing each successive AND operation on the binary data output of the respectively next preceding AND operation and binary data obtained by subtracting binary one from the binary data output of the respectively next preceding AND operation, wherein (m) is an integer and is used to determine whether or not the binary data contains a number of binary ones equal to or less than (m); checking means for checking a value indicated by the binary data which has been updated (m) times; and detecting means for detecting the state of the input binary data on the basis of the value checked by the checking means and concluding that the number of bits indicating binary ones contained in the input binary data is equal to or less than (m) when the value checked by the checking means is zero; and the read and write operations being controlled by the state of the binary data detected by the detecting means.--

UNITED STATES PATENT AND TRADEMARK OFFICE
CERTIFICATE OF CORRECTION

PATENT NO. : 5,539,683
DATED : July 23, 1996
INVENTOR(S) : KOMATSU

It is certified that error appears in the above-indentified patent and that said Letters Patent is hereby corrected as shown below:

Col. 8, lines 25-43, change to read as follows:

--prising: performing means for performing (m-1) successive OR operations respectively producing (m-1) successively updated binary data outputs, further comprising: (a-1) performing a first OR operation on the input binary data and data obtained by subtracting binary one from the input binary data, and (a-2) performing each successive OR operation on the binary data output of the respectively next preceding OR operation and binary data obtained by subtracting binary one from the binary data output of the respectively next preceding OR operation, wherein (m) is an integer and is used to determine whether or not the binary data contains a number of binary ones equal to greater than (m); checking means for checking a value indicated by the binary data which has been updated (m-1) times; detecting means for detecting the state of the input binary data on the basis of the value checked by the checking means and concluding that the number of bits indicating binary ones contained in the input binary data is equal to or greater than (m) when the value checked by the checking means is not -1; and the read and write operations being controlled by the state of the binary data detected by the detecting means.--

Col. 10, line 37, change "FIG.. 29" to --FIG. 29--.

Col. 11, line 16, change "or to" to --to or--.

Col. 13, line 3, after "S4" insert --.--;
line 49, after "(=3)." start a new paragraph.

Col. 14, line 22, "1001" should not be in bold face type.

Col. 16, line 62, after "determined," insert --in--.

UNITED STATES PATENT AND TRADEMARK OFFICE
CERTIFICATE OF CORRECTION

PATENT NO. : 5,539,683
DATED : July 23, 1996
INVENTOR(S) : KOMATSU

It is certified that error appears in the above-indentified patent and that said Letters Patent is hereby corrected as shown below:

Col. 19, line 25, change "eight" to --eighth--.

Signed and Sealed this

Thirty-first Day of December, 1996

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,539,683
DATED : July 23, 1996
INVENTOR(S) : Komatsu

It is certified that error appears in the above-indentified patent and that said Letters Patent is hereby corrected as shown below:

The title page, should be deleted to be replaced with the attached title page.

The drawing sheets, consisting of Figs. 1-38, should be deleted to be replaced with the drawing sheets, consisting of Figs. 1-38, as shown on the attached pages.

Column 22, line 62, (claim 10, line 19), change "number." to read --number of bits indicating binary zeros contained in the binary data.--

Signed and Sealed this

First Day of April, 1997

Attest:

BRUCE LEHMAN

Attesting Officer

Commissioner of Patents and Trademarks

United States Patent [19]

Komatsu

[11] Patent Number: 5,539,683
[45] Date of Patent: Jul. 23, 1996

[54] METHOD AND DEVICE FOR PROCESSING, AND DETECTING A STATE OF, BINARY DATA

[75] Inventor: Shinpei Komatsu, Yokohama, Japan

[73] Assignee: Fujitsu Limited, Kawasaki, Japan

[21] Appl. No.: 265,032

[22] Filed: Jun. 24, 1994

[30] Foreign Application Priority Data

Aug. 10, 1993 [JP] Japan .................. 5-198202

[51] Int. Cl.⁶ ..................................................... G06F 7/50
[52] U.S. Cl. .................................................. 364/715.09
[58] Field of Search ........................ 364/715.09, 715.1

[56] References Cited

U.S. PATENT DOCUMENTS

| | | | |
|---|---|---|---|
| 3,711,692 | 1/1973 | Batcher | 364/715.09 |
| 4,189,716 | 2/1980 | Krambeck | 364/715.09 |
| 4,486,848 | 12/1984 | Kaminski | 364/715.09 |
| 4,607,176 | 8/1986 | Burrows et al. | 364/715.09 |

Primary Examiner—David H. Malzahn
Attorney, Agent, or Firm—Staas & Halsey

[57] ABSTRACT

In a method of processing binary data by a computer to detect a state of the binary data, the first step is to perform an AND logic operation on the binary data and data obtained by subtracting binary one from the binary data. The second step is to repeatedly perform the AND logic operation on new binary data obtained by the AND logic operation executed in the first step and data obtained by subtracting binary one from the new binary data until a result of the AND logic operation executed in the second step becomes zero. The third step is to count the number of times that the second step has been repeatedly performed until the result of the AND logic operation becomes zero. The fourth step is to detect the state of the binary data on the basis of the number of times counted by the step c). The number of times counted by the third step indicates the number of bits indicating binary ones contained in the binary data.

16 Claims, 45 Drawing Sheets

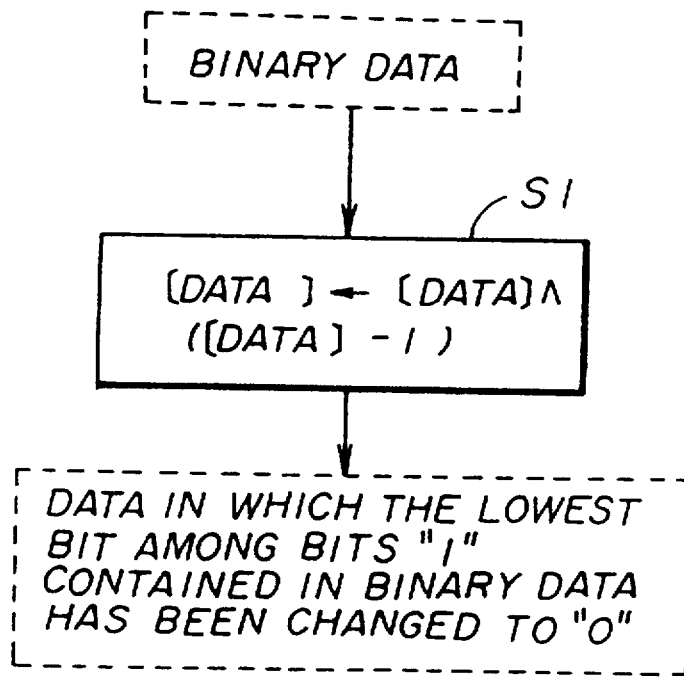

FIG.4 PRIOR ART

|  | 1ST TIME | | 2ND TIME | | 3RD TIME | | |
|---|---|---|---|---|---|---|---|
|  | DATA | WORK | DATA | WORK | DATA | WORK | |
|  | 1100 | 0001 | | | | | S1 |
|  | 1100 | 0001 | | | | | S2 |
|  | 1100 | 0001 | 1100 | 0010 | 1100 | 0100 | S3 |
|  | 1100 | 0010 | 1100 | 0100 | | | S4 |
|  | | | | | 1000 | 0100 | S5 |
|  | | | | | 1000 | 0100 | |

FIG. 6 PRIOR ART

| | 1ST TIME | | 2ND TIME | | 3RD TIME | | 4TH TIME | | 5TH TIME | | |
|---|---|---|---|---|---|---|---|---|---|---|---|
| | DATA | NUMBER OF BITS "1" | DATA | NUMBER OF BITS "1" | DATA | NUMBER OF BITS "1" | DATA | NUMBER OF BITS "1" | DATA | NUMBER OF BITS "1" | |
| | 1001 | 0 | ① | | ② | | ③ | | ④ | | S1 |
| | 1001 | 0 | 0100 | 1 | 0010 | 1 | 0001 | 1 | 0000 | 2 | S2 |
| | 1001 | 0 | 0100 | 1 | 0010 | 1 | 0001 | 1 | | | S3 |
| | 1001 | 1 | | | | | 0001 | 2 | | | S4 |
| | 0100 | 1 | 0010 | 1 | 0001 | 1 | 0000 | 2 | | | S5 |
| | ① | | ② | | ③ | | ④ | | 0000 | 2 | |

FIG. 8 PRIOR ART

| 1ST TIME | | 2ND TIME | | 3RD TIME | | 4TH TIME | | 5TH TIME | | |
|---|---|---|---|---|---|---|---|---|---|---|
| DATA | NUMBER OF BITS "1" | DATA | NUMBER OF BITS "1" | DATA | NUMBER OF BITS "1" | DATA | NUMBER OF BITS "1" | DATA | NUMBER OF BITS "1" | |
| 1001 | 0 | ① | | ② | | ③ | | ④ | | S1 |
| 1001 | 0 | 0100 | 1 | 0010 | 1 | 0001 | 1 | 0000 | 2 | S2 |
| 1001 | 0 | 0100 | 1 | 0010 | 1 | 0001 | 1 | | | S3 |
| 1001 | 1 | | | | | 0001 | 2 | | | S4 |
| 0100 | 1 | 0010 | 1 | 0001 | 1 | 0000 | 2 | | | S5 |
| ① | | ② | | ③ | | ④ | | 0000 | 2 | S6 |

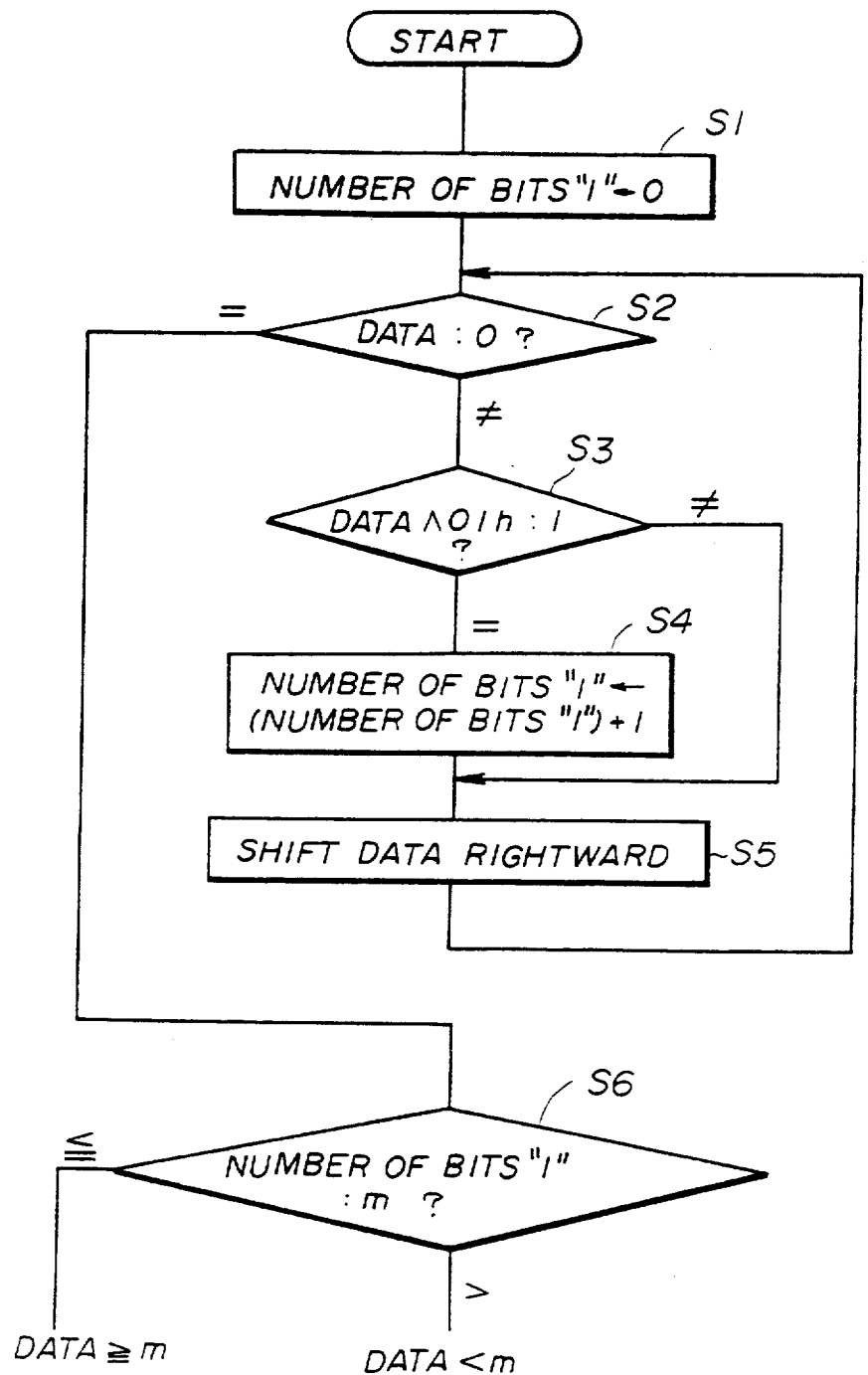

FIG. 10 PRIOR ART

| 1ST TIME | | 2ND TIME | | 3RD TIME | | 4TH TIME | | 5TH TIME | | |
|---|---|---|---|---|---|---|---|---|---|---|
| DATA | NUMBER OF BITS "1" | DATA | NUMBER OF BITS "1" | DATA | NUMBER OF BITS "1" | DATA | NUMBER OF BITS "1" | DATA | NUMBER OF BITS "1" | |
| 1001 | 0 | ① | | ② | | ③ | | ④ | | S1 |
| 1001 | 0 | 0100 | 1 | 0010 | 1 | 0001 | 1 | 0000 | 2 | S2 |
| 1001 | 0 | 0100 | 1 | 0010 | 1 | 0001 | 1 | | | S3 |
| 1001 | 1 | | | | | 0001 | 2 | | | S4 |
| 0100 | 1 | 0010 | 1 | 0001 | 1 | 0000 | 2 | | | S5 |
| ① | | ② | | ③ | | ④ | | 0000 | 2 | |

FIG.12 PRIOR ART

| 1ST TIME | | 2ND TIME | | 3RD TIME | | |
|---|---|---|---|---|---|---|
| DATA | WORK | DATA | WORK | DATA | WORK | |
| 1100 | 0001 | | | | | S1 |
| 0011 | 0001 | | | | | S2 |
| 0011 | 0001 | 0011 | 0010 | 0011 | 0100 | S3 |
| 0011 | 0010 | 0011 | 0100 | | | S4 |
| | | | | 0111 | 0100 | S5 |
| | | | | 0111 | 0100 | |

FIG.14 PRIOR ART

| 1ST TIME | | 2ND TIME | | 3RD TIME | | 4TH TIME | | |
|---|---|---|---|---|---|---|---|---|
| DATA | NUMBER OF BITS "0" | DATA | NUMBER OF BITS "0" | DATA | NUMBER OF BITS "0" | DATA | NUMBER OF BITS "0" | |
| 1001 | 0 | ① | | ② | | ③ | | S1 |
| 1001 | 0 | 1100 | 0 | 1110 | 1 | 1111 | 2 | S2 |
| 1001 | 0 | 1100 | 0 | 1110 | 1 | | | S3 |
| | | 1100 | 1 | 1110 | 2 | | | S4 |
| 1100 | 0 | 1110 | 1 | 1111 | 2 | | | S5 |
| ① | | ② | | ③ | | 1111 | 2 | |

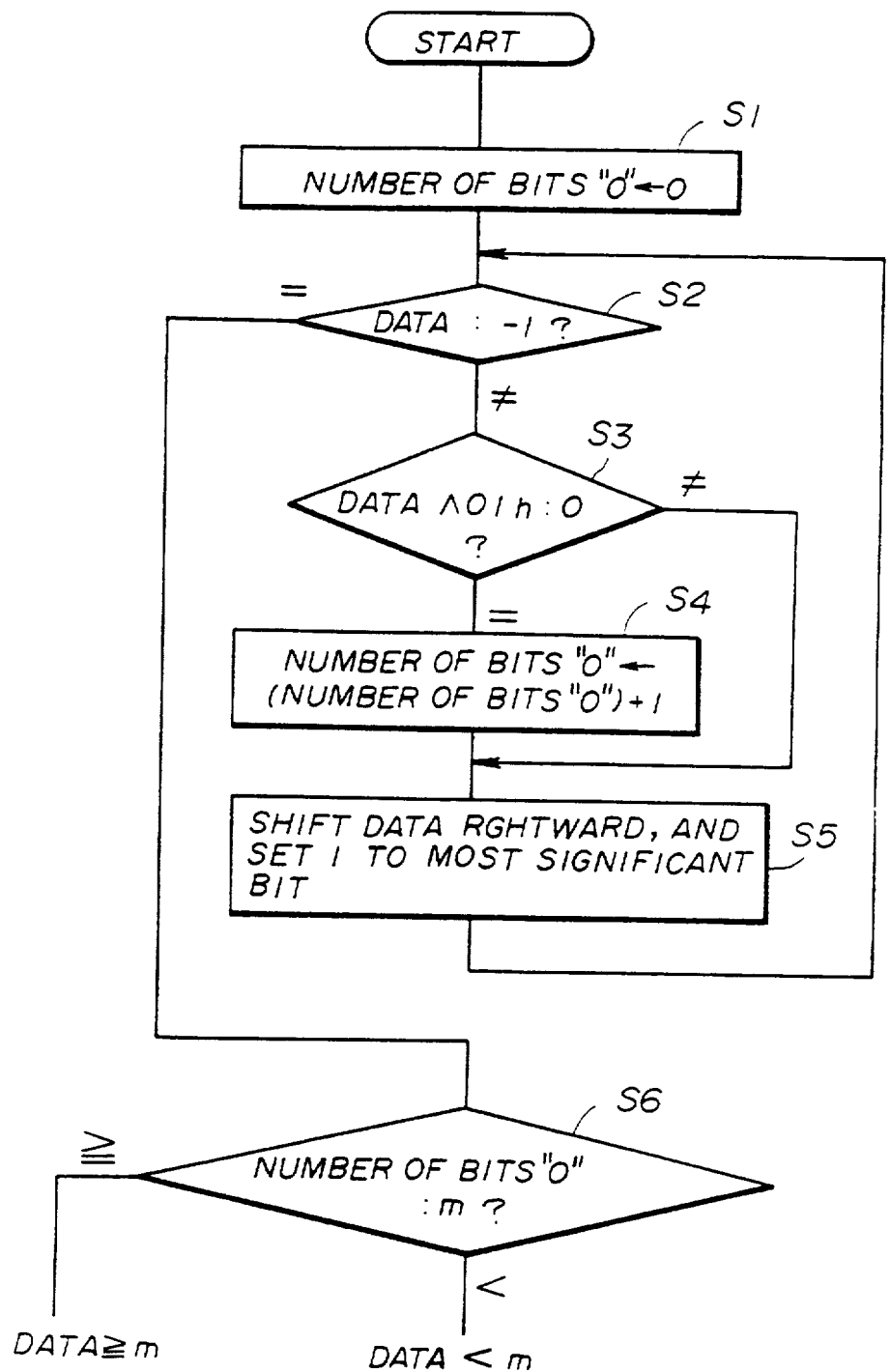

FIG.16 PRIOR ART

| 1ST TIME | | 2ND TIME | | 3RD TIME | | 4TH TIME | | |
|---|---|---|---|---|---|---|---|---|
| DATA | NUMBER OF BITS "0" | DATA | NUMBER OF BITS "0" | DATA | NUMBER OF BITS "0" | DATA | NUMBER OF BITS "0" | |
| 1001 | 0 | ① | | ② | | ③ | | S1 |
| 1001 | 0 | 1100 | 0 | 1110 | 1 | 1111 | 2 | S2 |
| 1001 | 0 | 1100 | 0 | 1110 | 1 | | | S3 |
| | | 1100 | 1 | 1110 | 2 | | | S4 |
| 1100 | 0 | 1110 | 1 | 1111 | 2 | | | S5 |
| ① | | ② | | ③ | | 1111 | 2 | S6 |

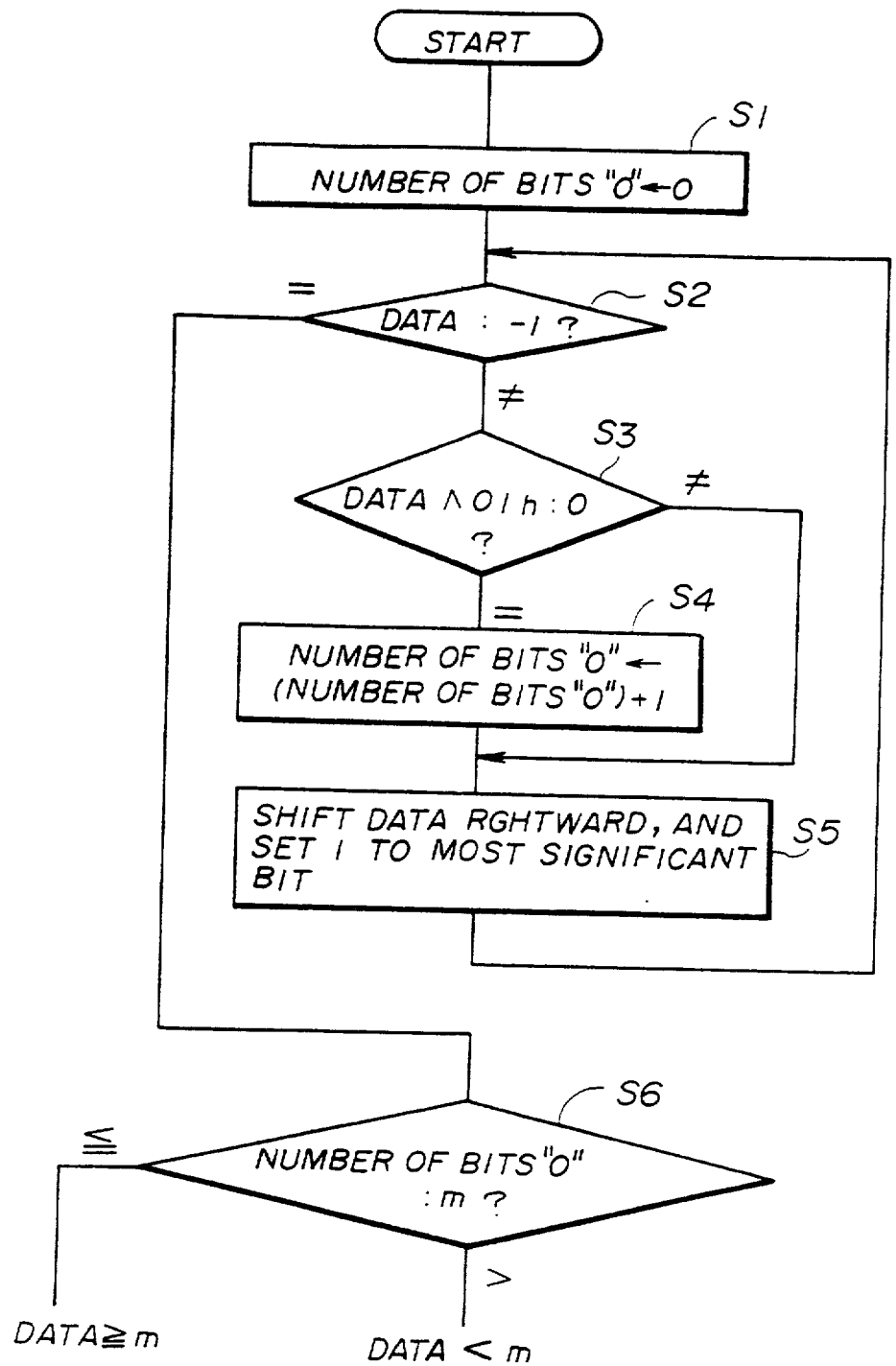

FIG.18 PRIOR ART

| 1ST TIME | | 2ND TIME | | 3RD TIME | | 4TH TIME | | |
|---|---|---|---|---|---|---|---|---|
| DATA | NUMBER OF BITS "0" | DATA | NUMBER OF BITS "0" | DATA | NUMBER OF BITS "0" | DATA | NUMBER OF BITS "0" | |
| 1001 | 0 | ① | | ② | | ③ | | S1 |
| 1001 | 0 | 1100 | 0 | 1110 | 1 | 1111 | 2 | S2 |
| 1001 | 0 | 1100 | 0 | 1110 | 1 | | | S3 |
| | | 1100 | 1 | 1110 | 2 | | | S4 |
| 1100 | 0 | 1110 | 1 | 1111 | 2 | | | S5 |
| ① | | ② | | ③ | | | | |
| | | | | | | 1111 | 2 | S6 |

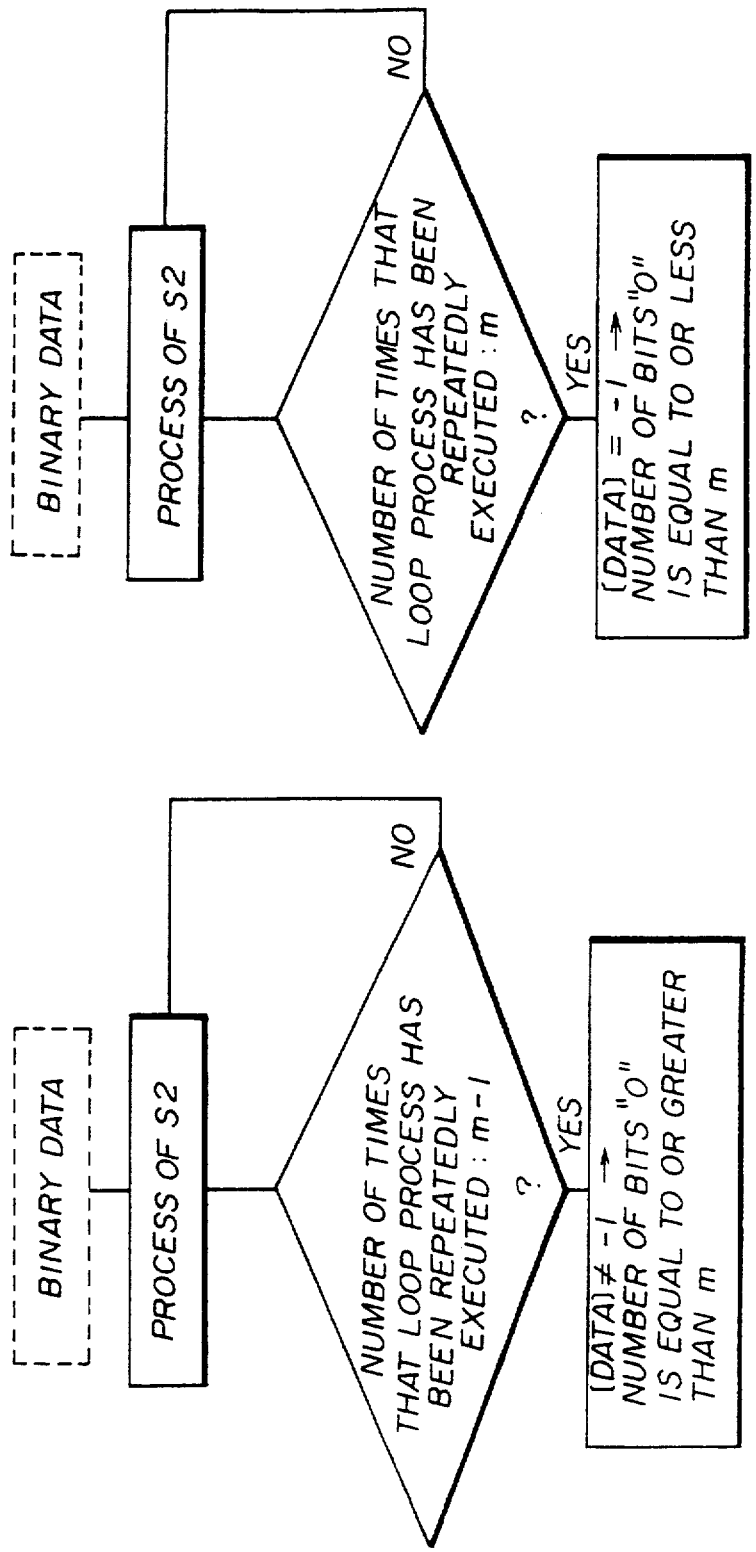

FIG.22B

| 1ST TIME | | 2ND TIME | | 3RD TIME | | |
|---|---|---|---|---|---|---|
| DATA | NUMBER OF BITS "1" | DATA | NUMBER OF BITS "1" | DATA | NUMBER OF BITS "1" | |
| 1001 | 0 | ① | | ② | | S1 |
| 1001 | 0 | 1000 | 1 | 0000 | 2 | S2 |
| 1001 | 1 | 1000 | 2 | | | S3 |
| 1000 | 1 | 0000 | 2 | | | S4 |
| ① | | ② | | | | |
| | | | | 0000 | 2 | |

FIG.23B

| 1 ST TIME | | 2 ND TIME | | 3 RD TIME | | |
|---|---|---|---|---|---|---|
| DATA | NUMBER OF LOOPS | DATA | NUMBER OF LOOPS | DATA | NUMBER OF LOOPS | |
| 1001 | 3 | ① | | ② | | S1 |
| 1001 | 2 | 1000 | 1 | 0000 | 0 | S2 |
| 1001 | 2 | 1000 | 1 | 0000 | 0 | S3 |
| 1000 | 2 | 0000 | 1 | | | S4 |
| ① | | ② | | 0000 | 0 | S5 |

FIG. 24B

| 1ST TIME | | 2ND TIME | | 3RD TIME | | 4TH TIME | | |
|---|---|---|---|---|---|---|---|---|
| DATA | NUMBER OF LOOPS | DATA | NUMBER OF LOOPS | DATA | NUMBER OF LOOPS | DATA | NUMBER OF LOOPS | |
| 1001 | 3 | ① ↓ | | ② ↓ | | ③ ↓ | | S1 |
| 1001 | 3 | 1000 | 2 | 0000 | 1 | 0000 | 0 | S2 |
| 1000 | 3 | 0000 | 2 | 0000 | 1 | | | S3 |
| 1000 | 2 | 0000 | 1 | 0000 | 0 | | | S4 |
| ① | | ② | | ③ | | 0000 | 0 | S5 |

FIG.26B

| 1ST TIME | | 2ND TIME | | 3RD TIME | | |
|---|---|---|---|---|---|---|
| DATA | NUMBER BITS "0" | DATA | NUMBER BITS "0" | DATA | NUMBER BITS "0" | |
| 1001 | 0 | ① | | ② | | S1 |
| 1001 | 0 | 1011 | 1 | 1111 | 2 | S2 |
| 1001 | 1 | 1011 | 2 | | | S3 |
| 1011 | 1 | 1111 | 2 | | | S4 |
| ① | | ② | | 1111 | 2 | |

FIG. 27B

| 1 ST TIME | | 2 ND TIME | | 3 RD TIME | | |
|---|---|---|---|---|---|---|
| DATA | NUMBER OF LOOPS | DATA | NUMBER OF LOOPS | DATA | NUMBER OF LOOPS | |
| 1001 | 3 | ① | | ② | | S1 |
| 1001 | 2 | 1011 | 1 | 1111 | 0 | S2 |
| 1001 | 2 | 1011 | 1 | 1111 | 0 | S3 |
| 1011 | 2 | 1111 | 1 | | | S4 |
| ① | | ② | | 1111 | 0 | S5 |

FIG. 28B

| 1 ST TIME | | 2 ND TIME | | 3 RD TIME | | 4 TH TIME | | |
|---|---|---|---|---|---|---|---|---|
| DATA | NUMBER OF LOOPS | DATA | NUMBER OF LOOPS | DATA | NUMBER OF LOOPS | DATA | NUMBER OF LOOPS | |
| 1001 | 3 | ① | | ② | | ③ | | S1 |
| 1001 | 3 | 1011 | 2 | 1111 | 1 | 1111 | 0 | S2 |
| 1011 | 3 | 1111 | 2 | 1111 | 1 | | | S3 |
| 1011 | 2 | 1111 | 1 | 1111 | 0 | | | S4 |
| ① | | ② | | ③ | | 1111 | 0 | S5 |

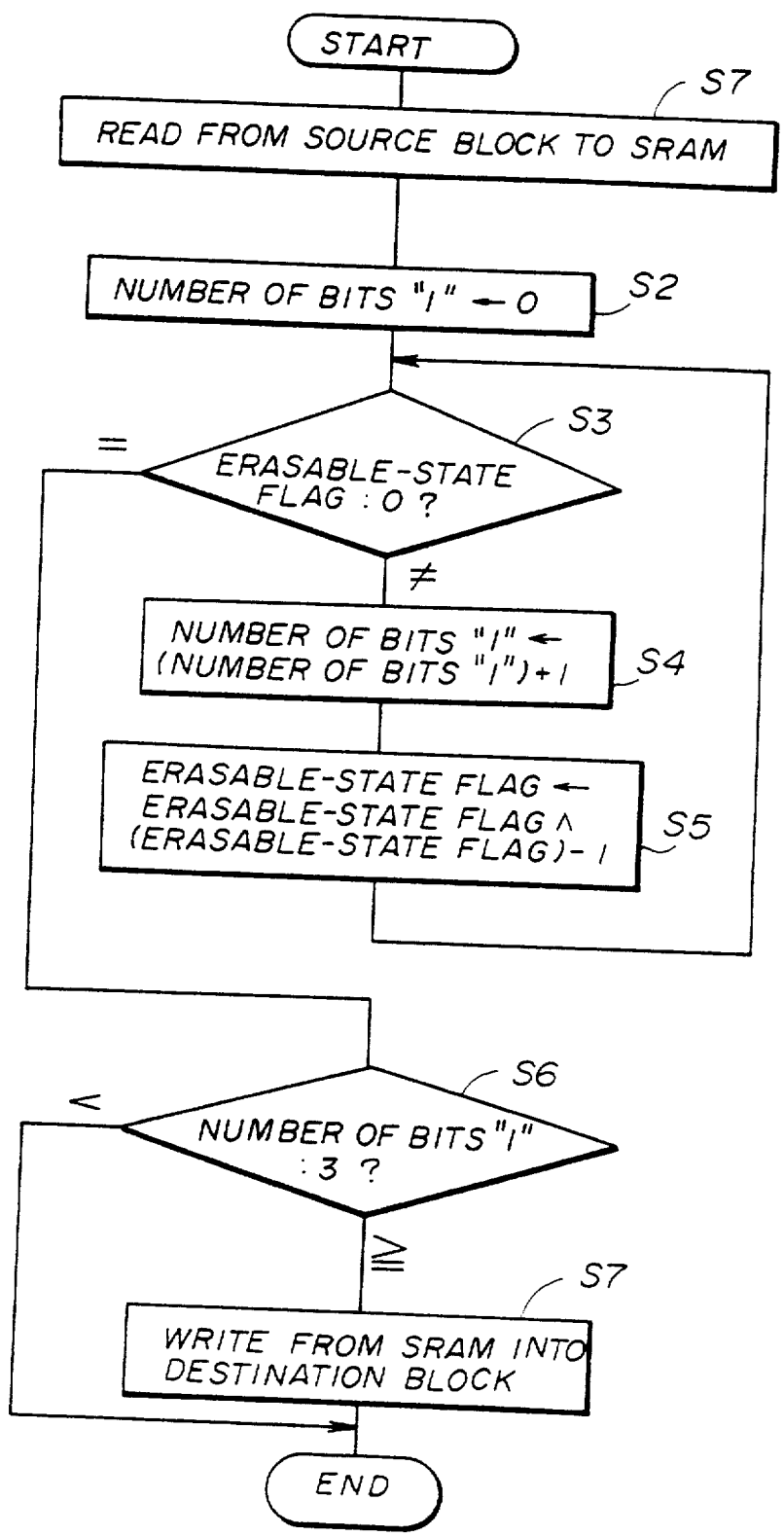

FIG.32

| 1ST TIME | | 2ND TIME | | 3RD TIME | | |
|---|---|---|---|---|---|---|
| ERASABLE-STATE FLAG | NUMBER OF BITS "1" | ERASABLE-STATE FLAG | NUMBER OF BITS "1" | ERASABLE-STATE FLAG | NUMBER OF BITS "1" | |
| 1001 | * | | | | | S1 |
| 1001 | 0 | | | | | S2 |
| 1001 | 0 | 1000 | 1 | 0000 | 2 | S3 |
| 1001 | 1 | 1000 | 2 | | | S4 |
| 1000 | 1 | 0000 | 2 | | | S5 |
| | | | | 0000 | 2 | S6 |
| | | | | | | S7 |
| | | | | 0000 | 2 | |

FIG. 34

| 1ST TIME | | 2ND TIME | | 3RD TIME | | |
|---|---|---|---|---|---|---|
| ERASABLE-STATE FLAG | NUMBER OF LOOPS | ERASABLE-STATE FLAG | NUMBER OF LOOPS | ERASABLE-STATE FLAG | NUMBER OF LOOPS | |
| 1101 | * | | | | | S1 |
| 1101 | 3 | ① | | ② | | S2 |
| 1101 | 2 | 1100 | 1 | 1000 | 0 | S3 |
| 1101 | 2 | 1100 | 1 | 1000 | 0 | S4 |
| 1100 | 2 | 1000 | 1 | | | S5 |
| ① | | ② | | | | |
| | | | | 1000 | 0 | S6 |
| | | | | 1000 | 0 | S7 |
| | | | | 1000 | 0 | |

FIG.36

| 1ST TIME | | 2ND TIME | | 3RD TIME | | |
|---|---|---|---|---|---|---|
| ERASABLE-STATE FLAG | NUMBER OF BITS "0" | ERASABLE-STATE FLAG | NUMBER OF BITS "0" | ERASABLE-STATE FLAG | NUMBER OF BITS "0" | |
| 1001 | * | | | | | S1 |
| 1001 | 0 | | | | | S2 |
| 1001 | 0 | 1011 | 1 | | 2 | S3 |
| 1001 | 1 | 1011 | 2 | | | S4 |
| 1000 | 1 | 1111 | 2 | | | S5 |
| | | | | 1111 | 2 | S6 |
| | | | | 1111 | 2 | S7 |
| | | | | 0000 | 2 | |

FIG.38

| 1ST TIME | | 2ND TIME | | 3RD TIME | | |
|---|---|---|---|---|---|---|
| ERASABLE-STATE FLAG | NUMBER OF LOOPS | ERASABLE-STATE FLAG | NUMBER OF LOOPS | ERASABLE-STATE FLAG | NUMBER OF LOOPS | |
| 1000 | * | | | | | S1 |
| 1000 | 3 | ① | | ② | | S2 |
| 1000 | 2 | 1001 | 1 | 1011 | 0 | S3 |
| 1000 | 2 | 1001 | 1 | 1011 | 0 | S4 |
| 1001 | 2 | 1011 | 1 | | | S5 |
| ① | | ② | | | | |
| | | | | 1011 | 0 | S6 |
| | | | | | | S7 |
| | | | | 1011 | 0 | |